United States Patent [19]
Andersen et al.

[11] Patent Number: 5,665,439
[45] Date of Patent: *Sep. 9, 1997

[54] ARTICLES OF MANUFACTURE FASHIONED FROM HYDRAULICALLY SETTABLE SHEETS

[75] Inventors: Per Just Andersen; Simon K. Hodson, both of Santa Barbara, Calif.

[73] Assignee: E. Khashoggi Industries, Santa Barbara, Calif.

[*] Notice: The portion of the term of this patent subsequent to Jan. 31, 2012, has been disclaimed.

[21] Appl. No.: 164,012

[22] Filed: Dec. 7, 1993

Related U.S. Application Data

[63] Continuation-in-part of Ser. No. 19,151, Feb. 17, 1993, Pat. No. 5,453,310, which is a continuation-in-part of Ser. No. 929,898, Aug. 11, 1992, abandoned, said Ser. No. 164,012, Dec. 7, 1993, is a continuation-in-part of Ser. No. 95,662, Jul. 21, 1993, Pat. No. 5,385,764, which is a continuation-in-part of Ser. No. 929,898, Aug. 11, 1992, abandoned, which is a continuation-in-part of Ser. No. 101,500, Aug. 3, 1993, abandoned, which is a continuation-in-part of Ser. No. 929,898, Aug. 11, 1992, abandoned.

[51] Int. Cl.$^6$ .............................. B32B 13/00; C04B 14/00
[52] U.S. Cl. .................. 428/34.5; 106/400; 106/638; 206/449; 206/524.3; 206/524.6; 206/524.7; 428/34.7; 428/36.4; 428/312.4; 428/703
[58] Field of Search .......................... 428/703, 34.4, 428/34.5, 34.7, 36.4, 312.4; 106/210, 400, 713, 638, 730; 206/449, 524.3, 524.6, 524.7

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |
| 882,538 | 3/1908 | Sargent . |
| 1,223,834 | 4/1917 | Sanger . |
| 1,234,692 | 7/1917 | Poznanski . |

(List continued on next page.)

FOREIGN PATENT DOCUMENTS

| | | |
|---|---|---|
| 0263723A2 | 4/1988 | European Pat. Off. . |
| 0290007 A1 | 11/1988 | European Pat. Off. . |
| 0340707 A2 | 11/1989 | European Pat. Off. . |
| 0340765 A2 | 11/1989 | European Pat. Off. . |
| 0497151 A1 | 8/1992 | European Pat. Off. . |
| 3011330 | 3/1980 | Germany . |

(List continued on next page.)

OTHER PUBLICATIONS

Clauson-Kaas, *Opsproject Glasfiberbeton i Byggeriet* (1987). (See Statement of Relevance as there is no English translation).

Reingold, Cans, Steel, in *The Wiley Encyclopedia of Packaging Technology*, 109–118, Marilyn Bakker ed (1986).

(List continued on next page.)

*Primary Examiner*—Marion E. McCamish
*Assistant Examiner*—Blaine R. Copenheaver
*Attorney, Agent, or Firm*—Workman, Nydegger & Seeley

[57] ABSTRACT

Articles of manufacture fashioned from sheets having a hydraulically settable matrix are disclosed, particularly food containers, beverage containers and packaging containers. Suitable compositions are prepared by mixing together a hydraulic binder, water, and appropriate additives (such as aggregates, fibers, and rheology-modifying agents) which impart predetermined properties so that a sheet formed therefrom has the desired performance criteria. Hydraulically settable sheets are formed from the mixture by extrusion, then calendering the sheets using a set of rollers and then drying the sheets in an accelerated manner to substantially harden the sheets. The resulting hydraulically settable sheets may have properties substantially similar to sheets made from presently used materials like paper, cardboard, polystyrene, or plastic. The sheets can be laminated, corrugated, coated, printed on, scored, perforated, cut, folded, rolled, spiral wound, molded, assembled and seamed to mass produce articles of manufacture from the sheets.

144 Claims, 32 Drawing Sheets

U.S. PATENT DOCUMENTS

| | | |
|---|---|---|
| 1,874,974 | 8/1932 | Hammanecker . |
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler . |
| 2,700,615 | 1/1955 | Heismer . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr. et al. . |
| 2,959,489 | 11/1960 | Wagner . |
| 3,006,615 | 10/1961 | Mason, Jr. . |
| 3,027,266 | 3/1962 | Wikne . |
| 3,030,258 | 4/1962 | Wagner . |
| 3,042,578 | 7/1962 | Denning . |
| 3,149,986 | 9/1964 | Zelmanoff . |
| 3,169,877 | 2/1965 | Bartoli et al. . |
| 3,215,549 | 11/1965 | Ericson . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,432,317 | 3/1969 | Kelly et al. . |
| 3,468,993 | 9/1969 | Bierlich . |
| 3,470,005 | 9/1969 | Fachsenberg et al. . |
| 3,492,385 | 1/1970 | Simunic . |
| 3,520,707 | 7/1970 | Steinberg et al. . |
| 3,526,172 | 9/1970 | Stuart . |
| 3,558,071 | 1/1971 | Gabriels . |
| 3,579,366 | 5/1971 | Rehmar . |
| 3,683,760 | 8/1972 | Silva . |
| 3,697,366 | 10/1972 | Harlock ................................. 428/703 |
| 3,745,891 | 7/1973 | Bodendoerfer . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,806,571 | 4/1974 | Ronnmark et al. . |
| 3,824,107 | 7/1974 | Welant . |
| 3,827,895 | 8/1974 | Copeland . |
| 3,841,885 | 10/1974 | Jakel . |
| 3,855,908 | 12/1974 | Schmidt et al. . |
| 3,857,715 | 12/1974 | Humphrey . |
| 3,902,912 | 9/1975 | Wolf . |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,954,490 | 5/1976 | Cockram . |
| 3,968,004 | 7/1976 | Coffey et al. . |
| 3,979,217 | 9/1976 | Sutton . |
| 3,989,534 | 11/1976 | Plunguian . |
| 3,998,651 | 12/1976 | Baudouin et al. . |
| 4,002,482 | 1/1977 | Coenen . |
| 4,017,321 | 4/1977 | Reighter . |
| 4,017,324 | 4/1977 | Eggers . |
| 4,028,454 | 6/1977 | Davidovits et al. . |
| 4,040,851 | 8/1977 | Ziegler . |
| 4,053,346 | 10/1977 | Amberg et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,077,809 | 3/1978 | Plunguian et al. . |
| 4,084,980 | 4/1978 | Motoki . |
| 4,085,001 | 4/1978 | Fukuwateri . |
| 4,093,690 | 6/1978 | Murray . |
| 4,115,135 | 9/1978 | Goeman . |
| 4,117,059 | 9/1978 | Murray . |
| 4,117,060 | 9/1978 | Murray . |
| 4,121,402 | 10/1978 | Cress et al. . |
| 4,132,555 | 1/1979 | Barrable . |
| 4,133,619 | 1/1979 | Wise . |
| 4,135,940 | 1/1979 | Peltier . |
| 4,157,998 | 6/1979 | Berntsson et al. . |
| 4,158,989 | 6/1979 | Barr . |
| 4,159,302 | 6/1979 | Greve et al. . |
| 4,185,923 | 1/1980 | Bouette et al. . |
| 4,187,768 | 2/1980 | Suzuki . |
| 4,188,231 | 2/1980 | Valore . |
| 4,209,336 | 6/1980 | Previte . |
| 4,225,247 | 9/1980 | Hodson . |
| 4,225,357 | 9/1980 | Hodson . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,244,781 | 1/1981 | Heckman . |
| 4,257,710 | 3/1981 | Delcoigne et al. . |
| 4,261,754 | 4/1981 | Kenchel et al. . |
| 4,272,198 | 6/1981 | Velikov et al. . |
| 4,279,695 | 7/1981 | Winterbottom . |
| 4,287,247 | 9/1981 | Reil et al. . |
| 4,299,790 | 11/1981 | Greenberg . |
| 4,305,758 | 12/1981 | Powers et al. . |
| 4,310,996 | 1/1982 | Mulvey et al. . |
| 4,313,997 | 2/1982 | Ruff et al. . |
| 4,326,891 | 4/1982 | Sadler . |
| 4,353,748 | 10/1982 | Birchall et al. . |
| 4,362,679 | 12/1982 | Malinowski . |
| 4,370,166 | 1/1983 | Powers et al. . |
| 4,373,957 | 2/1983 | Pedersen . |
| 4,377,440 | 3/1983 | Gasland . |
| 4,383,862 | 5/1983 | Dyson . |
| 4,406,703 | 9/1983 | Guthrie et al. . |
| 4,410,366 | 10/1983 | Birchall et al. . |
| 4,415,366 | 11/1983 | Copening . |
| 4,427,610 | 1/1984 | Murray . |
| 4,428,741 | 1/1984 | Westphal . |
| 4,428,775 | 1/1984 | Johnson et al. . |
| 4,452,596 | 6/1984 | Clauss et al. . |
| 4,460,348 | 7/1984 | Iioka et al. . |
| 4,462,835 | 7/1984 | Car . |
| 4,490,130 | 12/1984 | Konzal et al. . |
| 4,497,662 | 2/1985 | Chisholm et al. . |
| 4,508,595 | 4/1985 | Gasland . |
| 4,522,772 | 6/1985 | Bevan . |
| 4,524,828 | 6/1985 | Sabins et al. . |
| 4,529,663 | 7/1985 | Lancaster et al. . |
| 4,533,393 | 8/1985 | Neuschaeffer et al. . |
| 4,536,173 | 8/1985 | Puls . |
| 4,552,463 | 11/1985 | Hodson . |
| 4,562,218 | 12/1985 | Fornadel et al. . |
| 4,571,233 | 2/1986 | Konzal . |
| 4,581,003 | 4/1986 | Ito et al. . |
| 4,585,486 | 4/1986 | Fujita et al. . |
| 4,588,443 | 5/1986 | Bache . |
| 4,613,627 | 9/1986 | Sherman et al. . |
| 4,619,636 | 10/1986 | Bogren . |
| 4,621,763 | 11/1986 | Brauner . |
| 4,622,026 | 11/1986 | Ito et al. . |
| 4,623,150 | 11/1986 | Moehlman et al. . |
| 4,636,345 | 1/1987 | Jensen et al. . |

| | | |
|---|---|---|
| 4,637,860 | 1/1987 | Harper et al. |
| 4,640,715 | 2/1987 | Heitzmann et al. |
| 4,642,137 | 2/1987 | Heitzman et al. |
| 4,650,523 | 3/1987 | Kikuchi. |
| 4,655,981 | 4/1987 | Nielsen et al. |
| 4,680,023 | 7/1987 | Varano. |
| 4,707,187 | 11/1987 | Tsuda et al. |
| 4,746,481 | 5/1988 | Schmidt. |
| 4,754,589 | 7/1988 | Leth. |
| 4,755,494 | 7/1988 | Ruben. |
| 4,772,439 | 9/1988 | Trevino-Gonzalez. |
| 4,780,180 | 10/1988 | Take et al. |
| 4,784,693 | 11/1988 | Kirkland et al. |
| 4,786,670 | 11/1988 | Tracy et al. |
| 4,789,244 | 12/1988 | Dunton et al. |
| 4,797,161 | 1/1989 | Kirchmayr et al. |
| 4,799,961 | 1/1989 | Friberg. |
| 4,836,940 | 6/1989 | Alexander. |
| 4,840,672 | 6/1989 | Baes. |
| 4,842,649 | 6/1989 | Heitzman et al. |
| 4,872,913 | 10/1989 | Dunton et al. |
| 4,888,059 | 12/1989 | Yamaguchi et al. |
| 4,889,428 | 12/1989 | Hodson. |
| 4,892,589 | 1/1990 | Kirkland et al. |
| 4,895,598 | 1/1990 | Hedberg et al. |
| 4,912,069 | 3/1990 | Ruben. |
| 4,923,665 | 5/1990 | Andersen et al. |
| 4,927,043 | 5/1990 | Vanderlaan. |
| 4,927,573 | 5/1990 | Alpár et al. |
| 4,939,192 | 7/1990 | t'Sas. |
| 4,944,595 | 7/1990 | Hodson. |
| 4,948,429 | 8/1990 | Arfaei. |
| 4,976,131 | 12/1990 | Grims et al. |
| 4,979,992 | 12/1990 | Bache. |
| 4,985,119 | 1/1991 | Vinson et al. |
| 4,999,056 | 3/1991 | Rasmussen. |
| 5,018,379 | 5/1991 | Shirai et al. |
| 5,021,093 | 6/1991 | Beshay. |
| 5,030,282 | 7/1991 | Matsuhashi et al. |
| 5,039,003 | 8/1991 | Gordon et al. |
| 5,039,560 | 8/1991 | Durgin et al. |
| 5,047,086 | 9/1991 | Hayakawa et al. |
| 5,051,217 | 9/1991 | Alpár et al. |
| 5,076,986 | 12/1991 | Delvaux et al. |
| 5,085,366 | 2/1992 | Durgin et al. |
| 5,102,596 | 4/1992 | Lempfer et al. |
| 5,106,880 | 4/1992 | Miller et al. |
| 5,108,677 | 4/1992 | Ayres. |
| 5,108,679 | 4/1992 | Rirsch et al. |
| 5,154,771 | 10/1992 | Wada et al. |
| 5,167,894 | 12/1992 | Baumgarten. |
| 5,184,995 | 2/1993 | Kuchenbecker. |
| 5,232,496 | 8/1993 | Jennings et al. |
| 5,269,845 | 12/1993 | Grunau et al. |
| 5,290,355 | 3/1994 | Jakel. |
| 5,316,624 | 5/1994 | Racine. |
| 5,338,349 | 8/1994 | Farrar. |
| 5,366,549 | 11/1994 | Imaizumi. |

FOREIGN PATENT DOCUMENTS

| | | |
|---|---|---|
| 2841172 | 4/1980 | Germany. |
| 47-20190 | 9/1972 | Japan. |
| 51-2729 | 1/1976 | Japan. |
| 53-16730 | 2/1978 | Japan. |
| 54-31320 | 3/1979 | Japan. |
| 54-48821 | 4/1979 | Japan. |
| 55-37407 | 3/1980 | Japan. |
| 55-100256 | 7/1980 | Japan. |
| 56-17965 | 2/1981 | Japan. |
| 58-120555 | 7/1983 | Japan. |
| 60-260484 | 12/1985 | Japan. |
| 60-264375 | 12/1985 | Japan. |
| 62-36055 | 2/1987 | Japan. |
| 62-36056 | 2/1987 | Japan. |
| 62-39204 | 2/1987 | Japan. |
| 62-46941 | 2/1987 | Japan. |
| 62-151304 | 7/1987 | Japan. |
| 62-253407 | 11/1987 | Japan. |
| 63-00551 | 1/1988 | Japan. |
| 63-00552 | 1/1988 | Japan. |
| 63-123851 | 5/1988 | Japan. |
| 63-210082 | 8/1988 | Japan. |
| 63-218589 | 9/1988 | Japan. |
| 63-248759 | 10/1988 | Japan. |
| 63-310780 | 12/1988 | Japan. |
| 64-37478 | 2/1989 | Japan. |
| 2-51460 | 2/1990 | Japan. |
| 2-141484 | 5/1990 | Japan. |
| 2-190304 | 7/1990 | Japan. |
| 3-80141 | 4/1991 | Japan. |
| 3-153551 | 7/1991 | Japan. |
| 3-187962 | 8/1991 | Japan. |
| 3-202310 | 9/1991 | Japan. |
| 3-202313 | 9/1991 | Japan. |
| 3-208847 | 9/1991 | Japan. |
| 4-70304 | 3/1992 | Japan. |
| 453555 | 10/1936 | United Kingdom. |
| 490820 | 8/1938 | United Kingdom. |
| 2086748 | 5/1982 | United Kingdom. |
| 2192392 | 1/1988 | United Kingdom. |
| 2220934 | 1/1990 | United Kingdom. |
| WO 87/00828 | 2/1987 | WIPO. |
| WO 91/12186 | 8/1991 | WIPO. |
| WO 93/20990 | 10/1993 | WIPO. |

OTHER PUBLICATIONS

Andersen, *Effect of Organic Superplasticizing Admixtures and Their components on Zeta Potential and Related Properties of Cement Materials*, Pennsylvania State University (1987).

Andersen, *Rheology of Cement Paste, Mortar and Concrete.*

Andersen et al, *Tailoring of Cement–Bound Materials by the Use of Packing and Rheological Models*, American Ceramic Society (1988).

Clauson–Kaas et al., *Ekstrudering afFiberbeton–delrapport*, Byggeteknik, Teknologisk Institut (1987). (English Translation—*Extrusion of Fiber Concrete–Interim Report* Dept. of Building Technology, Technological Institute of Denmark.).

Ferretti, *Distributed Reinforcement Concrete Pipes: An Innovative Product*, Concrete International (May 1993).

Robinson, *Extrusion Defects.*

Roy et al, *Processing of Optimized Cements and Concretes via Particle Packing*, MRS Bulletin (Mar. 1993).

*Cementing the Future: A New Extrusion Technology*, ACBM, vol. 6, No. 1, (Spring 1994).

*Thermoforming Process Guide*, Dow Plastics.

Shah, *Recent Trends In The Science and Technology of Concrete*, Trends in Science and Technology of Concrete.

Nakano et al., *Cement Compositions Suitable for Extrusion Molding of High–Strength Building Materials*, Chemical Abstracts, vol. 115, pg. 314 (1991).

Irving Kaye, Adhesives, in *The Wiley Encyclopedia of Packaging Technology* 14–16 (Marilyn Bakker ed., 1986).

Bemis Company, Bags, Paper, in *The Wiley Encyclopedia of Packaging Technology* 36–39 (Marilyn Bakker ed., 1986).

Leonard F. Swec, Boxes, Corrugated, in *The Wiley Encyclopedia of Packaging Technology* 66–76 (Marilyn Bakker ed., 1986).

Larry Lynch and Julia Anderson, Boxes, Rigid–Paperboard, in *The Wiley Encyclopedia of Packaging Technology* 76–79 (Marilyn Bakker ed., 1986).

J.C. Sciaudone, Boxes, Rigid–Plastic, in *The Wiley Encyclopedia of Packaging Technology* 78–79 (Marilyn Bakker ed., 1986).

J.M. Gresher, Carded Packaging, in *The Wiley Encyclopedia of Packaging Technology* 124–129 (Marilyn Bakker ed., 1986).

J.V. Bousum, Carriers, Beverage, in *The Wiley Encyclopedia of Packaging Technology* 129–132 (Marilyn Bakker ed., 1986).

T.H. Bohrer, Cartons, Folding, in *The Wiley Encyclopedia of Packaging Technology* 146–152 (Marilyn Bakker ed., 1986).

R.E. Lisiecki, Cartons, Gabletop, in *The Wiley Encyclopedia of Packaging Technology*, 152–154 (Marilyn Bakker ed., 1986).

R.F. Bardsley, Form/Fill/Seal, Horizontal, in *The Wiley Encyclopedia of Packaging Technology* 364–367 (Marilyn Bakker ed., 1986).

George Moyer, Form/Fill/Seal, Vertical, in *The Wiley Encyclopedia of Packaging Technology* 367–369 (Marilyn Bakker ed., 1986).

M.B. Eubanks, Cans, Composite, in *The Wiley Encyclopedia of Packaging Technology* 94–98 (Marilyn Bakker ed., 1986).

Joseph F. Hanlon, Fibre Tubes, Cans, and Drums, in *Handbook of Package Engineering* 7–1 to 7–15 (2d ed. 1984).

E.O. Kohn and F.W. Jowitt, Cans Fabrication, in *The Wiley Encyclopedia of Packaging Technology* 100–108 (Marilyn Bakker ed., 1986).

Lavin, Cans, Composite, Self–manufactured, in *The Wiley Encyclopedia of Packaging Technology* 98–100 (Marilyn Bakker ed., 1986).

Ralph K. Iler, *The Chemistry of Silica*, 430–432 (1979).

R.F. Radek, Closure Liners, in *The Wiley Encyclopedia Packaging Technology* 171–172 (Marilyn Bakker ed., 1986).

H.J. Sievers, Chub Packaging, in *The Wiley Encyclopedia Packaging Technology* 170–171 (Marilyn Bakker ed., 1986).

Bob Swientek, *Formidable Films*, Prepared Foods, Sep. 1993, at 118–121.

Materials, in *Modern Packaging Encyclopedia and Planning Guide* 54–113 (Gross et al. eds., 2d ed. 1972).

Flexible Packages, in *Modern Packaging Encyclopedia and Planning Guide* 114–126 (Gross et al. eds., 2d ed. 1972).

Rigid and Semirigid Containers, in *Modern Packaging Encyclopedia and Planning Guide* 127–192 (Gross et al. eds., 2d ed. 1972).

Labeling and Printing, in *Modern Packaging Encyclopedia and Planning Guide* 193–214 (Gross et al. eds., 2d ed. 1972).

Shipping and Protection, in *Modern Packaging Encyclopedia and Planning Guide* 215–240 (Gross et al. eds., 2d ed. 1972).

James E. Kline, *Packaging in Paper and Paperboard: Manufacturing and Converting Fundamentals* 196–211 (2d ed. 1991).

Hewlett, *Physico–Chemical Mechanisms of Admixtures* Lecture, CGLI Advanced Concrete Technology Course, Cement and Concrete Association Training Centre (1975).

Klieger, *Studies of the Effect of Entrained Air on the Strength and Durability of Concretes Made with Various Maximum Sizes of Aggregate*, Research and Development Laboratories of the Portland Cement Association (Oct. 1952).

Sutherland, *Air–Entrained Concrete, Cement and Concrete Association*, Cement and Concrete Association (1970).

Eriksen and Andersen, *Foam Stability Experiments on Solutions Containing Superplasticizing and Air–entraining Agents for Concrete*, The Technological Institute, Department of Building Technology, Taastrup, Denmark.

Litvan and Sereda, *Particulate Admixture for Enhanced Freeze–Thaw Resistance of Concrete*, Cement and Concrete Research, vol. 8, pp. 53–60, Pergamon Press, Inc. (1978).

Greninger, Jr. and Krumel, *Alkyl and Hydroalkylalkylcellulose*, Dow Chemical U.S.A., Midland, Oregon.

Leaversuch, *Blowing Agents: Products Minimize Tradeoffs as CFC Phase–out Takes Effect*, Modern Plastics, (1993).

Purton, *The Effect of Sand Grading on the Calcium Silicate Brick Reaction*, Cement and Concrete Research vol. 4, pp. 13–29 (1974).

Bache, *Densified Cement/Ultra–Fine Particle–Based Materials*, Presented at the Second International Conference on Superplasticizers in Concrete in Ottawa, Canada (Jun. 10–12, 1981).

Knudsen, *On Particle Size Distribution in Cement Hydration*, Presented to the 7th International Congress on the Chemistry of Cement, Paris (1980).

Collepardi, Monosi, Moriconi, and Corradi, *Combined Effect of Lignosulfate and Carbonate on Pure Portland Clinker Compounds Hydration. I. Tetracalcium Aluminoferrite Hydration*, Cement and Concrete Research, vol. 10, pp. 455–462 (1980).

Andersen, *Effects of W/C–Ration and Dispersion on the Pore Size Distribution of Cement Paste and Concrete*, Paper prepared for MRL by Per Just Anderson (Aug. 1988).

Sun, Lu, Touse, and Young, *The Composition of Hydrated DSP Cement Pastes*.

Mass, *Premixed Cement Paste*, Concrete International (Nov. 1989).

Roy, *New Strong Cement Materials: Chemically Bonded Ceramics*, Science, vol. 235 (Feb. 1987).

*Doing More With Less: Optimizing Concrete Mix*, Better Roads (Aug. 1990).

Westman and Hugill, *The Packing of Particles* (1930).

Alexanderson, *Self–Smoothing Floors Based on Polymer Cement Concrete*, Concrete International (Jan. 1990).

Manson, Chen, Vanderhoff, Mehta, Cady, et al., *Use of Polymers in Highway Concrete*, National Cooperative Highway Research Program Report 190 (1978).

Wagner, *Polymer Modification of Portland Cement Systems*, Chemtech (Feb. 1973).

Bach, *Cement–Based Products Processed the Plastics Way*.

Maries, *The Activation of Portland Cement by Carbon Dioxide*.

Bailey, *Flexural Strength of Cements*, Nature, vol. 292 (Jul. 1981).

Miyake, Ando, and Sakai, *Superplasticized Concrete Using Refined Lignosulfate and its Action Mechanism*, Cement and Concrete Research, vol. 15, pp.295–302 (1985).

*Space–Age Concrete That May Sub for Steel*.

Weiss, Gartner, and Tresouthick, *High Tensile Cement Pastes as a Low–Energy Substitute for Metals, Plastics, Ceramics, and Wood. Phase 1: Preliminary Technological Evaluation*, CTL Project CR7851–4330, Final Report, Prepared for U.S. Dept. of Energy (Nov. 1984).

Studt, *New Advances Revive Interest In Cement–Based Materials*, R&D Magazine (Nov. 1992).

Shilstone, Sr., *Mix Temperature and $$$$$*, Concrete Producer News (Oct. 1989).

Shilstone, Sr., *Concrete Mixture Optimization by Coarseness Factor, Mortar Factor & Particle Distribution*, Concrete International (Dec. 1989).

Shilstone, Sr., *Mixture Optimization for Fast–Track*, Report for American Concrete Institution Convention, San Diego, CA.

Young, *Macro–Defect–Free Cement: A Review*, Mat. Res. Soc. Symp. Proc., vol. 179 (1991).

Blaha, *Ideas in Concrete*, Concrete Products (Sep. 1992).

Laenger, *Designing an Extruder with Allowance for the Properties of Ceramic Extrusion Compounds–Part 1*, cfi/Ber. DKG 67, No. 4 (1990).

Laenger, *Extruderauslegung unter Berucksichtingung . . .* English Translation—*Designing an Extruder with Allowance for the Properties of Ceramic . . . Part 2a*, cfi/Ber. DKG 68, No. 9 (1991)

Laenger, *Extruderauslegung unter Berucksichtingung . . .* English Translation—*Designing an Extruder with Allowance for the Properties of Ceramic . . . Part 2b*, cfi/Ber. DKG 68, No. 10/11 (1991).

Laenger, *Extruderauslegung unter Berucksichtingung . . .* English Translation—*Designing an Extruder with Allowance for the Properties of Ceramic . . . Part 3*, cfi/Ber. DKG 69 No. 3 (1992).

Laenger, *Extruderauslegung unter Berucksichtingung . . .* English Translation—*Designing an Extruder with Allowance for the Properties of Ceramic . . . Part 4a*, cfi/Ber. DKG 69 No. 7/8 (1992).

Laenger, *Extruderauslegung unter Berucksichtingung . . .* English Translation—*Designing an Extruder with Allowance for the Properties of Ceramic . . . 4b*, cfi/Ber. DKG 69 No. 9 (1992).

Laenger, *Extruderauslegung unter Berucksichtingung . . .* English Translation—*Designing an Extruder with Allowance for the Properties of Ceramic . . . Part 5a*, cfi/Ber. DKG 69 No. 10 (1992).

Laenger, *Extruderauslegung unter Berucksichtingung . . .* English Translation—*Designing an Extruder with Allowance for the Properties of Ceramic . . . Part 5b*, cfi/Ber. DKG 70 No. 3 (1993).

Benbow, Oxley, and Bridgewater, *The Extrusion Mechanics of Pastes—The Influence of Paste Formulation on Extrusion Parameters*, Chemical Engineering Science, vol. 42, No. 9, pp. 2151–2162 (1987).

Fordos, *Natural or Modified Cellulose Fibres as Reinforcement in Cement Composites*, Concrete Technology & Design vol. 5, Natural Fiber Reinforced Cement and Concrete (1988).

Collepardi, Corradi, and Valente, *Influence of Polymerization of Sulfonated Naphthalene Condensate and its Interaction with Cement*.

Soroushian, Arola, and Shah, *Recycling of Wood and Paper in Cementitious Materials*, Mat. Res. Soc. Sypm. Proc., vol. 266 (1992).

Algnesberger, *The Use of Anionic Melamine Resin as a Concrete Additive*, Cement Lime and Gravel (Sep. 1973).

Andersen, Per Just, *Control and Monitoring of Concrete Production: A Study of Particle Packing and Rheology*, The Danish Academy of Technical Sciences (1990).

D. Satas, Coating, Equipment, in *The Wiley Encyclopedia of Packaging Technology*, 186–191 (Marilyn Bakker ed., 1986).

J. Lentz, Printing, in *The Wiley Encyclopedia of Packaging Technology* 554–559 (Marilyn Bakker ed., 1986).

J.J. Devlin & H.M. Farnham, Waxes, in *The Wiley Encyclopedia of Packaging Technology* 697–700 (Marilyn Bakekr ed., 1986).

Tricia Hyland, *F–Flute Inches Its Way Into Folding Carton Market*, Paperboard Packaging, at 28–29 (May 1993).

James E. Kline, *Corrugating Operations and Raw Materials in Paper and Paperboard: Manufacturing and Converting Fundamentals* 184–195 (2d ed. 1991).

Zukowski and Struble, *Rheology of Cementitious Systems*, MRS Bulletin, (Mar. 1993).

Lewis and Kriven, *Microstructure–Property Relationships in Macro–Defect–Free Cement*, MRS Bulletin, (Mar. 1993).

Young and Berg, *Introduction to MDF Cement Composites*, ACBM vol. 1, No. 2, (Fall 1989).

*Zien In The Food Industry*, Freeman Industries, Inc., P.O. Box 415, Tuckahoe, NY 10707–0415 USA.

Davidson and Marshall Sittig, *Water–Soluble Resins*, New York: Reinhold Publishing Corp., Chapman & Hall, Ltd., London.

Balaguru and Kendzulak, *Flexural Behavior of Slurry Infiltrated Fiber Concrete (SIFCON) Made Using Condensed Silica Fume*.

Naaman and Homrich, *Tensile Stress–Strain Properties of SIFCON*, ACI Materials Journal, (May–Jun. 1989).

Stix, *Concrete Solutions*, Scientific American, (Apr. 1993).

Strabo, *Cementbuserede Hybrldkompositter*, Byggeteknik Teknologisk Institut, (1987). English Translation—Strabo, Andersen, and Clauson-Kaas, *Cement–Based Hybrid Composites*, (1987).

Strabo et al, *Fiberbeton Teknology.*, Byggeteknik Teknologisk Institut, (1986) English Translation—Strabo, Clauson-–Kaas, Chatterji, and Thaulow, *Fiber Concrete Technology TR–Project*, (1986).

*Nye Metoder I Beton Kan Betyde Teknisk Knock–Out for Plast*. English Translation—"New Method for Concrete May Mean Technical Knock–Out for Plastic," The Engineer, No. 14, (1986).

*Fiberbeton–nyt TyByageteknik* English Translation—*"Fiber Concrete News,"* The Technological Institute of Denmark, Pamphlet No. 1, (Oct. 1987).

Andersen, *Tailoring of Concrete Materials*, R&H Annual Review, (1988).

Ashby, *Materials Selection in Engineering Design*, Indian Journal of Technology, vol. 28, (Jun.–Aug. 1990).

Ashby, *Overview No. 80: On the Engineering Properties of Materials*, Acta Metall, vol. 3, No. 5 pp. 1273–1293, 1989.

Johansen, Vagn and Andersen, *Particle Packing and Concrete Properties*, Materials Science of Concrete II, pp. 111–147.

Maycock and Skalny, *Carbonation of Hydrated Calcium Silicates*, Cement and Concrete Research, vol. 4, pp. 69–76, (1974).

Suzuki, Nishikawa, and Ito, *Formation and Carbonation of C—S—H In Water*, Cement and Concrete Research, vol. 15, pp. 213–224, (1985).

Bukowski and Berger, *Reactivity a Strength Development of $CO_2$ Activated Non–Hydraulic Calcium Silicates*, Cement and Concrete Research, vol. 9, pp. 57–68, (1979).

Berger, Young, and Leung, *Acceleration of Hydration of Calcium Silicates by Carbon Dioxide Treatment*, Nature Physical Science, vol. 240, Nov. 6, (1972).

Verbeck, *Carbonation of Hydrated Portland Cement*, Cement and Concrete Special Technical Publication No. 203, (1958).

*Plastic–Forming Processes.*

Strabo et al., *Nye Formivningsmetoder Til Fiberbeton.* English Translation—Strabo et al, *"New Design Methods for Fiber Concrete,"* Technological Institute of Denmark, Dept. of Building Technology, (Apr. 1987).

Finn, Strabo et al., *Ekstrudering AF Fiberbeton.* English Translation—Strabo, et al, *"Extrusion of Fiber Concrete,"* Danish Technological Institute, Dept. of Building Technology, (Oct. 1987).

Knab, Clifton, and Ings, *Effects of Maximum Void Size and Aggregate Characteristics on the Strength of Mortar*, Cement and Concrete Research. vol. 13 pp. 383–390, (1983).

Unwalla and Green, editors, *Recycled Materials for Making Concrete*, The Indian Concrete Journal, vol. 53, No. 9, (Sep. 1979).

Rosenberg and Gaidis, *A New Mineral Admixture for High-Strength Concrete–Proposed Mechanism for Strength Enhancement*, Second International Conference on the Use of Fly Ash, Silica Fume, Slag and Natural Pozzolans in Concrete, (Apr. 21–25, 1986).

Brown, Ledbetter, and Jennings, *An Investigation of a High Speed Shear Mixer on Selected Pastes and Mortar*, Mat. Res. Soc. Symp. Proc vol. 137, (1989).

*The Colcrete Process*, Undated Publication.

*The Coating Process for Paper*, (1993).

Niel, *Supplementary Paper II–117. The Influence of Alkali-Carbonate on the Hydration of Cement*, (1968).

*Report on the Panel on Solids Processing.*

Lawrence, *The Properties of Cement Paste Compacted Under High Pressure: Research Report 19*, Cement and Concrete Association Research Report 19, (Jun. 1969).

Jones and Berard, *Raw Materials Processing*, Ceramics: Industrial Processing and Testing, Iowa State University Press, (1972).

Hlavac, *The Technology of Ceramics*, Glass Science and Technology, 4: The Technology of Glass and Ceramics, Elsevier Publishing, (1983).

Skalny and Bajza, *Properties of Cement Pastes Prepared by High Pressure Compaction*, ACI Journal, (Mar. 1970).

Lecznar and Barnoff, *Strength of Neat Cement Pastas Molded Under Pressure*, Journal of the American Concrete Institute Concrete Briefs, (Feb. 1961).

Roy, Gouda, and Bobrowsky, *Very High Strength Cement Pastes Prepared by Hot Pressing and Other High Pressure Techniques*, Cement and Concrete Research, vol. 2, pp. 349–366, (1972).

B. W. Attwood, Paperboard in *The Wiley Encyclopedia of Packaging Technology* 500–506 (Marilyn Bakker ed., 1986).

G. A. Baum, et al., Paper in *Kirk–Othmer Concise Encyclopedia of Chemical Technology* 834–836 (Martin Grayson ed., 1985).

George S. Brady & Henry R. Clauser, *Materials Handbook* 588–594 (1991).

James E. Kline, Paper and Paperboard Properties in *Paper and Paperboard Manufacturing and Converting Fundamentals* 19–28 (2d ed. 1982).

Richard J. Lewis, Sr., *Condensed Chemical Dictionary* 870 (12th ed. 1993).

Stearns T. Putnam, et al., Papermaking Additives in *Kirk–Othmer Concise Encyclopedia of Chemical Technology* 836–837 (Martin Grayson ed., 1985).

M. Sikora, Paper in *The Wiley Encyclopedia of Packaging Technology* 497–500 (Marilyn Bakker ed., 1986).

Vrana, *Khashoggi Kin Reported Planning Private Placement of Shares in New Container Firm*, (1993).

Skalny, Phillips, and Cahn, *Low Water to Cement Ratio Concretes*, Cement, and Concrete Research, vol. 3, pp. 29–40, (1973).

Yudenfreund, Skalny, Mikahil, and Brunauer, *Hardened Portland Cement Pastes of Low Porosity. II. Exploratory Studies. Dimensional Changes*, Cement and Concrete Research, vol. 2, pp. 331–348, (1972).

Bajza, *On The Factors Influencing the Strength of Cement Compacts*, Cement and Concrete Research, vol. 2, pp. 67–78, (1972).

ARTICLES OF MANUFACTURE FASHIONED FROM HYDRAULICALLY SETTABLE SHEETS

This application is a continuation-in-part of U.S. Ser. No. 08/019,151, filed Feb. 17, 1993, now U.S. Pat. No. 5,453,310, which is a continuation-in-part of U.S. Ser. No. 07/929,898, filed Aug. 11, 1992, now abandoned. This application is also a continuation-in-part of U.S. Ser. No. 08/095,662, filed Jul. 21, 1993, now U.S. Pat. No. 5,385,764, which is a continuation-in-part of U.S. Ser. No. 07/929,898, filed Aug. 11, 1992, now abandoned. This application is also a continuation-in-part of U.S. Ser. No. 08/101,500, filed Aug. 3, 1993, now abandoned, which is a continuation-in-part of U.S. Ser. No. 07/929,898, filed Aug. 11, 1992, now abandoned.

BACKGROUND OF THE INVENTION

1. The Field of the Invention.

The present invention relates to articles of manufacture, particularly containers and packaging materials manufactured from hydraulically settable sheets. More particularly, the present invention relates to mass produced containers or parts of containers, including those used to hold, dispense, portion, or protect food, beverages, or any type of object or liquid. The hydraulically settable sheets can be used to make containers in much the same manner as paper, cardboard, plastic, polystyrene, or metals.

2. Related Applications.

This application is a continuation-in-part of U.S. patent application Ser. No. 08/019,151, entitled "Cementitious Materials for Use in Packaging Containers and Their Methods of Manufacture," and filed Feb. 17, 1993, in the names of Per Just Andersen, Ph.D., and Simon K. Hodson, now issued as U.S. Pat. No. 5,453,310. This application is also a continuation-in-part of U.S. patent application Ser. No. 08/095,662, entitled "Hydraulically Settable Containers And Other Articles for Storing, Dispensing, and Packaging Food and Beverages and Method For Their Manufacture," and filed Jul. 21, 1993, in the names of Per Just Andersen, Ph.D., and Simon K. Hodson, now U.S. Pat. No. 5,385,764. This application is also a continuation-in-part of U.S. patent application Ser. No. 08/101,500, entitled "Methods and Apparatus for Manufacturing Moldable Hydraulically Settable Sheets Used in Making Containers, Printed Materials, and Other Objects," and filed Aug. 3, 1993 in the names of Per Just Andersen, Ph.D. and Simon K. Hodson now abandoned. Each of these applications is also a continuation-in-part of U.S. patent application Ser. No. 07/929,898, entitled "Cementitious Food and Beverage Storage, Dispensing, and Packaging Containers and the Methods of Manufacturing Same," filed Aug. 11, 1992, in the names of Per Just Andersen, Ph.D., and Simon K. Hodson (now abandoned). For purposes of disclosure, each of these applications is incorporated herein by specific reference.

3. The Relevant Technology.

A. Packaging Containers.

Advanced processing and packaging techniques presently allow an enormous variety of liquid and solid goods to be stored, packaged, or shipped while being protected from harmful elements. Packaging protects goods from environmental influences and distribution damage, particularly chemical and physical influence and damage. Packaging also provides a medium for the dissemination of information to the consumer, such as the origin of manufacture, contents, advertising, instructions, brand identification, and pricing. Packaging helps protect an enormous variety of goods from gases, moisture, light, microorganisms, vermin, physical shock, crushing forces, vibration, leaking, or spilling. In addition, food or beverage products may be dispensed using specific packaging aids, such as disposable cups, plates, or boxes (such as the "clam shell" frequently used in the fast food industry for burgers, sandwiches, and salads).

Typically, most containers and cups (including disposable containers) are made from paper, cardboard, plastic, polystyrene, glass, and metal materials. Each year over one hundred billion aluminum cans, billions of glass bottles, and thousands of tons of paper and plastic are used in storing and dispensing soft drinks, juices, and beer. Outside of the beverage industry, packaging containers, and especially disposable containers, made from such materials are ubiquitous.

In order to keep certain items hot, containers made from polystyrene have been used. Although paper or plastic coated containment products can be equipped with special handles, polystyrene containers have remained the superior disposable container of choice when insulation is required, because of insulation capabilities, cost, and stability.

In spite of the more recent attention that has been given to reduce the use of paper, cardboard, plastic, polystyrene, and metal materials, they continue to be used because of strength properties and mass producibility. Moreover, for any given use for which they are designed, such materials are relatively inexpensive, lightweight, easy to mold, strong, durable, and resistant to degradation during use.

B. The Impact of Paper, Plastic, Glass and Metal.

Recently there has been a debate as to which of these materials (e.g., paper, cardboard, plastic, polystyrene, glass, or metal cans) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material. In fact, paper, cardboard, plastic, polystyrene, glass, and metal materials each has its own unique environmental weaknesses.

For example, while polystyrene itself is a relatively inert substance, its manufacture involves the use of a variety of hazardous chemicals and starting materials. Unpolymerized styrene is very reactive and therefore presents a health problem to those who must handle it. Because styrene is manufactured from benzene (a known mutagen and probably a carcinogen), residual quantities of benzene can be found in styrene. Polystyrene is very slow to degrade and discarded containers can persist for a long time.

More potentially damaging has been the use of chlorofluorocarbons (or "CFCs") in the manufacture of "blown" or "expanded" polystyrene products. This is because CFCs have been linked to the destruction of the ozone layer. In the manufacture of foams, including blown polystyrene, CFCs (which are highly volatile liquids) have been used to "expand" or "blow" the polystyrene into a foamed material, which is then molded into the form of cups, plates, trays, boxes, "clam-shell" containers, spacers, or packaging materials. Even the substitution of less "environmentally damaging" blowing agents (e.g., HCFC, $CO_2$, and pentanes) are still significantly harmful and their elimination would be beneficial.

In light of these problems, some environmental groups have favored a temporary return to the use of natural products such as paper or wood, which are believed to be more biodegradable. Nevertheless, other environmental groups have taken the opposite view in order to minimize cutting trees and depleting the forests.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. For instance, products made from paper require ten times as much steam, fourteen to twenty times the electricity, and twice as much cooling water compared to an equivalent polystyrene product. Various studies have shown that the effluent from paper manufacturing contains ten to one hundred times the amount of contaminants produced in the manufacture of polystyrene foam.

In addition, a by-product of paper manufacturing is that the environment is impacted by dioxin, a harmful toxin. Dioxin, or more accurately, 2,3,7,8-tetrachlorodibenzo[b,e]-[1,4]dioxin, is a highly toxic, contaminant, and is extremely dangerous even in very low quantities. The highest level of dioxin allowed in the discharge waters from paper mills is about 0.5 part per trillion. However, fish found downstream from paper pulp mills can contain nearly 200 parts per trillion of dioxin, with levels of 50 parts per trillion being not uncommon.

The manufacturing processes of metal cans (particularly those made of aluminum and tin), glass bottles, and ceramic containers utilize high amounts of energy because of the necessity to melt and then separately work and shape the raw metal into an intermediate or final product. These high energy and processing requirements not only utilize valuable energy resources, but they also result in significant air, water, and heat pollution to the environment. Further, while glass can be recycled, that portion which ends up in landfills is essentially nonbiodegradable. Broken glass shreds are very dangerous and can persist for years.

Even paper or cardboard, believed by many to be biodegradable, can persist for years, even decades, within landfills where they are shielded from air, light, and water, all of which are required for normal biodegradation activities. There are reports of telephone books and newspapers having been lifted from garbage dumps that had been buried for decades. This longevity of paper is further complicated since it is common to treat, coat, or impregnate paper with various protective materials which further slow or prevent degradation.

Another problem with paper, cardboard, polystyrene, and plastic is that each of these requires relatively expensive organic starting materials, some of which are nonrenewable, such as the use of petroleum in the manufacture of polystyrene and plastic. Although trees used in making paper and cardboard are renewable in the strict sense of the word, their large land requirements and rapid depletion in certain areas of the world undermines this notion. Hence, the use of huge amounts of essentially nonrenewable starting materials in making disposable containers cannot be sustained and is not wise from a long term perspective. Furthermore, the processes used to make the packaging stock raw materials (such as paper pulp, styrene, or metal sheets) are very energy intensive, cause major amounts of water and air pollution, and require significant capital requirements.

In light of the foregoing, the debate should not be directed to which of these materials is more or less harmful to the environment, but rather toward asking: Can we discover or develop an alternative material which will solve most, if not all, of the various environmental problems associated with each of these presently used materials?

C. Traditional Hydraulically Settable Materials.

In contrast, man has for millennia made great use of nondepletable inorganic materials such as clay or stone. Similarly, hydraulically settable materials such as those that contain hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive. For example, cement is a hydraulically settable binder derived from clay and limestone, and it is essentially nondepletable.

Those materials containing a hydraulic cement are generally formed by mixing hydraulic cement with water and usually some type of aggregate to form a cementitious mixture, which hardens into concrete. Ideally, a freshly mixed cementitious mixture is fairly nonviscous, semi-fluid, and capable of being mixed and formed by hand. Because of its fluid nature, concrete is generally shaped by being poured into a mold, worked to eliminate large air pockets, and allowed to harden. If the surface of the concrete structure is to be exposed, such as on a concrete sidewalk, additional efforts are made to finish the surface to make it more functional and to give it the desired surface characteristics.

Due to the high level of fluidity required for typical cementitious mixtures to have adequate workability, the uses of concrete and other hydraulically settable mixtures have been limited mainly to simple shapes which are generally large, heavy, and bulky, and which require mechanical forces to retain their shape for an extended period of time until sufficient hardening of the material has occurred. Another aspect of the limitations of traditional cementitious mixtures or slurries is that they have little or no form stability and are molded into the final form by pouring the mixture into a space having externally supported boundaries or walls.

It is precisely because of this lack of moldability (which may be the result of poor workability and/or poor form stability), coupled with the low tensile strength per unit weight, that hydraulically settable materials have traditionally been useful only for applications where size and weight are not limiting factors and where the forces or loads exerted on the concrete are generally limited to compressive forces or loads, as in, e.g., roads, foundations, sidewalks, and walls.

Moreover, hydraulically settable materials have historically been brittle, rigid, unable to be folded or bent, and having low elasticity, deflection and flexural strength. The brittle nature and lack of tensile strength (about 1–4 MPa) in concrete is ubiquitously illustrated by the fact that concrete readily cracks or fractures upon the slightest amount of shrinkage or bending, unlike other materials such as metal, paper, plastic, or ceramic. Consequently, typical cementitious materials have not been suitable for making small, lightweight objects, such as containers or thin sheets, which are better if made from materials with much higher flexibility and tensile strength per unit weight compared to typical hydraulically settable materials.

More recently, higher strength cementitious materials have been developed which might be capable of being formed into smaller, denser objects. One such material is known as "Macro-defect Free" or "MDF" concrete, such as is disclosed in U.S. Pat. No. 4,410,366 to Birchall et al. See also, S. J. Weiss, E. M. Gartner & S. W. Tresouthick, "High Tensile Cement Pastes as a Low Energy Substitute for Metals, Plastics, Ceramics, and Wood," U.S. Department of Energy CTL Project CR7851-4330 (Final Report, November 1984).

However, such high strength cementitious materials have been prohibitively expensive and would be unsuitable for making inexpensive containers where much cheaper materials better suited for such uses (e.g., paper and plastic) are readily available. Another drawback is that MDF concrete cannot be used to mass produce small lightweight objects due to the high amount of time and effort involved in forming and hardening the material and the fact that it is highly water soluble. Therefore, MDF concrete has been limited to expensive objects of simple shape.

Another problem with traditional, and even more recently developed high strength concretes, has been the lengthy curing times almost universally required for most concretes. Typical concrete products formed from a flowable mixture require a hardening period of 10–24 hours before the concrete is mechanically self-supporting, and upwards of a month before the concrete reaches a substantial amount of its maximum strength. Extreme care has had to be used to avoid moving the hydraulically settable articles until they have obtained sufficient strength to be demolded. Movement or demolding prior to this time has usually resulted in cracks and flaws in the matrix. Once self-supporting, the object could be demolded, although it has not typically attained the majority of its ultimate strength until days or even weeks later.

Since the molds used in forming hydraulically settable objects are generally reused in the production of concrete products and a substantial period of time is required for even minimal curing of the concrete, it has been difficult to economically and commercially mass produce hydraulically settable objects. Although zero slump concrete has been used to produce large, bulky objects (such as molded slabs, large pipes, or bricks which are immediately self-supporting) on an economically commercial scale, such production is only useful in producing objects at a rate of a few thousand per day. Such compositions and methods cannot be used to mass produce small, thin-walled objects at a rate of thousands per hour.

Demolding a hydraulically settable object can create further problems. As concrete cures, it tends to bond to the forms unless expensive releasing agents are used. It is often necessary to wedge the forms loose to remove them. Such wedging, if not done properly and carefully each time, often results in cracking or breakage around the edges of the structure. This problem further limits the ability to make thin-walled hydraulically settable articles or shapes other than flat slabs, particularly in any type of a commercial mass production.

If the bond between the outer wall of the molded hydraulically settable article and the mold is greater than the internal cohesive or tensile strengths of the molded article, removal of the mold will likely break the relatively weak walls or other structural features of the molded article. Hence, traditional hydraulically settable objects must be large in volume, as well as extraordinarily simple in shape, in order to avoid breakage during demolding (unless expensive releasing agents and other precautions are used).

Typical processing techniques of concrete also require that it be properly consolidated after it is placed in order to ensure that no voids exist between the forms or in the matrix. This is usually accomplished through various methods of vibration or poking. The problem with consolidating, however, is that the more extensive the consolidation of the concrete after it has been placed, the greater the segregation or bleeding of the concrete.

"Bleeding" is the migration of water to the top surface of freshly placed concrete caused by the settling of the aggregate. Excessive bleeding increases the water-to-cement ratio near the top surface of the concrete slab, which correspondingly weakens and reduces the durability of the surface of the slab. The overworking of concrete during the finishing process not only brings an excess of water to the surface, but also some fine material, thereby resulting in inhomogeneity or nonuniformity which manifest themselves as subsequent surface defects.

For each of the foregoing reasons, as well as numerous others which cannot be listed here, hydraulically settable materials have not generally had application outside of the formation of large, slab-like objects, such as in buildings, foundations, walk-ways, or highways, or as mortar to adhere bricks or cured concrete blocks. It is completely counterintuitive, as well as contrary to human experience, to even imagine (let alone actually experience) the manufacture of small lightweight objects (such as containers comparable to the lightweight materials made from paper, plastic, or metal) from hydraulically settable materials within the scope of the present invention.

Yet, due to the more recent of the tremendous environmental impact (not to mention the ever mounting political pressures) of using paper, cardboard, plastic, polystyrene, and metals for a variety of single-use, mainly disposable items such as containers, there has been an acute need (long since recognized by those skilled in the art) to find environmentally sound substitute materials, such as hydraulically settable materials, for these disposable items.

In spite of such pressures and long-felt need, the technology simply has not existed for the economic and feasible production of hydraulically settable materials which could be substituted for paper, cardboard, plastic, polystyrene, or metal sheets used to make a wide variety of disposable and nondisposable containers. However, because hydraulically settable materials essentially comprise such environmentally neutral components such as rock, sand, clay, and water, they would be ideally suited from an ecological standpoint to replace paper, cardboard, plastic, polystyrene, or metal materials as the material of choice for such applications.

Such materials are not only made from nondepletable components, they do not impact the environment nearly as much as do paper, cardboard, plastic, polystyrene, or metal. Another advantage of hydraulically settable and other inorganic materials is that they are far less expensive than paper, cardboard, plastic, polystyrene, or metals.

While paper, cardboard, plastic, polystyrene, and metal products might be comparably priced to each other, they are far more expensive than typical hydraulically settable materials. Because no rational business would ignore the economic benefit which would necessarily accrue from the substitution of significantly less expensive hydraulically settable materials for paper, cardboard, plastic, polystyrene, or metals, the failure to do so can only be explained by a marked absence of available technology to make such a substitution.

In light of the foregoing, what is needed are new materials other than paper, cardboard, plastic, polystyrene, or metal which can be used in the manufacture of containers used in storing, dispensing, and packaging liquids or solids. Such materials would represent a significant advancement in the art if they could be made without relying so heavily on the use of trees, petroleum, or other essentially nonrenewable or slowly renewing resources as the source of the primary starting material.

It would be a significant improvement in the art to provide compositions and methods which yielded hydraulically settable sheets and containers made therefrom which had properties similar to paper, cardboard, polystyrene, plastic, or metal. It would yet be a tremendous improvement in the art if such containers could be made using the same or similar manufacturing apparatus and techniques as those presently used to form containers from paper, cardboard polystyrene, plastic, or metal sheets.

It would yet be an important advancement in the art if such sheets and the containers made therefrom did not result in the generation of wastes involved in the manufacture of paper, cardboard, plastic polystyrene, or metals. In addition, it would be a significant improvement in the art if such sheets and the containers made therefrom were readily degradable into substances which are commonly found in the earth.

From a practical point of view it would be a significant improvement if such compositions and methods made possible the manufacture of containers at a cost comparable, or even superior to existing methods of manufacturing containers from existing materials. Specifically, it would be desirable to reduce the energy requirements and the initial capital investment costs for making products using existing materials.

From a manufacturing perspective, it would be a significant advancement in the art of cement making to provide cementitious mixtures and methods for mass producing cementitious sheets (and containers therefrom) which can rapidly be formed and substantially dried within a matter of minutes from the beginning of the manufacturing process.

Such materials used to manufacture food and beverage containers are disclosed and claimed herein.

SUMMARY AND OBJECTS OF THE INVENTION

The present invention relates to novel compositions and methods for the manufacture of a wide variety of containers formed, at least in part, from hydraulically settable sheets. Such containers can have properties similar to containers made from, e.g., paper, cardboard, plastic, polystyrene, or thin-walled metals. The sheets are formed from moldable, hydraulically settable mixtures and are generally in a dry or semi-dry state when formed into the desired container. Dry sheets can be remoistened in order to introduce additional flexibility and elongation to avoid splitting or cracking while the container is being formed.

Prior to or during their being formed into a container, the hydraulically settable sheets can be printed, coated, crimped, stamped, rolled, molded, folded, fluted, corrugated, and glued much like paper or cardboard. In some cases, it may be advantageous during the manufacturing process to score, score cut, or perforate the sheet to aid in forming a bend or hinge at a predetermined location within the sheet. The score can be pressed into the surface of the sheet anytime after it is formed; that is, the score can be pressed into the sheet while in the green state, in a semi-hardened state, or after it has become fully dried. The time and location of the placement of a score, score cut, or perforation will depend upon the desired purpose of the score and the properties of the hydraulically settable material in question.

The result is the ability to mass produce a wide variety of containers heretofore manufactured from paper, cardboard, plastic, polystyrene, or metal at a cost that is usually competitive with, and in most cases even superior to, the costs involved in using these other materials. The cost savings come not only from the reduced cost of the raw materials, but also from the manufacturing processes which requires less energy and lower initial capital investment.

Moreover, because the hydraulically settable containers of the present invention comprise environmentally neutral components, the manufacture of such containers impacts the environment to a much lesser extent than does the manufacture of containers from these other materials. The hydraulically settable sheets used to manufacture the containers of the present invention preferably do not require the use of high concentrations of wood pulp, petroleum products, or other natural resources as does the manufacture of containers or other objects from paper, plastic, or metals.

The major components within the hydraulically settable portion of the containers of the present invention include mainly inorganic materials, such as a hydraulic binder, aggregates (like sand, glass, silica, perlite, vermiculite, clay, mica, and even waste concrete products), and water necessary to hydrate, or react with, the hydraulic binder.

Although certain embodiments may also include organic components, such as cellulose-based fibers and/or rheology-modifying agents, these represent a much smaller fraction of the overall mass of the hydraulically settable containers and together will make up usually less than about 30% by weight of the unhardened hydraulically settable mixture; preferably, this fraction will be less than about 15% by weight.

However, due to the versatility of the hydraulically settable mixtures used in the manufacturing processes of the present invention, a wide range of fibers, both organic and inorganic, can be used. Any abundant fiber, not just wood fiber, but preferably that which can be planted and harvested in an agribusiness setting, works well within the invention. The use of such fibrous materials would have the additional beneficial effect of preserving our dwindling forests.

In any event, fibers such as cotton, southern pine, flax, abaca, hemp, and bagasse are preferred. Because they are held together with a hydraulic binder, they do not require the intense processing used to make most paper or cardboard products. Such processes are necessary in the paper industry in order to release the lignin within the wood pulp and fray the fibers, thereby achieving a web effect between the fibers that binds the fibers together. No such intense processing is necessary in the present invention, which to a major extent preserves the strength of the fibers and allows them to be included in far lesser amounts while still deriving a high level of strength therefrom.

Unlike the manufacture of containers from plastic or from polystyrene, hydraulically settable containers utilize little or no petroleum-based products or derivatives as starting materials. Thus, although some amount of fossil fuel is necessary to generate the energy used in manufacturing the hydraulically settable containers, only a fraction of the petroleum used in the manufacture of polystyrene or plastic products will be consumed overall. In addition, the energy requirements of the present invention are much less than the energy requirements of paper manufacturing.

As compared to the manufacture of thin-walled metal containers (such as aluminum and tin cans), the hydraulically settable containers of the present invention do not result in the continued use of rapidly depleting natural resources. Further, the lower temperature and simplicity of processing conditions of the present invention reduce the energy costs and the initial capital investment costs.

Finally, another advantage of the hydraulically settable containers of the present invention is that their disposal impacts the environment less than paper and cardboard products, and much less than plastic, polystyrene, or metal products. The hydraulically settable materials of the present invention can be readily recycled. Nevertheless, even if not recycled, the hydraulically settable containers of the present invention can be discarded and reduced to a fine granular powder which has a composition complementary to the components of the earth into which it will be placed.

This disintegration process is not dependent on biodegradation forces but will occur as a result of various forces which may be present, such as moisture and/or pressure. For example, the rheology-modifying agent will dissolve over time through exposure to water, thereby creating voids within the hydraulically settable matrix of the container. These voids make the structural matrix of the container easier to crush. In addition, both the rheology-modifying agent and the cellulose fibers are subject to breakdown by microorganisms.

If the waste hydraulically settable containers are discarded into a landfill, they will crumble into a fine powder under the weight of the other garbage present. If discarded onto the ground, the forces of water and wind, and even fortuitous compressive forces such as from cars running over them or people stepping on them, will cause the waste containers to be reduced to a largely inorganic, harmless granular powder in a short period of time relative to the time it usually takes for the typical disposable paper or polystyrene cup to decompose under the same circumstances.

A polystyrene, plastic, or metal container thrown into a lake or stream will last for decades, perhaps even centuries, while a hydraulically settable container will dissolve in a short period of time into essentially a dirt-like powder, the time of dissolution being dependent largely on the mix design of the hydraulically settable mixture used to manufacture the sheet that is formed into the container.

In general, the particular qualities of any embodiment of the present invention can be designed beforehand using a materials science and microstructural engineering approach in order to give the microstructure of the hydraulically settable matrix the desired properties, while at the same time remaining cognizant of the costs and other complications involved in large scale manufacturing systems. This materials science and microstructural engineering approach, instead of the traditional trial-and-error, mix-and-test approach, allows for the design of hydraulically settable containers with the desired properties of high tensile strength high flexibility, low weight, low cost, and low environmental impact.

The preferred structural matrix of the containers manufactured according to the present invention is formed from the reaction products of a cementitious or other hydraulically settable mixture. (Hence, the structural matrix comprises a "hydraulically settable matrix".) The hydraulically settable mixture will at a minimum contain a hydraulic binder, such as hydraulic cement or gypsum hemihydrate, and water. In order to design the desired properties into the hydraulically settable mixture and/or the cured hydraulically settable matrix, a variety of other additives can be included within the hydraulically settable mixture, such as rheology-modifying agents, dispersants, one or more aggregate materials, fibers, air entraining agents, blowing agents (often introduced during the molding process), or reactive metals.

The identity and quantity of any additive will depend on the desired properties or performance criteria of both the hydraulically settable mixture, as well as the final hardened sheet or container.

Rheology-modifying agents can be added to increase the cohesive strength, "plastic-like" behavior, and the ability of the mixture to retain its shape when molded or extruded. They act as thickeners and increase the yield stress of the hydraulically settable mixture, which is the amount of force necessary to deform the mixture. This creates higher "green strength" in the molded or extruded product. Suitable rheology-modifying agents include a variety of cellulose-, starch-, and protein-based materials (which are generally highly polar), all of which assist in bridging the individual cement particles together.

Dispersants, on the other hand, act to decrease the viscosity of the mixture by dispersing the individual hydraulic binder particles. This allows for the use of less water while maintaining adequate levels of workability. Suitable dispersants include any material which can be adsorbed onto the surface of the hydraulic binder particles and which act to disperse the particles, usually by creating a charged area on the particle surface or in the near colloid double layer.

In the case where both a rheology-modifying agent and dispersant are used, it will usually be advantageous to add the dispersant first and then the rheology-modifying agent second in order to obtain the beneficial effects of each. Otherwise, if the rheology-modifying agent is first adsorbed by the binder particles, it acts as a protective colloid, saturates the surface, and the dispersant will then be unable to be adsorbed by the particles and will not impart its beneficial effect to the hydraulically settable mixture.

It may be preferable to include one or more aggregate materials within the hydraulically settable mixture to add bulk and decrease the cost of the mixture. Aggregates often impart significant strength properties and improved workability. An example of one such aggregate is ordinary sand, which is completely environmentally safe, extremely inexpensive, and essentially inexhaustible.

In other cases, lightweight aggregates can be added to yield a lighter, and often more insulating, final product. Examples of lightweight aggregate are perlite, vermiculite, hollow glass spheres, aerogel, xerogel, and other lightweight, rock-like materials. These aggregates are likewise environmentally neutral and relatively inexpensive.

Fibers may be added to the hydraulically settable mixture to increase the flexibility and tensile, and cohesive strengths of the wet sheet as well as the hardened sheet and container made therefrom. It is the inclusion of fibers which allows the hydraulically settable sheets of the present invention to be rolled, crimped, scored, and/or folded into the desired shape of a container. Fibers should preferably have high tear and burst strengths (high tensile strength), examples of which include cotton, abaca, southern pine, flax, bagasse (sugar cane fiber), and hemp. Fibers with a high aspect (length-to-width) ratio work best in imparting strength and toughness to the hydraulically settable material.

A preferred method of manufacturing hydraulically settable containers within the scope of the present invention includes the steps of (1) mixing a hydraulic binder and water in order to form a hydraulic paste; (2) adding other desired materials such as a rheology-modifying agent, dispersants, aggregates, and fibers to create a hydraulically settable mixture having the desired rheological as well as ultimate strength, weight, and low cost properties; (3) placing the hydraulically settable mixture into an extruder, such as an auger or piston extruder; (4) extruding the mixture through an appropriate die to form a flat sheet of a desired thickness or a pipe or other object that can be unfolded into a sheet; (5) improving the surface qualifies, and optionally, reducing the thickness of the sheet by passing it between at least one pair of rollers; (6) removing at least part of the water within the sheet to create a sheet having a hydraulically settable matrix with sufficient strength and durability to be processed into a container; and (7) fashioning at least a portion of a desired container from the dry or semi-dry hydraulically settable sheet.

In addition, the sheet can be optionally compacted while still in a slightly moistened condition in order to eliminate unwanted voids created from the evaporation of water from within the hydraulically settable matrix, increase the fiber adhesion, reduce porosity, and/or increase surface smoothness. This is carried out by passing the sheet through one or more separate sets of compaction rollers. By carefully controlling the water content, it will be possible to ensure that the compaction rollers only compress and increase the density of the sheet without further elongating the sheet. The compaction step improves the strength of the final hardened sheet by creating a more uniform structural matrix, while also leaving the sheet with a smoother finish. The optional compaction step is generally preferred in the case of thinner sheets where strength per unit of thickness should be maximized and where insulation ability is less important. Compaction is generally unnecessary or undesirable for thicker sheets intended to have high insulation and/or low weight characteristics.

The hydraulically settable sheet can also be optionally scored, score cut, or perforated while in a slightly moistened or even in the dry condition in order to create a fold line within the hydraulically settable matrix upon which the sheet can be bent. Optionally, the sheet could be passed through a set of corrugation rollers in order to produce a corrugated sheet and/or cardboard.

In addition, coatings can be applied to the surface of the sheet for a number of reasons, such as to make the sheet more waterproof, more flexible, or to give it a glossier surface. Coatings based upon materials such as soybean oil or methocel, either alone or in combination with polyethylene glycol, can be applied to the surface in order to permanently soften the sheet or a hinge within the sheet. Adhesive coatings can be applied to aid in making a container from the hydraulically settable sheets.

Elastomer, plastic, or paper coatings can aid in preserving the integrity of the hinge whether or not the underlying hardened hydraulically settable matrix fractures upon bending at the hinge. In the case of commercial packaging containers, it may be desirable to print the sheets or otherwise attach indicia or logos on the surface, such as by embossing or engraving the surface.

Finally, it may be desirable to pass the sheets between one or more pairs of finishing rollers consisting of a hard and soft roller, the hard roller leaving a glossy finish on one side while the soft roller provides friction so that the sheet can be pulled with some tension. The finishing rollers can also impart a textured or roughened finish to the sheets.

After the hydraulically settable sheet has been dried and has been optionally treated using any of the other procedures set forth above, it can either be used immediately as, e.g., a sheet of paper, cardboard, plastic, polystyrene, or metal, or it can be stored for later use by, for example, rolling the sheet onto a spool or by cutting and stacking the sheets onto a pallet.

During the subsequent process of forming the sheet into the shape of the desired container, it is often advantageous to remoisten the hardened sheet in order to temporarily increase the flexibility and workability of the sheet. This is particularly true in the case where the sheet will be rolled or has been scored and is expected to make a particularly sharp bend during the container forming stage. After the sheets are rolled and/or bent into the desired configuration, it may be necessary to glue the ends or seams together using adhesive methods known to those skilled in the art of container making. It may also be necessary in some cases to trim excess material from the final product using cutting means known in the paper or plastic arts.

It will be understood that fibers are a preferred additive which increases the strength, flexibility, ductility, and bendability of the hydraulically settable sheets. Fibers are particularly important where the sheet has been scored and is expected to bend over a larger angle. In addition, the properties imparted to the hardened sheets by the fibers can be increased by unidirectionally or bidirectionally orienting the fibers within the hydraulically settable rolled sheet. Depending on the shape of the extruder die head, the extrusion process itself will tend to orient the fibers in the "Y" (or longitudinal) direction. The sheet thickness reduction process, during which the sheet is also elongated, further orients the fibers in the "Y" direction.

In addition, by using a pair of rollers having different orientations in the "Z" direction (or normal to the surface of the sheet), such as by using a flat roller paired with a conical roller, a percentage of the fibers can be oriented in the "X" (or width-wise) direction. In this way a sheet having multidirectionally oriented fibers can be manufactured. This is thought to occur because the conical roller can widen the sheet in the "X" direction. As a result, desired strength characteristics can be engineered into the resultant sheet and containers made therefrom.

By using the foregoing methods, it has been possible to manufacture a wide variety of containers, including, but not limited to the following: cartons, boxes, corrugated boxes, sandwich containers, hinged "clam shell" containers (including but not limited to hinged sandwich containers utilized with fast-food sandwiches such as hamburgers and hinged salad containers), dry cereal boxes, frozen food boxes, milk cartons, fruit juice containers, carriers for beverage containers (including but not limited to wraparound carriers, basket-style carriers, and "six pack" ring-style carriers), ice cream cartons, cups (including but not limited to disposable drinking cups, two piece cups, one piece pleated cups and cone cups), french fry containers used by fast-food outlets, fast food carryout boxes, packaging, flexible packaging such as bags for snack foods, bags (including but not limited to bags with an open end such as grocery bags, bags within cartons such as a dry cereal box, and multiwall bags) sacks, wraparound casing, support cards for products which are displayed with a cover, particularly plastic covers (including food products such as lunch meats, office products, cosmetics, hardware items, and toys), support trays (for supporting products such as cookies and candy bars), cans, yoghurt containers, convoluted or spiral wound containers (for products such as frozen juice concentrate, oatmeal, potato chips, ice cream, salt, detergent, and motor oil), mailing tubes, sheet roll for rolling materials (such as wrapping paper, cloth materials, paper towels and toilet paper), sleeves, cigar boxes, confectionery boxes, boxes for cosmetics, plates, vending plates, pie plates, trays, baking trays, bowls, breakfast plates, microwaveable dinner trays, "TV" dinner trays, egg cartons, meat packaging platters, disposable single use liners which can be utilized with containers such as cups, wraps (including but not limited to freezer wraps, tire wraps, butcher wraps, meat wraps, and sausage wraps) food containers, substantially spherical objects, bottles, jars, cases, crates, dishes, lids, straws, envelopes, gummed tape, cutlery, postcards, three-ring binders, book covers, folders, toys, medicine vials, ampules, animal cages, non-flammable firework shells, model rocket engine shells, model rockets, and an endless variety of other objects.

From the foregoing, an object of the present invention is to provide improved compositions and methods for manufacturing cementitious and other hydraulically settable containers that are formed from, e.g., paper, cardboard, polystyrene, plastic, or metals.

Another object and feature of the present invention is to provide compositions and methods which yield hydraulically settable containers which have properties similar to those of paper, cardboard, polystyrene, plastic, or metals. A further object of the present invention is to provide hydraulically settable sheets which can be formed into a variety of containers using the same or similar manufacturing apparatus and techniques as those presently used to form such objects from, e.g., paper, cardboard, plastic, polystyrene, or metals.

Yet another object and feature of the present invention is to provide compositions and methods for manufacturing hydraulically settable containers which do not result in the generation of wastes involved in the manufacture of paper, plastic, polystyrene, or metal materials. Still a further object and feature is that containers are readily degradable into substances which are nontoxic and commonly found in the earth.

Another object of the present invention is to provide compositions and methods which make possible the manufacture of containers at a cost comparable to and even superior to existing methods of manufacturing containers from existing materials.

Still another object and feature of the present invention is to provide methods of manufacture which are less energy intensive, conserve valuable natural resources, and require lower initial capital investments compared to those used in making containers from existing materials.

A further object of the present invention is to provide compositions which contain less water which has to be removed during the manufacturing process (as compared to paper manufacturing) in order to shorten the processing time and reduce the initial equipment capital investment.

Finally, an additional object and feature of the present invention is to provide compositions and methods for mass producing hydraulically settable sheets (and containers therefrom) which can rapidly be formed and substantially dried within a matter of minutes from the beginning of the manufacturing process.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly characterized above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1A:
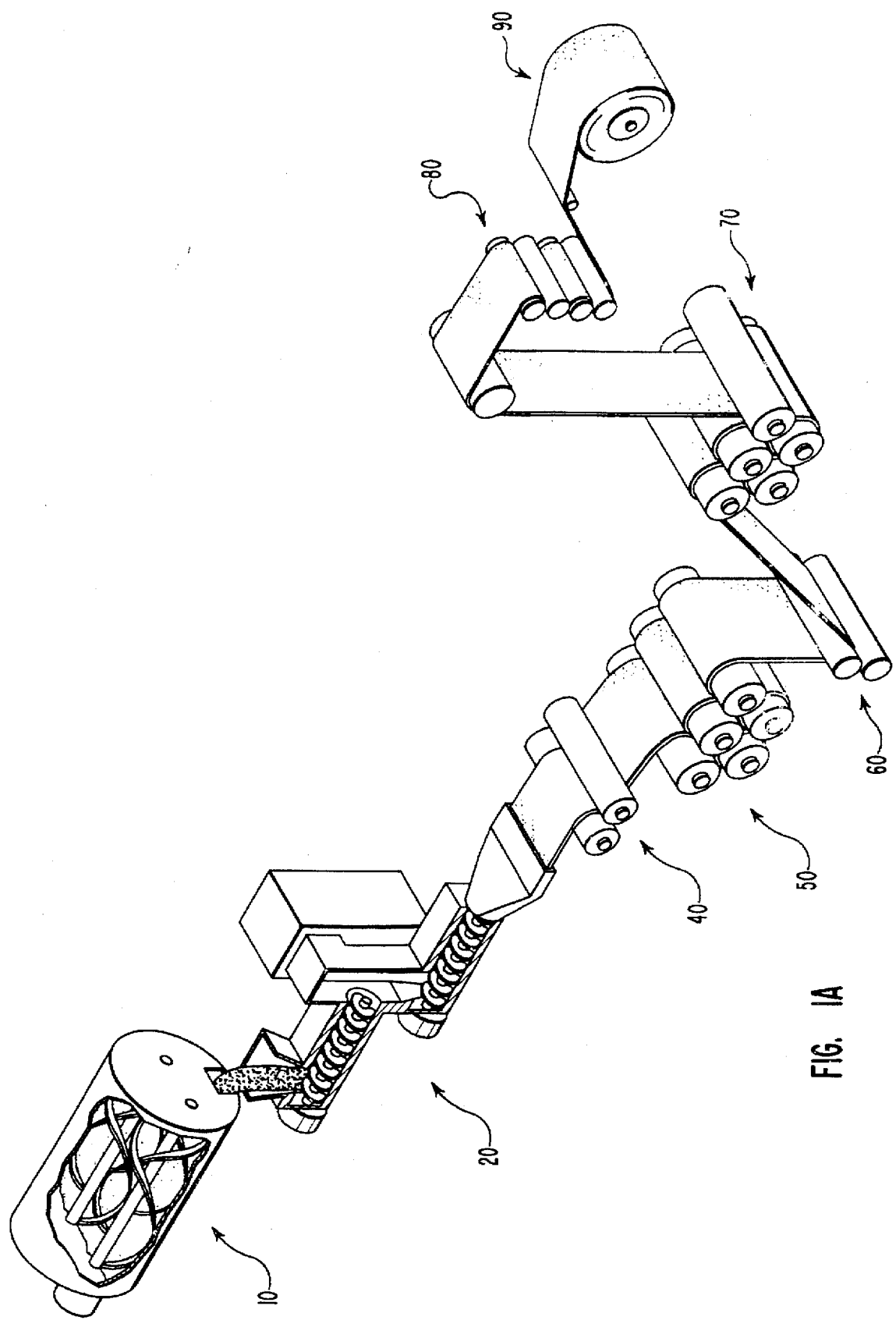
FIG. 1A is a comprehensive view of the system used to manufacture a hydraulically settable sheet, including a mixer, extruder, reduction rollers, first drying rollers, compaction rollers (optional), second drying rollers (optional), finishing rollers (optional), and spooler (optional).

The present invention utilizes novel hydraulically settable compositions and methods to mold hydraulically settable sheets which can be utilized in a manner comparable to conventional paper, cardboard, plastic, polystyrene, or metal sheets in making containers. Such sheets can be cut and formed (such as by rollers or folding) into a variety of containers presently made using other materials. The compositions and methods of the present invention are particularly useful in the mass production of disposable food or beverage packaging containers.

I. General Discussion.

A. Microstructural Engineering Design.

As mentioned above, the compositions used to make the hydraulically settable containers of the present invention have been developed from the perspective of microstructural engineering in order to build into the microstructure of the hydraulically settable matrix certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design hydraulically settable materials with those properties of strength, weight, insulation, cost, and environmental neutrality that are necessary for making containers in a significantly more efficient manner.

Hydraulically settable materials have an advantage over other conventional materials in that they gain their properties under relatively gentle and nondamaging conditions. (Other materials require high energy, severe heat, or harsh chemical processing that significantly affects the material components.) Therefore, many nonhydraulically settable materials can be incorporated into hydraulically settable materials with surprising synergistic properties or results if properly designed and engineered.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are imposed by characteristics of the design of a component which are critical to a successful product. With respect to a sheet used to make a container, those primary constraints include minimal weight, strength (both compressive and tensile), and toughness requirements, while simultaneously keeping the costs to those comparable to paper, cardboard, plastic, polystyrene, or metal counterparts.

One of the problems with hydraulically settable materials in the past have been the lengthy curing times before such materials would be demolded. An important feature of the present invention is that when the hydraulically settable mixture is molded into a sheet, it will maintain its shape (i.e., support its own weight subject to minor forces, such as gravity and movement through the processing equipment) in the green state without external support. Further, from a manufacturing perspective, in order for production to be economical, it is important that the molded sheet rapidly (in a matter of minutes or even seconds) achieve sufficient strength so that it can be handled using ordinary manufacturing procedures, even though the hydraulically settable mixture may still be in a green state and not fully hardened.

In its simplest form, the process of using materials science in microstructurally engineering and designing a hydraulically settable material comprises characterizing, analyzing, and modifying (if necessary): (a) the aggregates, (b) the predicted particle packing, (c) the system rheology, and (d) the processing and energy of the manufacturing system. In characterizing the aggregates, the average particle size is determined, the natural packing density of the particles (which is a function of the actual particle sizes) is determined, and the strength of the particles is ascertained. (Unreacted hydraulic binder particles may be considered to be an aggregate.)

With this information, the particle packing can be predicted according to mathematical models. It has been established that the particle packing is a primary factor for designing desired requirements of the ultimate product, such as workability, form stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, rheology-modifying agents, plasticizers, or other materials), the viscosity and yield stress can be chemically modified. The micro-rheology can also be modified physically by changing the shape and size of the particles, e.g., the use of chopped fibers, plate-like mica, round-shaped silica fume, or crushed, angular, granular, hydrated binder particles will interact with the lubricants differently.

From the following discussion, it will be appreciated how each of the component materials within the hydraulically settable mixture, as well as the processing parameters, contributes to the primary design constraints of the food and beverage container so that they can be economically mass produced. Specific compositions are set forth in the examples given later in order to demonstrate how the maximization of the performance of each component accomplishes the combination of desired properties.

B. Containers, Sheets, and Other Objects.

The terms "container" or "containers," as used in this specification and the appended claims, are intended to include any receptacle or vessel utilized for packaging, storing, shipping, serving, portioning or dispensing various types of products or objects (including both solids and liquids), whether such use is intended to be for a short-term or a long-term duration of time.

Containers within the scope of this invention include but are not limited to the following: cartons, boxes, corrugated boxes, sandwich containers, hinged "clam shell" containers (including but not limited to hinged sandwich containers utilized with fast-food sandwiches such as hamburgers and hinged salad containers), dry cereal boxes, frozen food boxes, milk cartons, fruit juice containers, carriers for beverage containers (including but not limited to wraparound carriers, basket-style carriers, and "six pack" ring-style carriers), ice cream cartons, cups (including but not limited to disposable drinking cups, two piece cups, one piece pleated cups and cone cups), french fry containers used by fast-food outlets, fast food carryout boxes, packaging, flexible packaging such as bags for snack foods, bags (including but not limited to bags with an open end such as grocery bags, bags within cartons such as a dry cereal box, and multiwall bags) sacks, wraparound casing, support cards for products which are displayed with a cover, particularly plastic covers (including food products such as lunch meats, office products, cosmetics, hardware items, and toys), support trays (for supporting products such as cookies and candy bars), cans, yoghurt containers, convoluted or spiral wound containers (for products such as frozen juice concentrate, oatmeal, potato chips, ice cream, salt, detergent, and motor oil), mailing tubes, sheet roll for rolling materials (such as wrapping paper, cloth materials, paper towels and toilet paper), sleeves, cigar boxes, confectionery boxes, boxes for cosmetics, plates, vending plates, pie plates, trays, baking trays, bowls, breakfast plates, microwaveable dinner trays, "TV" dinner trays, egg cartons, meat packaging platters, disposable single use liners which can be utilized with containers such as cups, wraps (including but not limited to freezer wraps, tire wraps, butcher wraps, meat wraps, and sausage wraps), food containers, substantially spherical objects, bottles, jars, cases, crates, dishes, lids, straws, envelopes, gummed tape, cutlery, postcards, three-ring binders, book covers, folders, toys, medicine vials, ampules, animal cages, nonflammable firework shells, model rocket engine shells, model rockets, and an endless variety of other objects.

In short, the container should be capable of holding its contents, whether stationary or in movement or handling, while maintaining its structural integrity or that of the materials contained therein or thereon. This does not mean that the container is required to withstand strong or even minimal forces. In fact, it may be desirable in some cases for a particular container to be extremely fragile or perishable. The container should, however, be capable of performing the function for which it was intended. The necessary properties may always be designed into the material and structure of the container beforehand.

The container should also be capable of containing its goods and maintaining its integrity for a sufficient period of time to satisfy its intended use. It will be appreciated that, under certain circumstances, the container may seal the contents from the external environments and in other circumstances may merely hold or retain the contents.

Containment products used in conjunction with the containers are also intended to be included within the term "containers." Such products include, for example, lids; straws; interior packaging, such as, partitions, liners; anchor pads, corner braces, corner protectors, clearance pads, scored sheets, and trays; funnels, wrappers, cushioning materials, and any other object used in packaging storing, shipping, portioning, serving, or dispensing an object within a container.

The containers within the purview of the present invention may or may not be classified as being disposable. In some cases, where a stronger, more durable construction is required, the container might be capable of repeated use. On the other hand, the container might be manufactured in such a way so as to be economical for it to be used only once and then discarded. The present containers have a composition such that they can be readily discarded or thrown away in conventional waste landfill areas as an environmentally neutral material (i.e., without causing significant extraordinary environmental hazards).

The term "blank" as used in this specification and the appended claims is intended to include a sheet ready for formation into a container. A blank is a sheet that has been cut into the appropriate shape, having the appropriate dimensions, with any appropriate scores, perforations, holes or slots which might facilitate its formation or assembly into the appropriate container.

The terms "hydraulically settable sheet" or "sheet" as used in this specification and the appended claims is intended to include any substantially flat, scored, cut, perforated, laminated, corrugated, curved, bent, printed, coated, or textured sheet using the methods described herein and useful for stock in forming containers. The only essential compositional limitation is that the hydraulically settable sheet include a hydraulically settable matrix formed from a hydraulically settable mixture, which at a minimum comprises a hydraulically settable binder and water. The hydraulically settable mixture may also include components such as fibers, rheology-modifying agents, aggregates, dispersants and air voids can also be incorporated. It is also within the scope of this invention to incorporate other materials onto the sheet by laminating the hydraulically settable sheet with sheets formed from other materials such as paper, by coating the hydraulically settable sheet, by applying printing indicia to the hydraulically settable sheet, by utilizing continuous fibers as an external support, and by applying other nonhydraulically settable materials.

The term "hydraulically settable matrix" as used in this specification and the appended claims is intended to refer to a hydraulically settable mixture that has been molded or formed into a desired shape. This term shall include all such matrices without regard to the extent of hydration and/or drying of the matrix. Hence, a hydraulically settable matrix may be green, hard, dry, set, or cured.

The phrases "mass producible" or manufactured in a "commercial" or "economic" manner are intended in the specification and the appended claims to refer to a capability of the sheets described herein (and containers made therefrom) to be rapidly produced at a rate that make their manufacture economically comparable to sheets and containers made from other materials, such as paper, cardboard, plastics, polystyrene, or metal. The present invention is directed to innovative compositions which solve the prior art problems involved in molding hydraulically settable materials in an economic or cost-effective manner. Containers made from hydraulically settable materials are intended to be competitive in the marketplace with containers currently made of other standard materials, such as paper, cardboard, plastic, polystyrene, or metals.

D. Hydraulically Settable Materials.

The materials used to manufacture the hydraulically settable sheets of the present invention develop strength through the chemical reaction of water and a hydraulic binder, such as hydraulic cement, calcium sulfate (or gypsum) hemihydrate, and other substances which harden after being exposed to water. The term "hydraulically settable materials" as used in this specification and the appended claims includes any material with a structural matrix and strength properties that are derived from a hardening or curing of a hydraulic binder. These include cementitious materials, plasters, and other hydraulically settable materials as defined herein. The hydraulically settable binders used in the present invention are to be distinguished from other cements or binders such as polymerizable, water insoluble organic cements, glues, or adhesives.

The terms "hydraulically settable materials," "hydraulic cement materials," or "cementitious materials," as used herein, are intended to broadly define compositions and materials that contain both a hydraulically settable binder and water, regardless of the extent of hydration or curing that has taken place. Hence, it is intended that the term "hydraulically settable materials" shall include hydraulic paste or hydraulically settable mixtures in a green (i.e., unhardened) state, as well as hardened hydraulically settable or concrete products.

1. Hydraulically Settable Binders.

The terms "hydraulically settable binder" or "hydraulic binder" as used in this specification and the appended claims are intended to include any inorganic binder such as hydraulic cement, gypsum hemihydrate, or calcium oxide which develop strength properties and hardness by chemically reacting with water and, in some cases, with carbon dioxide in the air and water. The terms "hydraulic cement" or "cement" as used in this specification and the appended claims are intended to include clinker and crushed, ground, milled, and processed clinker in various stages of pulverization and in various particle sizes.

Examples of typical hydraulic cements known in the art include: the broad family of portland cements (including ordinary portland cement without gypsum), MDF cement, DSP cement, Densite-type cements, Pyrament-type cements, calcium aluminate cements (including calcium aluminate cements without set regulators), plasters, silicate cements (including $\beta$-dicalcium silicates, tricalcium silicates, and mixtures thereof), gypsum cements, phosphate cements, high alumina cements, microfine cements, slag cements, magnesium oxychloride cements, and aggregates coated with microfine cement particles. The term "hydraulic cement" is also intended to include other cements known in the art, such as $\alpha$-dicalcium silicate, which can be made hydraulic under hydrating conditions within the scope of the present invention.

Gypsum is also a hydraulically settable binder that can be hydrated to form a hardened binding agent. One hydratable form of gypsum is calcium sulfate hemihydrate, commonly known as "gypsum hemihydrate." The hydrated form of gypsum is calcium sulfate dihydrate, commonly known as "gypsum dihydrate." Calcium sulfate hemihydrate can also be mixed with calcium sulfate anhydride, commonly known as "gypsum anhydrite" or simply "anhydrite."

Although gypsum binders or other hydraulic binders such as calcium oxide are generally not as strong as hydraulic cement, high strength may not be as important as other characteristics (e.g., the rate of hardening) in some applications. In terms of cost, gypsum and calcium oxide have an advantage over hydraulic cement because they are somewhat less expensive. Moreover, in the case where the hydraulically settable material contains a relatively high percentage of weak, lighter weight aggregates (such as perlite), the aggregates will often comprise a "weak link" within the structure of the hydraulically settable matrix. At some point, adding a stronger binder may be inefficient because the binder no longer contributes its higher potential strength due to a high content of weaker aggregates.

Terms such as "hydrated" or "cured" hydraulically settable mixture, material, or matrix refers to a level of substantial water-catalyzed reaction which is sufficient to produce a hydraulically settable product having a substantial amount of its potential or final maximum strength. Nevertheless, hydraulically settable materials may continue to hydrate long after they have attained significant hardness and a substantial amount of their final maximum strength.

Terms such as "green" or "green state" are used in conjunction with hydraulically settable mixtures which have not achieved a substantial amount of their final strength, regardless of whether such strength is derived from artificial drying, curing, or other means. Hydraulically settable mixtures are said to be "green" or in a "green state" just prior and subsequent to being molded into the desired shape. The moment when a hydraulically settable mixture is no longer "green" or in a "green state" is not necessarily a clear-cut line of demarcation, since such mixtures generally attain a substantial amount of their total strength only gradually over time. Hydraulically settable mixtures can, of course, show an increase in "green strength" and yet still be "green." For this reason, the discussion herein often refers to the form stability of the hydraulically settable material in the green state.

As mentioned above, preferable hydraulic binders include white cement, portland cement, microfine cement, high alumina cement, slag cement, gypsum hemihydrate, and calcium oxide, mainly because of their low cost and suitability for the manufacturing processes of the present invention. This list of cements is by no means exhaustive, nor in any way is it intended to limit the types of binders which would be useful in making the hydraulically settable containers within the scope of the claims appended hereto.

An important advantage of using hydraulically settable binders in order to form the hydraulically settable matrix of the container is that such binders are generally resistant to or even insoluble in water. Nevertheless, as set forth more fully below, certain other ingredients including for example rheology modifying agents, are water soluble. By adjusting the balance between the soluble and insoluble constituents within the hydraulically settable mixture, one can design a container having a desired level of water resistance or degradability in water. As a general rule, adding more hydraulic cement decreases the container's solubility in water and increases its resistance to water degradation. Conversely, by adding less hydraulic cement and more water soluble components such as rheology modifying agents, the container will be far more susceptible to water degradation. The level of water resistance or degradation is of course a function of the performance criteria of the container in question.

2. Hydraulic Paste.

In each embodiment of the present invention, the hydraulic paste or cement paste is the key constituent which eventually gives the sheet and container made therefrom the ability to set up and develop strength properties. The term "hydraulic paste" shall refer to a hydraulically settable binder which has been mixed with water. More specifically, the term "cement paste" shall refer to hydraulic cement which has been mixed with water. The terms "hydraulically settable," "hydraulic," or "cementitious" mixture or material shall refer to a hydraulic cement paste to which aggregates, fibers, rheology-modifying agents, dispersants, or other materials have been added, whether such mixture is in the green state or after it has hardened and/or cured. The other ingredients added to the hydraulic paste serve the purpose of altering the properties of the unhardened, as well as the final hardened product, including, but not limited to, strength, shrinkage, flexibility, bulk density, insulating ability, color, porosity, surface finish, and texture.

The percentage of hydraulically settable binder within the overall mixture varies depending on the identity of the other added constituents. However, the hydraulic binder is preferably added in an amount ranging from between about 2% to about 60% by volume of the total solids of the hydraulically settable mixture. From the disclosure and examples set forth herein, it will be understood that this wide range of weights covers hydraulically settable mixtures used to manufacture foam-like or clay-like sheets and containers.

It will be appreciated from the foregoing that embodiments within the scope of the present invention will vary from a very lightweight "foam-like" product to a somewhat higher density "clay-like" product. Either foam-like or clay-like materials can readily be molded into sheets which can be handled much like paper, cardboard, plastic, polystyrene or even a sheet of metal. Within these broader categories will be other variations and differences which will require varying quantities and identities of the components. The components and their relative quantities may substantially vary depending upon the specific container or other product to be made.

Generally, when making a "foam-like" container, it will be preferable to include the hydraulically settable binder within the range from between about 3% to about 60% by volume of the total solids of the hydraulically settable mixture, and more preferably within the range from between about 10% to about 30%.

When making a "clay-like" container, it will be preferable to include the hydraulically settable binder within the range from between about 2% to about 60% by volume of the total solids of the hydraulically settable mixture, preferably within the range from about 4% to about 40%, and most preferably within a range from about 5% to about 30% of the total solids of the hydraulically settable mixture.

The other important constituent of hydraulic paste is water. By definition, water is an essential component of the hydraulically settable materials within the scope of the present invention. The hydration reaction between the hydraulically settable binder and water yields reaction products which give the hydraulically settable materials the ability to set up and develop strength properties.

In most applications of the present invention, it is important that the water to hydraulic binder ratio be carefully controlled in order to obtain a hydraulically settable mixture which after molding, extrusion, and/or calendaring is self-supporting in the green state. Nevertheless, the amount of water to be used is dependent upon a variety of factors, including the types and amounts of hydraulic binder, aggregates, fibrous materials, rheology-modifying agents, and other materials or additives within the hydraulically settable mixture, as well as the molding or forming process to be used, the specific product to be made, and its properties.

The preferred amount of added water within any given application is primarily dependent upon two key variables: (1) the amount of water which is required to react with and hydrate the binder; (2) the amount of water required to give the hydraulically settable mixture the necessary rheological properties and workability.

The amount of water must be carefully balanced so that the hydraulically settable mixture is sufficiently workable, while at the same time recognizing that lowering the water content increases both the green strength and the final strength of the hardened product. Of course, if less water is initially included within the mixture, less water must be removed in order to allow the product to harden.

The appropriate rheology to meet these needs can be defined in terms of yield stress. The yield stress of the hydraulically settable mixture will usually be in the range from between about 5 kPa to about 5,000 kPa, with the more preferred mixtures having a yield stress within a range from about 100 kPa to about 1,000 kPa, and the most preferred mixtures having a yield stress in the range from about 200 kPa to about 700 kPa. The desired level of yield stress can be (and may necessarily have to be) adjusted depending on the particular sheet forming and molding processes being used to form a particular container.

Both of the competing goals of greater workability and high green strength can be accommodated by initially adding a relatively large amount of water and then driving off much of the water as steam during the molding process, usually by the use of heated rollers or by passing the sheets through drying tunnels.

Based on the foregoing qualifications, typically hydraulically settable mixtures within the scope of the present invention will have a water to hydraulic binder ratio within a range from about 0.1 to about 4, preferably about 0.3 to about 3.5, and most preferably from about 1 to about 3. Even in an apparently dry sheet or container which has been heated to remove the water, the total amount of water remaining after the drying process will range up to about 10% by weight.

It should be understood that the hydraulically settable binder has an internal drying effect on the hydraulically settable mixture because binder particles chemically react with water and reduce the amount of free water within the interparticulate interstices. This internal drying effect can be enhanced by including faster reacting hydraulic binders such as gypsum hemihydrate along with slower reacting hydraulic cement.

It has been found desirable in some cases that the hydraulically settable binder and water be mixed in a high shear mixture such as that disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material." For purposes of disclosure, the forgoing patents are incorporated herein by specific reference. High shear mixers within the scope of these patents are available from E. Khashoggi Industries of Santa Barbara, Calif., the assignee of the present invention.

The use of a high shear mixer results in a more homogeneous hydraulically settable mixture, which results in a product with higher strength. Furthermore, these high shear mixes can be utilized to entrain significant amounts of air into the hydraulically settable mixture to create "foam-like" products.

E. Fibers.

As used in the specifications and appended claims, the terms "fibers" and "fibrous materials" include both inorganic fibers and organic fibers. Fibers are a particular kind of aggregate which may be added to the hydraulically settable mixture to increase the cohesion, elongation ability, deflection ability, toughness, fracture energy, flexibility, tensile and, on occasion, even compressive strengths. Fibrous materials reduce the likelihood that the hydraulically settable container will shatter when a strong cross-sectional force is applied.

Fibers which may be incorporated into the hydraulically settable matrix are preferably naturally occurring fibers, such as cellulosic fibers extracted from hemp, cotton, plant leaves, wood or stems, or fibers made from glass, silica, ceramic, or metal. Glass fibers are preferably pretreated to be alkali resistant.

Preferred fibers of choice include glass fibers, abaca, bagasse, wood fibers (both hardwood or softwood such as southern pine), ceramic fibers (such as alumina, silica nitride, silica carbide, graphite) and cotton. Recycled paper fibers can be used, but they are somewhat less desirable because of the fiber degradation that occurs during the original paper manufacturing process, as well as in the recycling process. Any equivalent fiber, however, which imparts strength and flexibility is also within the scope of the present invention. Abaca fibers are available from Isarog Inc. in the Philippines. Glass fibers such as Cemfill® are available from Pilkington Corp, in England.

The fibers used to make the hydraulically settable containers of the present invention preferably have a high length to width ratio (or "aspect ratio") of at least about 10:1, preferably at least about 100:1, and most preferably at least about 200:1. Preferred fibers should also have a length that is several times the diameter of the hydraulic binder particles.

The amount of fibers added to the hydraulically settable matrix will vary depending upon the desired properties of the final product, with strength, toughness, flexibility, and cost being the principal criteria for determining the amount of fiber to be added in any mix design. In most cases, fibers will be added in an amount within the range from about 0.2% and to about 50% by volume of the total solids of the hydraulically settable mixture, more preferably within the range from about 1% to about 30%, and most preferably within the range from about 5% to about 20% of the total solids of the hydraulically settable mixture.

It will be appreciated, however, that the strength of the fiber is a very important feature in determining the amount of the fiber to be used. The stronger the tensile strength of the fiber, the less the amount that must be used to obtain the same level of tensile strength in the resulting product. Of course, while some fibers have a high tensile strength, other types of fibers with a lower tensile strength may be more elastic. Hence, a combination of two or more fibers may be desirable in order to obtain a resulting product that maximizes multiple characteristics, such as high tensile strength and high elasticity.

It should also be understood that some fibers, such as southern pine and abaca, have high tear and burst strengths, while others, such as cotton, have lower strength but greater flexibility. In the case where both flexibility and high tear and burst strength is desired, a mixture of fibers having the various properties can be added to the mixture.

F. Rheology-modifying Agents.

The inclusion of a rheology-modifying agent acts to increase the plastic or cohesive nature of the hydraulically settable mixture so that it behaves more like a moldable clay. The rheology-modifying agent tends to increase the yield stress of the mixture without greatly increasing the viscosity. Raising the yield stress in relation to the viscosity makes the material more plastic-like and moldable, while greatly increasing the subsequent form stability and green strength of the molded material.

The various rheology-modifying agents contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and cannot be listed here, but other cellulose materials which have the same or similar properties as these would also work well.

Suitable starch-based materials include, for example, amylopectin, amylose, seagel, starch acetates, starch hydroxyethyl ethers, ionic starches, long-chain alkylstarches, dextrins, amine starches, phosphate starches, and dialdehyde starches.

Other natural polysaccharide-based rheology-modifying agents include, for example, alginic acid, phycocolloids, agar, gum arabic, guar gum, locust bean gum, gum karaya, and gum tragacanth.

Suitable protein-based rheology-modifying agents include, for example, Zein® (a prolamine derived from corn), collagen derivatives extracted from animal connective tissue such as gelatin and glue, and casein (the principal protein in cow's milk).

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, polylactic acid, synthetic clay, and latex, which is a styrene-butadiene copolymer.

A currently preferred rheology-modifying agent is methylhydroxyethylcellulose, examples of which are Tylose® FL 15002 and Tylose® 4000, both of which are available from Hoechst Aktiengesellschaft of Frankfurt, Germany. Another preferred theology-modifying agent that can be used instead of, or in conjunction with, Tylose® is polyethylene glycol having a molecular weight of between 20,000 and 35,000. Polyethylene glycol works more as a lubricant and adds a smoother consistency to the mixture. For this reason, polyethylene glycol might be referred more precisely as a "plasticizer." In addition, it gives the molded hydraulically settable material a smoother surface. Finally, polyethylene glycol can create a coating around soluble components of the mixture and thereby render the hardened product less water soluble.

Finally, starch-based rheology-modifying agents are of particular interest within the scope of the present invention because of their comparatively low cost compared to cellulose-based rheology-modifying agents such as Tylose®. Although starches typically require heat and/or pressure in order to gelate, starches may by modified and prereacted so that they can gel at room temperature. The fact that starches, as well as many of the other rheology-modifying agents listed above, have a variety of solubilities, viscosities, and rheologies allows for the careful tailoring of the desired properties of a mix design so that it will conform to the particular manufacturing and performance criteria of a particular container.

It is also within the scope of this invention to include rheology-modifying agents by utilizing mixtures of cellulose-based materials, protein based materials, starch based materials and organic plasticizers.

The rheology-modifying agent within the hydraulically settable materials of the present invention can be included in an amount within the range from about 0.1% to about 30% by volume of the total solids of the hydraulically settable mixture. Generally, however, the preferable concentration is within the range from about 0.5% to about 15% by volume of the total solids of the hydraulically settable mixture. The rheology-modifying agent is more preferably within the range from about 1% to about 10% and most preferably within the range from about 2% to about 5%.

G. Dispersants.

The term "dispersant" is used hereinafter to refer to the class of materials which can be added to reduce the viscosity and yield stress of the hydraulically settable mixture. A more detailed description of the use of dispersants may be found in the Master's Thesis of Andersen, P. J., "Effects of Organic Superplasticizing Admixtures and Their Components on Zeta Potential and Related Properties of Cement Materials" (1987). For purposes of disclosure, the above-referenced article is incorporated herein by specific reference.

Dispersants generally work by being adsorbed onto the surface of the hydraulic binder particles and/or into the near colloid double layer of the binder particles. This creates a negative charge around the surfaces of particles, causing them to repel each other. This repulsion of the particles adds "lubrication" by reducing the "friction" or attractive forces that would otherwise cause the particles to have greater interaction. Because of this, less water can be added initially while maintaining the workability of the hydraulically settable mixture.

Due to the nature of the coating mechanism of the dispersant, the order in which the dispersant is added to the mixture is often critical. If a flocculating/gelating agent such as Tylose® is added, the dispersant is preferably added first and the flocculating agent second. Otherwise, the dispersant will not be able to become adsorbed on the surface of the hydraulic binder particles as the Tylose® will be irreversibly adsorbed onto the surface of the particles, thereby bridging them together rather than causing them to repel each other.

A preferred dispersant is sulfonated naphthaleneformaldehyde condensate, an example of which is WRDA 19, which is available from W. R. Grace, Inc. located in Baltimore. Other dispersants which would work well include sulfonated melamine-formaldehyde condensate, lignosulfonate, and acrylic acid.

The amount of added dispersant will generally range up to about 5% by weight of the hydraulic cement, more preferably within the range of between about 0.25% to about 4%, and most preferably within the range of between about 0.5% to about 2%.

The dispersants contemplated within the present invention have sometimes been referred to in the concrete industry as "superplasticizers." In order to better distinguish dispersants from rheology-modifying agents, which often act as plasticizers, the term "superplasticizer" will not be used in this specification.

H. Aggregates.

Aggregates common in the concrete industry may be used in the hydraulically settable mixtures of the present invention, except that the diameter of the aggregates should usually be less than about 25% of the smallest cross-section of the hydraulically settable matrix of the container. Aggregates may be added to increase the strength, decrease the cost by acting as a filler, decrease the weight, and/or increase the insulation ability of the resultant hydraulically settable containers. Aggregates are also useful for creating a smooth surface finish, particularly plate-like aggregates. Examples of useful aggregates include perlite, vermiculite, sand, gravel, rock, limestone, sandstone, glass beads, aerogels, xerogels, seagel, mica, clay, synthetic clay, alumina, silica, fly ash, silica fume, tabular alumina, kaolin, micro spheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, unreacted cement particles, pumice, exfoliated rock and other geologic materials. Unreacted and partially hydrated cement particles may also be considered to be "aggregates" in the broadest sense of the term. Even discarded hydraulically settable articles or materials, such as discarded containers of the present invention can be employed as aggregate fillers and strengtheners.

The amount of the aggregate will vary depending upon the particular application or purpose, and can vary greatly from no added aggregate up to about 90% by volume of the total solids of the hydraulically settable mixture, more preferably within the range from between about 5% to about 70%, and most preferably from between about 20% to about 50% of the volume of the total solids of the hydraulically settable mixture.

Both clay and gypsum are particularly important aggregate materials because of their ready availability, extreme low cost, workability, ease of formation, and because they can also provide a degree of binding and strength if added in high enough amounts.

It is often preferable according to the present invention to include a plurality of differently sized and graded aggregates capable of more completely filling the interstices between the aggregate and hydraulic binder particles. Optimizing the particle packing density reduces the amount of water necessary to obtain adequate workability by eliminating spaces which would otherwise be filled with interstitial water, often referred to as "capillary water." In addition, using less water increases the strength of the final hardened product (according to the Feret Equation).

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Andersen, P. J. "Control and Monitoring of Concrete Production—A Study of Particle Packing and Rheology," The Danish Academy of Technical Sciences.

In embodiments in which it is desirable to obtain a container with high insulation capability, it may be preferable to incorporate into the hydraulically settable matrix a lightweight aggregate which has a low thermal conductivity, or "k-factor" (defined as W/m·K), which is roughly the reciprocal of the expression commonly used in the United States for thermal resistance, or "R-factor," which is generally defined as having units of hr-ft$^2$°F./BTU.

I. Air Voids.

Where insulation, not strength, is the overriding factor, it may be desirable to incorporate tiny air voids within the hydraulically settable matrix. Air voids can be introduced by adding an air entraining agent and mixing the hydraulically settable mixture in a high speed mixer, such as those discussed above. Suitable entrainment agents include commonly used surfactants. One currently preferred surfactant is a polypeptide alkylene polyol (Mearlcrete® Foam Liquid).

In conjunction With the surfactant, it will be necessary to stabilize the entrained air within the material using a stabilizing agent like Mearlcel 3532®, a synthetic liquid anionic biodegradable solution. Both Mearlcrete® and Mearlcel® are available from the Mearl Corporation in New Jersey. Another foaming and air-entraining agent is vinsol resin. In addition, the rheology-modifying agent can act to stabilize the entrained air. Different air-entraining agents and stabilizing agents impart different degrees of foam stability to the hydraulically settable mixture, and they should be chosen in order to impart the properties that are best suited for a particular manufacturing process. During the entrainment of air, the atmosphere above the high speed mixer can be saturated with a gas such as carbon dioxide, which has been found to cause an early false setting and create form and foam stability of the hydraulically settable mixture.

Foam stability helps maintain the dispersion, and prevents the agglomeration, of the air voids within the uncured hydraulically settable mixture. Failure to prevent the coalescence of the air voids actually decreases the insulation effect, while greatly decreasing the strength, of the cured hydraulically settable mixture. Raising the pH, increasing the concentration of soluble alkali metals such as sodium or potassium, adding a stabilizing agent such as a polysaccharide rheology-modifying agent, and carefully adjusting the concentrations of surfactant and water within the hydraulically settable mixture all help to increase the foam stability of the mixture.

Air voids may alternatively be introduced into the hydraulically settable mixture by adding an easily oxidized metal, such as aluminum, magnesium, zinc, or tin into a hydraulic mixture that is either naturally alkaline, such as a cementitious or calcium oxide containing mixture, or one that has been made alkaline, such as those containing gypsum or another lower alkaline hydraulic binder. This reaction results in the evolution of tiny hydrogen bubbles throughout the hydraulically settable mixture. Adding a base such as sodium hydroxide to, and/or heating, the hydraulically settable mixture increases the rate of hydrogen bubble generation.

Finally, air voids can be introduced into the hydraulically settable mixture during the molding process by adding a blowing agent to the mixture, which will expand when heat is added to the mixture. Blowing agents typically consist of a low boiling point liquid and finely divided calcium carbonate (talc). The talc and blowing agent are uniformly mixed into the hydraulically settable mixture. The liquid blowing agent penetrates into the pores of the individual talc particles, which act as points from which the blowing agent can then be atomized upon thermal expansion of the blowing agent.

During the molding or extrusion process, the mixture is heated while at same time it is compressed. While the heat would normally cause the blowing agent to vaporize, the increase in pressure temporarily prevents the agent from vaporizing, thereby temporarily creating an equilibrium. When the pressure is released after the molding or extrusion of the material the blowing agent vaporizes, thereby expanding or "blowing" the hydraulically settable material. The hydraulically settable material eventually hardens with very finely dispersed voids throughout the hydraulically settable matrix. Water can also act as a blowing agent as long as the mixture is heated above the boiling point of water and kept under pressure.

J. Set Accelerators.

In some cases it may be desirable to accelerate the initial set of the hydraulically settable mixture by adding to the mixture an appropriate set accelerator. These include $Na_2CO_3$, $KCO_3$, KOH, NaOH, $CaCl_2$, $CO_2$, triethanolamine, aluminates, and the inorganic alkali salts of strong acids, such as HCl, $HNO_3$, and $H_2SO_4$. In fact, any compound which increases the solubility of gypsum and $Ca(OH)_2$ will tend to accelerate the initial set of hydraulically settable mixtures, particularly cementitious mixtures.

The amount of set accelerator which may be added to a particular hydraulically settable mixture will depend upon the degree of set acceleration that is desired. This in turn will depend on a variety of factors, including the mix design, the time interval between the steps of mixing the components and molding or extruding the hydraulically settable mixture, the temperature of the mixture, and the identity of the set accelerator. One of ordinary skill in the art will be able to adjust the amount of added set accelerator according to the parameters of a particular manufacturing process in order to optimize the setting time of the hydraulically settable mixture.

II. Manufacturing Sheets From Hydraulically Settable Mixtures.

The first step in the manufacture of the containers contemplated by the present invention is the manufacture of dry or semi-dry sheets from the moldable hydraulically settable mixtures disclosed herein. A detailed description of the sheet forming process can be found in U.S. patent application Ser. No. 08/101,500, entitled "Methods and Apparatus for Manufacturing Moldable Hydraulically Settable Sheets Used in Making Containers, Printed Materials, and Other Objects," and filed Aug. 3, 1993 in the names of Per Just Andersen, Ph.D., and Simon K. Hodson, now abandoned. For purposes of disclosure, including the manufacture of hydraulically settable sheets, this application is incorporated herein by specific reference.

A comprehensive system used to manufacture the hydraulically settable sheets that are later formed into the containers of the present invention is set forth in FIG. 1A. The sheet forming process using this system can be summarized as follows: (1) mixing the hydraulically settable mixture; (2) extruding the mixture into a flat sheet, pipe, or other object through an appropriate extruder die; (3) calendering the extruded sheet by passing it through a series of paired rollers in order to reduce the thickness and/or improve the surface qualities of the sheet; (4) at least partially drying the sheet by rolling it onto one or more drying rollers (e.g., "Yankee" rollers); (5) optionally compacting the sheet while in a slightly moist condition in order to eliminate unwanted spaces within the hydraulically settable matrix of the sheet and to increase the density and resulting strength of the sheet; (6) optionally drying the sheet after it has been compacted; (7) optionally finishing the sheet by passing it between one or more pairs of rollers, including one hard and one soft roller; and (8) optionally rolling the substantially hardened and dried sheet onto a spool to form a roll which can be stored and used when needed.

A. Preparing The Hydraulically Settable Mixture.

The first step in the manufacture of sheets involves the formation of a suitable hydraulically settable mixture having the desired workability, plastic-like qualities, green strength, and final properties after hardening. Using a microstructural engineering approach, one skilled in the art can select the components, as well as their relative concentrations, in order to obtain a hydraulically settable mixture having the desired properties for a given extrusion, rolling, and/or molding process.

As set forth above, the level of water, rheology-modifying agent, and (optionally) dispersant will determine the level of workability and extrudability of the mixture, as will the other components within the mixture, such as aggregates, fibers, set accelerators, etc. Based on the teachings of the copending applications that have been incorporated by reference, one skilled in the art will be able to adjust the identities and amounts of the various components in order to optimize the workability, plastic-like behavior, and green strength necessary to carry out any particular sheet forming process.

With regard to the final cured or hardened product, some of the properties considered generally desirable to design into the hydraulically settable matrix of the sheet include high tensile strength (in general or along particular vectors), flexibility, and the ability to elongate, deflect or bend. In some cases, it may be desirable to obtain sheets which substantially incorporate the properties of existing paper or cardboard products. However, in other cases it may be desirable to obtain a sheet having properties not obtainable using ordinary wood pulp or other traditional paper-making starting materials. These may include increased toughness, higher modulus, water resistance, or lower bulk density.

The flexibility, tensile strength, toughness, or modulus can be tailored to the particular performance criteria of the sheet or container in question by adjusting the components and relative concentrations of the components within the hydraulically settable mixture. In some cases, higher tensile strength may be an important feature. In others, it may be less significant. Some sheets should preferably be more flexible, while others will be stiff. The important thing is to achieve a material which has properties adequate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

The hydraulically settable sheets formed using the compositions described above will preferably have a tensile strength within the range from about 0.05 MPa to about 70 MPa, and more preferably within the range from about 5 MPa to about 25 MPa. In addition, the sheets will preferably have a bulk density within the range from about 0.1 g/cm$^3$ to about 2 g/cm$^3$. Whether a sheet will have a density at the lower, intermediate, or higher end of this range will generally depend on the desired performance criteria for a given usage. Finally, the hydraulically settable sheets of the present invention will preferably have a tensile strength to-bulk density ratio within the range from between about 2 MPa-cm$^3$/g to about 70 MPa-cm$^3$/g, and more preferably within the range from between about 3 MPa-cm$^3$/g to about 25 MPa-cm$^3$/g.

It should be understood that higher tensile strength, as well as greater elongation, will generally be obtained by increasing the amount of fibers within the hydraulically settable matrix. This can be accomplished by adding more fibers to the hydraulically settable mixture or, alternatively, by attaching a layer of fibers (such as a sheet of paper) on the surface or within the interior of a hydraulically settable sheet.

The term "elongation before failure" as used in the specification and appended claims with regard to the hydraulically settable sheet is a measurement of the ability of the hydraulically settable matrix of the sheet to stretch without rupturing and still have a finished surface. In other words, it measures the ability of the hydraulically settable matrix to stretch or change shape without rupture by application of a force such as pulling or stretching. The ability of the hydraulically settable matrix of the sheet to elongate before rupture is measured by an Instron tensile test and a stress strain test.

By optimizing the mix design, it is possible to manufacture a sheet which has a hydraulically settable matrix capable of elongating before rupture up to about 20% in the fresh state, and from about 0.5% to 8% in the dry or hardened state. This is usually accomplished by optimizing the amount of fiber and/or rheology-modifying agent within the hydraulically settable mixture. Producing a sheet which has a hydraulically settable matrix capable of elongating within the specified range can be accomplished by including fibers within the hydraulically settable mixture in an amount up to about 50% by volume of the total solids of the hydraulically settable mixture. The greater the amount of fibers or rheology-modifying agent added, the more elongation that can generally be achieved without rupture to the sheet. In addition, the elongation of a dry sheet can be increased by adding steam or moisture to the sheet in the order of up to about 10% by weight of the dry weight of the sheet.

Rheology-modifying agents added to mixtures having fibrous materials can be added in an amount within the range from about 0.1% to about 30% by volume of the total solids of the hydraulically settable mixture, and more preferably within a range from about 0.5% to about 15% by volume of the total solids of the hydraulically settable mixture. In an alternative embodiment where fibers are not included, the rheology-modifying agent will be included in an amount within the range from about 0.5% to about 25% by weight of the hydraulically settable mixture.

The term "deflect" as used in the specification and appended claims with regard to the hydraulically settable sheet means that the sheet has a hydraulically settable matrix capable of bending and rolling without rupture and still have a finished surface. The ability of the sheet to deflect is determined by measuring the modulus of elasticity and the fracture energy of the sheet using means known in the art. As with any material, the bending ability of a sheet manufactured according to the present invention is largely dependant upon the thickness of the sheet.

In order to obtain a sheet having the desired properties of strength, bendability, insulation, toughness, weight, or other performance criteria, the thickness of the sheet can be altered by adjusting the space between the rollers, as set forth more fully below. The sheets of the present invention may be designed to have a thickness of a very wide range; however, most products using a thin-walled material will generally have a thickness in the range from about 0.01 mm to about 3 mm.

The preferred thickness of the sheets of the present invention will vary depending on the intended use of the hydraulically settable sheet, container, or object to be made. As a matter of example only, where high deflectability is desired, a thinner sheet will generally be preferred. Conversely, where strength, durability, and/or insulation and not deflectability are the overriding concerns, a thicker sheet will generally be preferred. Nevertheless, where it is desired to bend the sheets along a score, or at least roll them into containers, the hydraulically settable sheets will preferably have a thickness within the range from about 0.05 mm to about 2 mm, and more preferably within the range from about 0.2 mm to about 1 mm.

Another aspect of the present invention is the ability of the extruded and calendered sheet to have high green strength. As set forth above, this can be achieved by adding a rheology-modifying agent such as a polysaccharide- or protein-based material in order to increase the yield stress of the hydraulically settable mixture.

Although it is preferable that the molded product have a relatively low water-to-hydraulic-binder ratio, in the initial mixing stage of the hydraulically settable mixture it is possible, and often desirable, to have a relatively high water-to-hydraulic-binder ratio, often as high as 4:1. This is because in the preferred method of molding the sheet, which is discussed more fully below, the hydraulically settable mixture is usually passed through a series of heated rollers which drive off a significant amount of water and aid in molding a sheet with high green strength. Nevertheless, one skilled in the art may adjust the water content so that the hydraulically settable mixture has an appropriate rheology so that it will be easily and effectively extruded through a particular die.

In order to prepare a desired hydraulically settable mixture, the fiber, water, rheology-modifying agent, hydraulically settable binder, stronger, finer aggregates, and other additives are preferably blended together in a high shear mixer in order to form a well-dispersed, homogeneous mixture. High shear mixing is used for the addition of fibrous materials to insure that the fibrous materials are well dispersed throughout the mixture. Thereafter, aggregates included in higher concentrations are blended into the mixture using a low shear mixer. This is particularly true where lightweight aggregates are added which cannot withstand high shear conditions without breaking, such as perlite or hollow glass spheres.

In one embodiment, a cement mixer capable of both high and low shear mixing is used to meter and mix the materials in a batch mode. This mixer can handle up to 350 l. of material per batch and, assuming a 6 minute mix cycle, is capable of producing 2,000 kg of a hydraulically settable mixture per hour assuming 0.5 g/cm$^3$ per cubic foot.

The currently preferred embodiment for the industrial setting is equipment in which the materials incorporated into the hydraulically settable mixture are automatically and continuously metered, mixed, de-aired, and extruded by a twin auger extruder apparatus. A twin auger extruder apparatus has sections with specific purposes such as low shear mixing, high shear mixing, vacuuming, and pumping. It is also possible to premix some of the components in a vessel, as needed, and pump the premixed components into the twin auger extruder apparatus. The preferable twin auger extruder apparatus utilizes uniform rotational augers wherein the augers rotate in the same direction. Counter-rotational twin auger extruders, wherein the augers rotate in the opposite directions, accomplish the same purposes. A pugmill may also be utilized for the same purposes. Equipment meeting these specifications are available from Buhler-Miag, Inc., located in Minneapolis, Minn.

The internal components of the mixer can be made of stainless steel because the abrasion to the mixer is not too great in light of the high water content of typical, hydraulically settable mixtures. However, the mixer components can be carbide coated for extended life, thereby resisting any abrasion and the strongly basic conditions expected from a mixture containing aggregates and a hydraulic cement.

B. Molding Sheets from the Hydraulically Settable Mixture.

Once the hydraulically settable mixture has been properly blended, it is then transported to the sheet forming apparatus, which will typically comprise an extruder and a set or series of rollers. Reference is now made to FIG. 1A, which illustrates a currently preferred system for manufacturing sheets from a hydraulically settable mixture. The system includes a mixing apparatus 10, an extruder 20, reduction rollers 40, drying rollers 50, optional compaction rollers 60, second drying rollers 70 (optional), optional finishing rollers 80, and optional spooler 90. An alternative embodiment is illustrated in FIG. 1B which accomplishes the same function as the system in FIG. 1A without the use of an extruder. The alternative embodiment includes a mixing apparatus 10, reduction rollers 40, drying rollers 50, optional compaction rollers 60, second drying rollers 70 (optional), optional finishing rollers 80, and optional spooler 90.

In the first step, the hydraulically settable mixture is formed into sheets of precise thickness by first extruding the material through an appropriate extruder die and then passing the extruded material through one or more pairs of reduction rollers 40.

Figure 2:
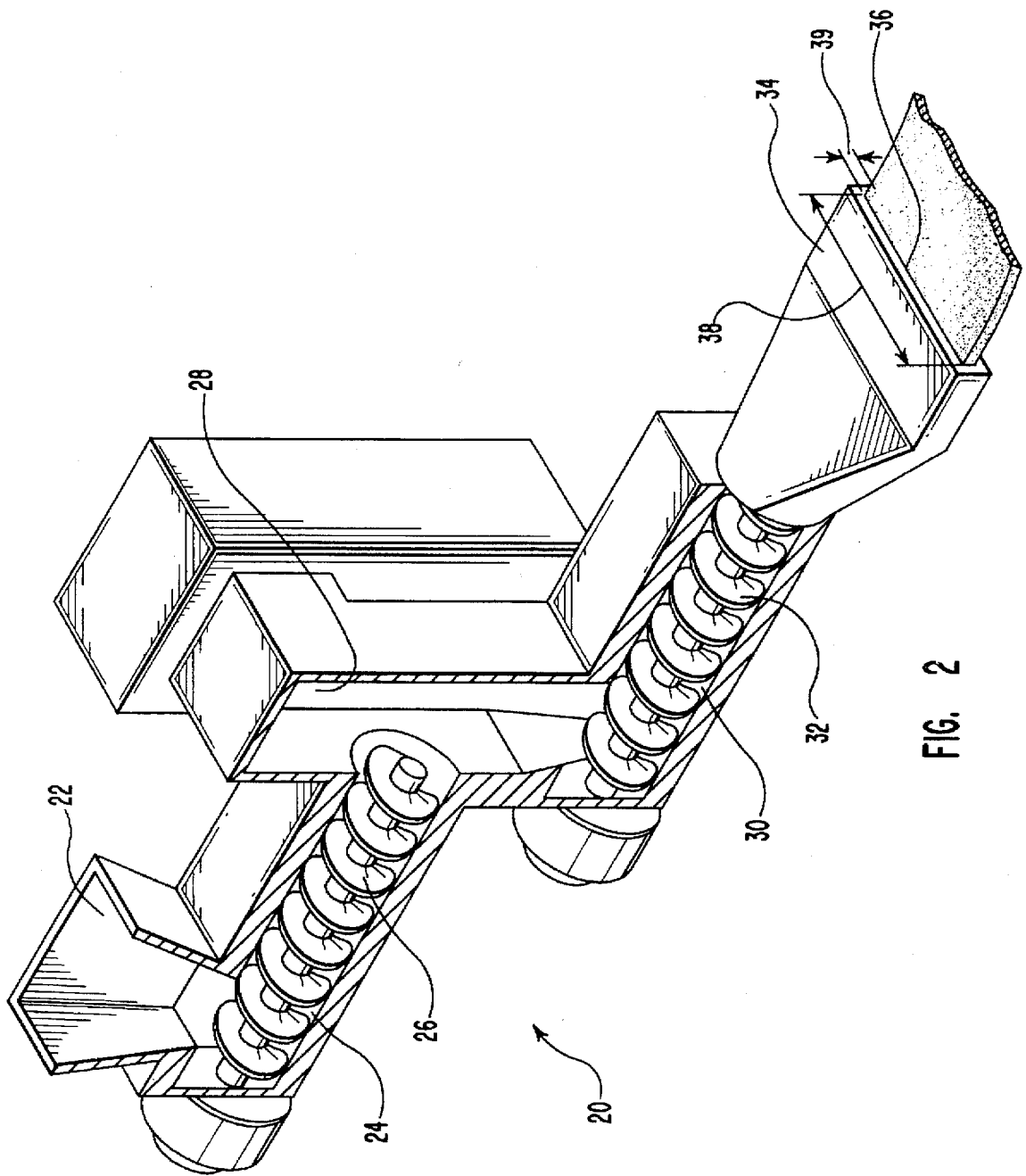
FIG. 2 is a perspective view with cutaway of an auger extruder with evacuation chamber and die head.

FIG. 2 is a closeup view of an auger extruder 20, which includes a feeder 22 that feeds the hydraulically settable mixture into a first interior chamber 24 within the extruder 20. Within the first interior chamber 24 is a first auger screw 26 which exerts forward pressure on and advances the hydraulically settable mixture through the first interior chamber 24 toward an evacuation chamber 28. Typically, a negative pressure or vacuum will be applied to the evacuation chamber 28 in order to remove unwanted air voids within the hydraulically settable mixture.

Thereafter, the hydraulically settable mixture will be fed in a second interior chamber 30. A second auger screw 32 will advance the mixture toward a die head 34 having a transverse slit 36 with a die width 38 and a die thickness 39.

The cross-sectional shape of the die slit 36 is configured to create a sheet of a desired width and thickness that will generally correspond to the die width 38 and die thickness 39.

Figure 3:
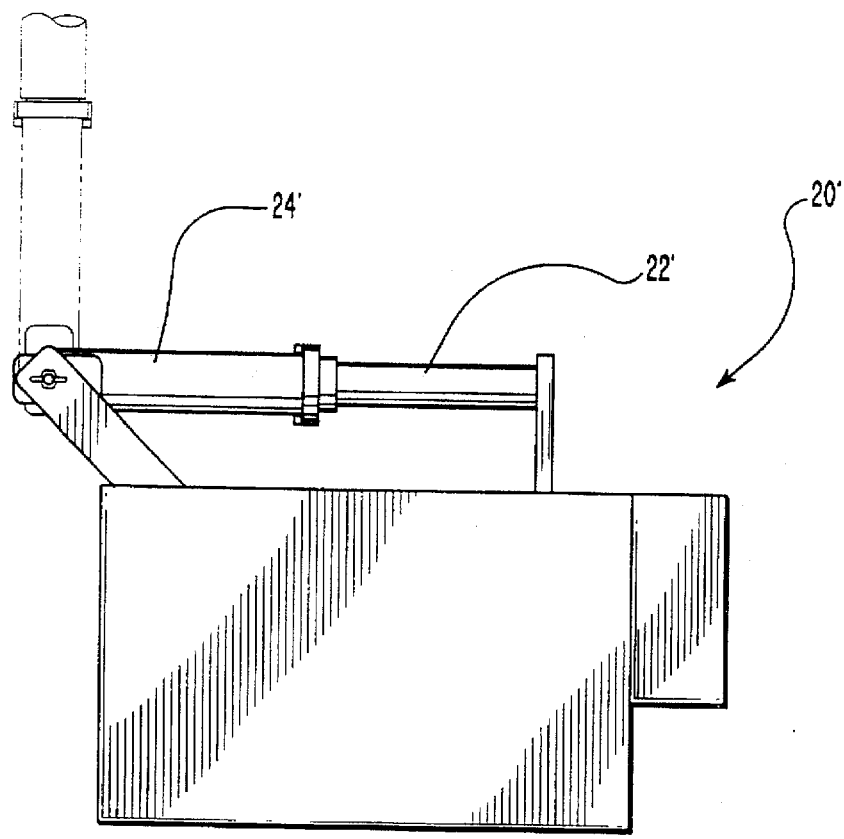
FIG. 3 is a side view of a piston extruder.

Alternatively, as seen in FIG. 3, the extruder may comprise a piston extruder 20' instead of an auger extruder 20. A piston extruder utilizes a piston 22' instead of an auger screw 22 in order to exert forward pressure on and advance the hydraulically settable mixture through the interior chamber 24'. An advantage of using a piston extruder is the ability to exert much greater pressures upon the hydraulically settable mixture. Nevertheless, due to the highly plastic-like nature of mixtures typically employed in the present invention, it is not generally necessary, or even advantageous, to exert pressures greater than those achieved using an auger extruder.

Although the preferred width and thickness of the die will depend upon the width and thickness of the particular sheet to be manufactured, the thickness of the extruded sheet will usually be at least twice, and sometime many times, the thickness of the final calendered sheet. The amount of reduction (and, correspondingly, the thickness multiplier) will depend upon the properties of the sheet in question. Because the reduction process helps control fiber orientation, the amount of reduction will often correspond to the degree of desired orientation. In addition, the greater the thickness reduction, the greater the elongation of the sheet. In a typical manufacturing process an extruded sheet with a thickness of about 6 mm may be calendered to a sheet with a thickness between about 0.2 mm and about 0.5 mm.

In addition to narrow die slits to form flat sheets, other die shapes may be used to form other objects or shapes. For example, in some cases it may not be desirable to extrude an extremely wide sheet. Instead, a pipe may be extruded and continuously cut and unfolded using a knife located just outside the die head.

The amount of pressure that is applied in order to extrude the hydraulically settable mixture will generally depend on the pressure needed to force the mixture through the die head, as well as the desired rate of extrusion. It should be understood that the rate of extrusion must be carefully controlled in order for the rate of sheet formation to correspond to the speed at which the sheet is subsequently passed through the calendering rollers during the calendering step.

It will be understood that an important factor which determines the optimum speed or rate of extrusion is the final thickness of the sheet. A thicker sheet contains more material and will require a higher rate of extrusion to provide the necessary material. Conversely, a thinner sheet contains less material and will require a lower rate of extrusion in order to provide the necessary material.

The ability of the hydraulically settable mixture to be extruded through the die head, as well as the rate at which it is extruded, is generally a function of the rheology of the mixture, as well as the operating parameters and properties of the machinery. Factors such as the amount of water, rheology-modifying agent, dispersant, or the level of initial hydration of the hydraulic binder all affect the rheological properties of the mixture. The rate of extrusion may, therefore, be controlled by controlling the mix design and the rate of setting of the hydraulically settable mixture.

As set forth above, adequate pressure is necessary in order to temporarily increase the workability of the hydraulically settable mixture in the case where the mixture has a deficiency of water and has a degree of particle packing optimization. As the mixture is compressed within the extruder, the compressive forces bring the particles together, thereby reducing the interstitial space between the particles and increasing the apparent amount of water that is available to lubricate the particles. In this way, workability is increased until the mixture has been extruded through the die head, at which point the reduced pressure causes the mixture to exhibit an almost immediate increase in stiffness and green strength.

In light of each of the factors listed above, the amount of pressure which will be applied by the extruder in order to extrude the hydraulically settable mixture will preferably be within the range from between about 50 kPa to about 70 MPa, more preferably within the range from between about 150 kPa to about 30 MPa, and most preferably within the range from between about 350 kPa to about 3.5 MPa.

The extrusion of a hydraulically settable mixture through the die head will orient the individual fibers within the hydraulically settable mixture in the lengthwise direction of the extruded sheet. As will be seen herein below, the calendering process will further orient the fibers in the lengthwise or "Y" direction as the sheet is further elongated during the reduction process. In addition, by employing rollers having varying gap distances in the "Z" direction (such as conical rollers) some of the fibers can also be oriented in the "X" direction, i.e., along the width of the sheet. Thus, it is possible to create a sheet by extrusion, coupled with calendering, which will have bidirectionally oriented fibers.

C. The Calendering Process.

In most embodiments of the present invention, it will be preferable to "calender" the extruded sheet by passing it between at least one pair of rollers, the purpose of which is to improve the uniformity and surface quality of the sheet and, in most cases, reduce the thickness of the sheet. In cases where it is desirable to greatly reduce the thickness of the hydraulically settable sheet, it will often be necessary to reduce the thickness of the sheet in steps, wherein the sheet is passed through several pairs of rollers, each pair having progressively narrower gap distances therebetween.

Figure 1B:
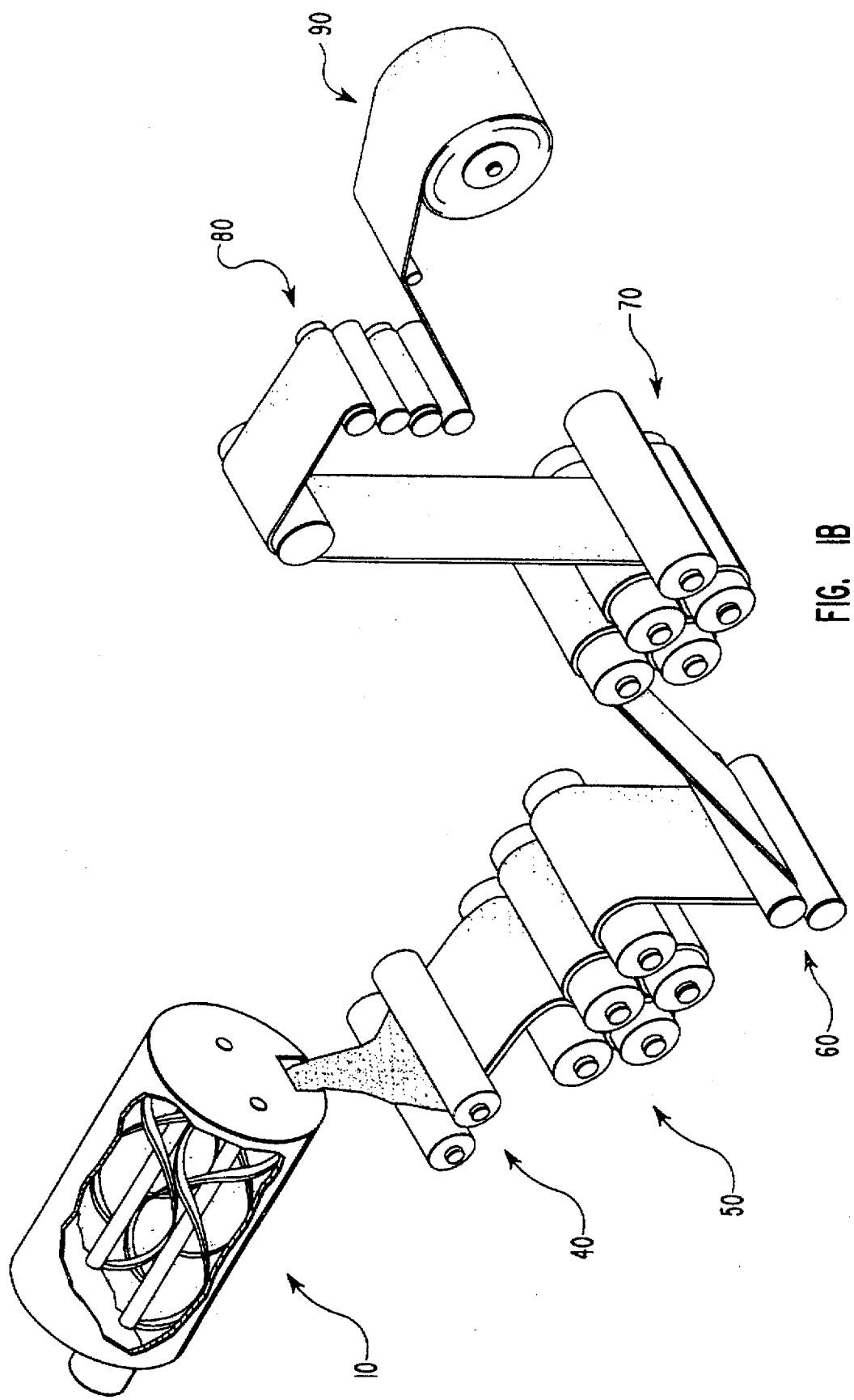
FIG. 1B is a comprehensive view of the system used to manufacture a hydraulically settable sheet, including a mixer, reduction rollers, first drying rollers, compaction rollers (optional), second drying rollers (optional), finishing rollers (optional), and spooler (optional).
Figure 4:
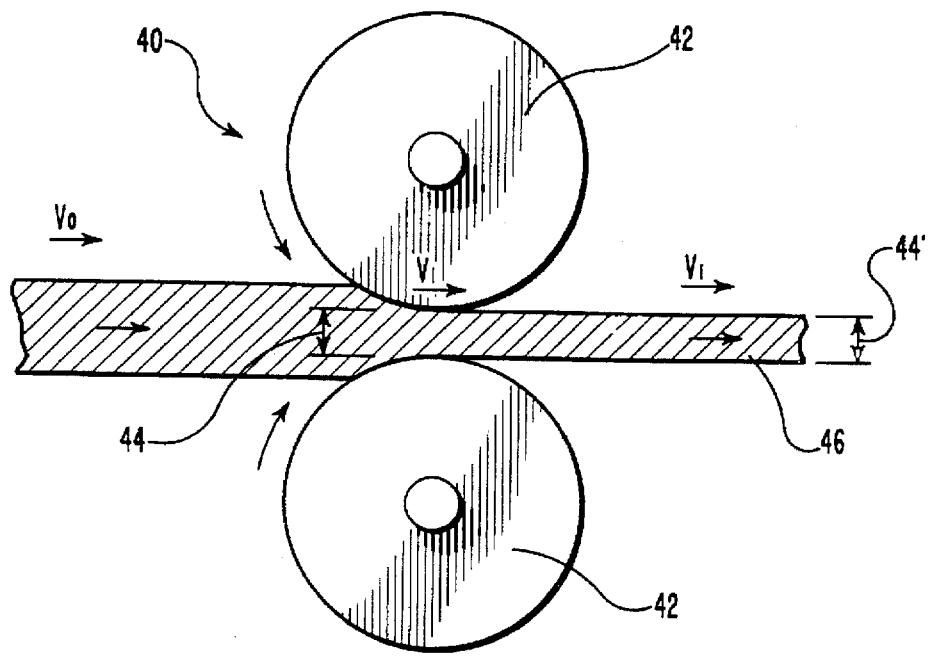
FIG. 4 is a side view of a pair of reduction rollers and a sheet being reduced in thickness by the rollers.

Reference should be made to FIG. 1A which shows one embodiment of the present invention in which a series of three pairs of rollers are employed during the calendering step. The rollers within each of the three roller pairs have similar diameters, although in some cases it may be preferable to use smaller diameter rollers in combination with larger diameter rollers. As seen in FIG. 4, a set or pair of rollers 40 normally includes two individual rollers 42 positioned adjacent to one another with a predetermined gap distance 44 therebetween. The gap distance 44 between the two individual rollers 42 corresponds to the desired thickness 44 of the reduced sheet 46 after it passes between the set of rollers.

As the thickness of the sheet is reduced upon passing through a pair of rollers, it will also elongate in the forward moving (or "Y") direction. One consequence of sheet elongation is that the fibers will further be oriented or lined up in the "Y" direction. In this way, the reduction process in combination with the initial extrusion process will create a sheet having substantially unidirectionally oriented fibers in the "Y", or lengthwise, direction.

Another consequence of sheet elongation is that the sheet will "speed up" as it passes between a pair of reduction rollers. Reference is again made to FIG. 4 to illustrate that the tangential speed $v_1$ of the outer surface of the rollers will closely correspond to the speed $v_1$ of the reduced, elongated sheet as it exits the rollers, not the speed of the sheet as it enters the gap between the rollers.

By way of example, if the sheet thickness is reduced by 50% and assuming there is no widening of the sheet during the reduction process the sheet will elongate to twice its original length. This corresponds to a doubling of the sheet's velocity before it enters the rollers compared to when it exits the rollers. Thus, as in FIG. 4, if the sheet thickness is reduced by 50%, then $v_1=2\times v_0$; the velocity doubles from point "a" to point "b". The acceleration of the sheet and the downward pressure of the rollers imparts a large amount of shearing forces on the sheet, which forces can harm the hydraulically settable matrix if too great.

The application of an excessively large shearing force can disrupt the integrity of the hydraulically settable matrix of the sheet, thereby creating flaws within and weakening the sheet. Because of this, the thickness of the sheet should be reduced in steps small enough to prevent undue damage to the sheet. In light of typical production parameters (such as, "e.g.," minimizing the number of reduction steps, orienting the fibers, and controlling the rheology of the hydraulically settable mixture) the reduction in thickness of a sheet will preferably not exceed about 75% during any single reduction step (i.e., while passing between any one set of rollers), more preferably no greater than about 50%, and most preferably no greater than about 30%.

The diameter of each of the rollers should be optimized depending on the properties of the hydraulically settable mixture and the amount of thickness reduction of the hydraulically settable sheets. When optimizing the diameter of the rollers two competing interests should be considered. The first relates to the fact that smaller diameter rollers tend to impart a greater amount of shearing force into the sheet as it passes between the rollers. This is because the downward angle of compression onto the sheet (and average acceleration) is on average greater when using smaller rollers than when using larger diameter rollers.

Consequently, from this perspective, larger diameter rollers appear to be advantageous compared to smaller diameter rollers because less shearing forces would be expected to introduce fewer flaws into the hydraulically settable matrix.

However, the use of larger diameter rollers has the drawback of the hydraulically settable material coming into contact with the roller for a greater period of time, thereby resulting in an increase in drying of the sheet during the calendering process in the case where the rollers are heated to prevent adhesion. (Because more of the sheet comes into contact with a larger diameter roller, heating is even more important when using larger diameter rollers to prevent adhesion). While some drying is advantageous, drying the sheet too quickly during the calendering process could result in the introduction of fractures and other flaws within the hydraulically settable matrix. A dryer sheet is less able to conform to a new shape without a rupture in the hydraulically settable matrix compared to a wetter sheet subjected to the same level of shearing forces. Consequently, from this perspective the use of smaller diameter rollers is advantageous for reducing the drying effect of the reduction rollers.

In light of this, the diameter of the rollers should preferably be optimized and be sufficiently small to prevent overdrying of the material during the calendering process, while also being sufficiently large to reduce the amount of shearing force imparted to the sheet, thereby allowing a greater reduction of sheet thickness during each reduction step. By maximizing the amount of sheet thickness reduction, the number of reducing steps can be minimized.

As set forth above, it is preferable to treat the roller surfaces in order to prevent sticking or adhesion of the hydraulically settable sheet to the rollers. One method entails heating the rollers, which causes some of the water within the hydraulic mixture to evaporate and to create a steam barrier between the sheet and the rollers. Evaporation of some of the water also reduces the amount of water within the hydraulically settable mixture, thereby increasing the green strength of the sheet. The temperature of the rollers, however, must not be so high as to dry or harden the surface of the sheet to the point which would create residual stresses, fractures, flaking, or other deformities or irregularities in the sheet. Accordingly, it is preferable to heat the rollers to a temperature within the range from between about 50° C. to about 140° C., more preferably to between about 70° C. to about 120° C., and most preferably to between about 85° C. to about 105° C.

Generally, the stickiness of the hydraulically settable mixture increases as the amount of water in the mixture is increased. Therefore, the rollers should generally be heated to a higher temperature in cases where the mixture contains more water, which is advantageous because sheets containing a higher water content must generally have more of the water removed in order to obtain adequate green strength.

Finally, it has been found that heating the hydraulically settable mixtures of the present invention increases the rate of the hydration reaction between the hydraulic binder and water. It is known in the art that concrete normally takes about 28 days to achieve its optimum strength. However, heating the hydraulic mixtures of the present invention makes it possible to obtain substantial hydration of the hydraulic binder in as little as one day.

Because heated rollers can drive off significant amounts of water and improve the form stability, the amount of acceptable sheet thickness reduction will generally decrease in each successive reduction step as the sheet becomes drier. This is because a drier, stiffer sheet can tolerate less shear before flaws are introduced into the hydraulically settable matrix.

In an alternative embodiment, adhesion between the hydraulically settable sheets and rollers can be reduced by cooling the rollers to or below room temperature. Heating the mixture in the extruder to a relatively high temperature, for example, and then cooling the sheet surface causes the vaporizing water to condense, which is thought to create a thin film of water between the sheet and the roller. The rollers should be cool enough to prevent the surface of the sheet from adhering to the rollers, but not so cold to cause the sheet to freeze or become so stiff or inflexible that it will fracture or shatter during the calendering process.

Overcooling the material can also greatly retard the hydration reaction, although this may be desirable in some cases. Accordingly, where cooling a heated mixture is relied upon to prevent adhesion of the sheet it is preferable to cool the rollers to a temperature within the range from between about −20° C. to about 40° C., more preferably to between about 0° C. to about 35° C., and most preferably to between 5° C. to about 30° C. Conversely, it will generally be preferable to heat the extruding mixture to a temperature within the range from between about 20° C. to about 80° C. The temperature will correlate with the temperature of the rollers.

Another way to reduce the level of adhesion between the rollers and the hydraulically settable sheet is to treat the roller surfaces in order to make them less amenable to adhesion. Rollers are typically made from polished stainless steel and coated with a nonstick material such as polished chrome, nickel, or teflon.

One of ordinary skill in the art will appreciate that the extrusion step need not formerly employ the use of an "extruder" as the term is used in the art. The purpose of the extrusion step is to provide a continuous, well-regulated supply of hydraulically settable material to the rollers. The extrusion step preferably orients the fibers in the direction of the flow of the material. These may be achieved by other mechanisms know to those skilled in the art to effect the "extrusion" or flow of material through an appropriate opening. The force needed to cause a hydraulically settable mixture to flow may, for example, be supplied by gravity.

D. The Drying Process.

Although the calendering step often results in partial or even substantial drying of the hydraulically settable sheet, it will be preferable to further dry the sheet in order to obtain a sheet with the desired properties of hardness, tensile strength, and toughness. A preferred method of drying the sheet involves the use of large diameter, heated drying rollers, sometimes known in the art as "Yankee" rollers, although a series of smaller drying rollers may also be employed.

In contrast to the reduction rollers, which are generally aligned in pairs of rollers, the drying rollers are individually aligned so that the sheet passes over the surface of each roller individually in sequence. In this way, the two sides of the hydraulically settable sheet are alternatively dried in steps. While the sheet passes between the reduction rollers during the calendering step in a generally linear path, the sheet follows a generally sinusoidal path when wrapping around and through the drying rollers during the drying step.

Referring to FIG. 1A, the side adjacent to the first drying roller is heated by the drying roller while the other side is exposed to the air. The heated sheet loses water in the form of vapor, which can escape out the sides of the roller or the surface of the sheet opposite the roller. The vapor also provides a nonstick barrier between the sheet and roller. As the sheet continues on its path it is rolled onto a second drying roller where the other side comes into contact with the roller surface and is dried (FIG. 1A). This process may be continued for as many steps as needed in order to dry the sheet in the desired amount.

The temperature of the drying rollers will depend on number of factors, including the moisture content of the sheet as it passes over a particular roller. In any event, the temperature of the drying rollers should be less than about 300° C. Although the hydraulically settable material should not be heated above 250° C. in order to prevent the destruction of the organic constituents (such as rheology-modifying agent or fibers), rollers heated to above this temperature may be used so long as there is adequate water within the mixture which can cool the material as the water vaporizes. Nevertheless, as the amount of water decreases during the drying process, the temperature of the rollers should be reduced to prevent overheating of the material.

In some cases, it may be preferable to use a drying tunnel or chamber in conjunction with the drying rollers. In order to obtain the full effect of heat convection drying, it is often preferable to circulate the heated air. The temperature within the drying tunnel, as well as the residence or dwell time of the sheet within the tunnel, will determine the amount and rate of evaporation of the water within the hydraulically settable mixture. The temperature of the drying tunnel should not usually exceed 250° C. in order to prevent the destruction of the cellulose fibers and rheology-modifying agents. In light of the foregoing, the drying tunnel will preferably be heated to a temperature within the range from between about 50° C. to about 250° C., and more preferably within the range from between about 100° C. to about 200° C.

In some cases, the drying process set forth above will be the final step before the sheet is either used to form a container or, alternatively, rolled onto a spool or stacked as sheets until needed. In other cases, particularly where a sheet with a smoother, more paper-like finish is desired, this drying step will be followed by one or more additional steps set forth more fully below, including a compacting step and/or a finishing step. In the case of compaction, it is generally preferable to leave the sheets with some amount of moisture to prevent fracturing of the hydraulically settable matrix during the optional compaction step.

E. Optional Finishing Processes.

Figure 5:
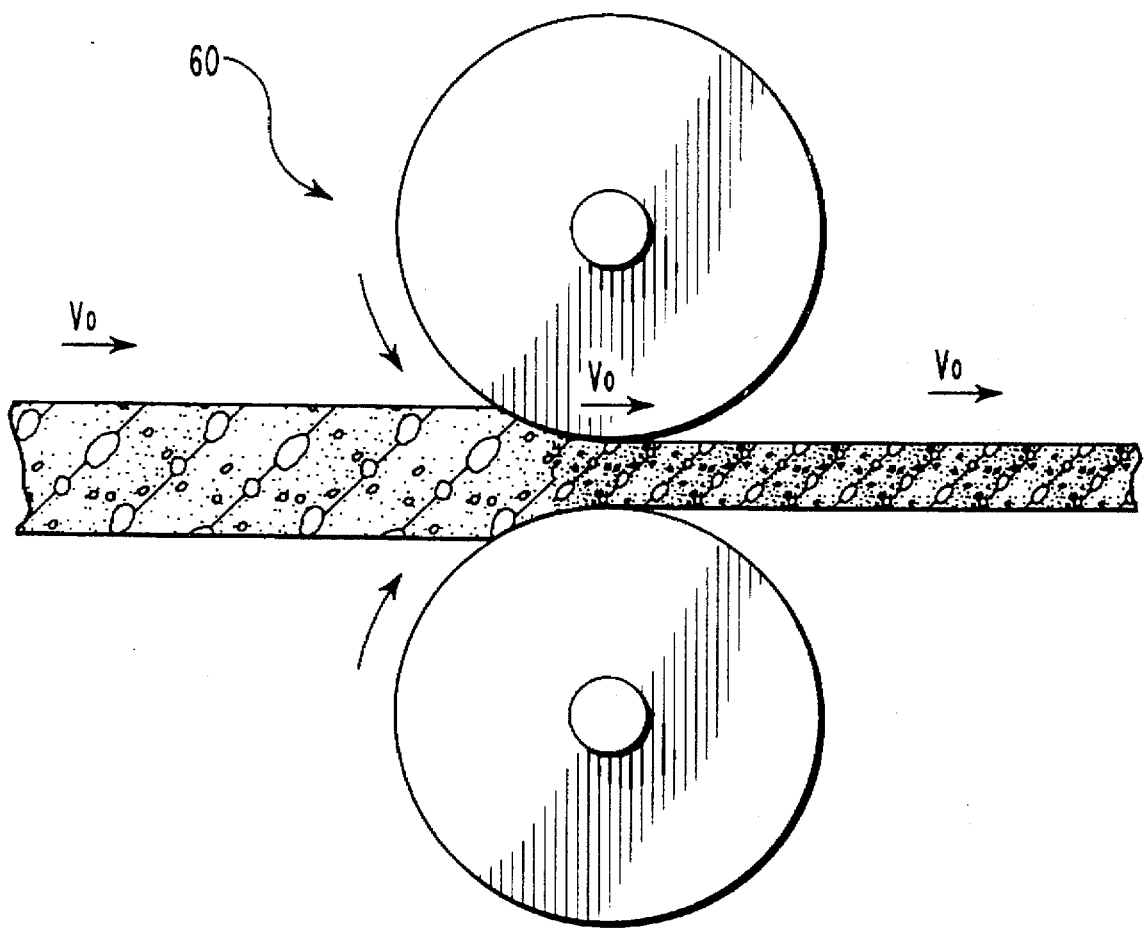
FIG. 5 is a side view of a pair of compaction rollers with a sheet being compacted therebetween.

In many cases, it may be desirable to compact the hydraulically settable sheet in order to achieve the final thickness, tolerance, and surface finish. In addition, the compaction process can be used to remove unwanted voids within the hydraulically settable matrix. Referring to FIG. 5, the sheet may optionally pass between a pair of compaction rollers 60 after being substantially dried during the drying process. The compaction process generally yields a sheet with higher density and strength, fewer surface defects, and a smaller thickness. The amount of compressive force of the compaction rollers will be adjusted to correspond to the particular properties of the sheet.

In order to achieve compaction without further elongating the sheet and without disrupting the hydraulically settable matrix, it is important to control the drying process so that the sheet contains an amount of water within an optimum range. If the sheet contains too much water, the compaction rollers will elongate the sheet in similar fashion as the reduction rollers.

On the other hand, if the sheet contains too little water, the compaction step can fracture the hydraulically settable matrix, thereby yielding a weaker sheet. Fracture of the hydraulically settable matrix can diminish the final strength of the sheet even if the fractures are microscopic and not visible to the naked eye.

Because the compaction process (including one or more compaction steps) usually involves a slightly moist sheet, it is usually preferable after the compaction step to further dry the sheet in a manner similar to the drying process outlined above. This optional drying step may be carried out using optional drying rollers 70 (FIGS. 1A and 1B), a drying tunnel, or a combination of the two. Nevertheless, in some cases the sheet may be further processed without a second drying step, such as where the sheet is immediately used to form a container or other object, is scored, or where it is otherwise advantageous to have a slightly moist sheet.

Figure 6:
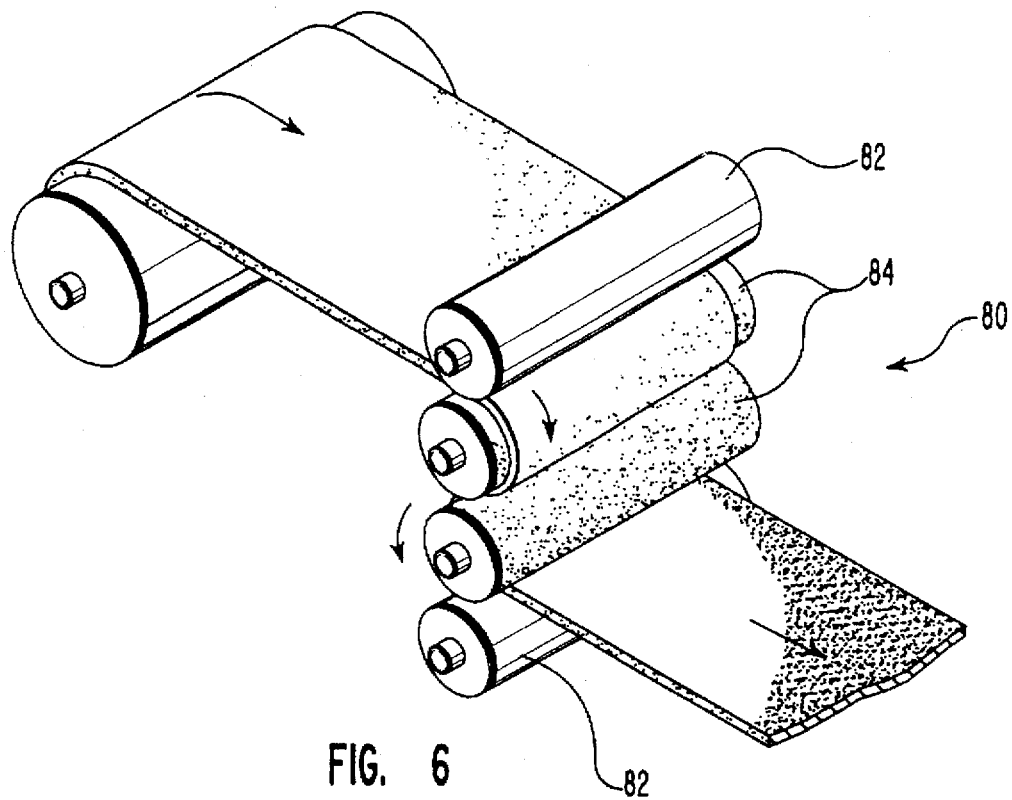
FIG. 6 is a perspective view of a pair of finishing rollers including a "hard" roller and a "soft" roller.

It may also be preferable to further alter the surface of the hydraulically settable sheet by passing the sheet between one or more pairs of finishing rollers 80. For example, in order to create a sheet with a very smooth or glazed surface on one or both sides, the sheet may be passed between a pair of hard and soft rollers (FIG. 6). The term "hard roller" refers to a roller 82 having a very polished surface and which leaves the side of the sheet in contact with the hard roller very smooth. The term "soft roller" refers to a roller 84 having a surface capable of creating enough friction between the soft roller 84 and the sheet that it pulls the sheet through the hard and soft roller pair. This is necessary because the hard roller 82 is usually too slick to pull the dry sheet through a pair of hard rollers. Besides, some slippage of the hard roller 82 is advantageous in order to align the particles on the surface of the sheet. The finishing process may be optionally facilitated by spraying water on the sheet surface, and/or by coating the surface with clay, calcium carbonate, or other appropriate coating materials known to one of ordinary skill in the art.

It may also be preferable to process the hydraulically settable sheet into a translucent or transparent sheet. One method of decreasing the opacity and forming a translucent or transparent sheet involves passing the sheet between one or more pairs of rollers with sufficient pressure to decrease the air void volume within the sheet resulting in a decreased diffraction of light. Another method involves the method described above of passing a hydraulically settable sheet through a pair of hard and soft rollers resulting in a very polished surface. The opacity of hydraulically settable sheets can also be decreased by including silica, fiber and Tylose®. Additionally, combinations of these methods of decreasing the opacity of the hydraulically settable sheets can be utilized.

In other embodiments, the finishing rollers can impart a desired texture, such as a meshed or checkered surface. If desired, the rollers can imprint the surface of the sheet with a logo or other design. Special rollers capable of imparting a water mark can be used alone or in conjunction with any of these other rollers.

Once the sheet forming process has been completed, the hardened or semi-hardened sheets can be used immediately on site to manufacture the container in question. Alternatively, they may be stored and then shipped or transported as needed to the site of manufacture as, for example, large rolls or spools, or as stacks of individual sheets.

III. Optional Processing of the Hydraulically Settable Sheets.

Hydraulically settable sheets prepared according to the methods set forth above may be subjected to additional processing steps, depending on the properties desired for the sheets, which, in turn, depends on the ultimate use intended for the hydraulically settable sheets. These optional processes may include lamination, corrugation, application of coatings, printing of indicia, scoring, perforation, creping, parchmenting, or a combination thereof.

A. Laminating Processes.

A variety of properties can be imparted to the hydraulically settable sheet by laminating it. For the purposes of this specification and the appended claims, the terms "laminated sheet" or "laminate" (when used as a noun) shall refer to a sheet having at least two layers with at least one of the layers being a hydraulically settable sheet. The terms "laminating material" or "lamina" shall refer to any constituent layer of the laminated sheet, including both a hydraulically settable sheet or other material. Laminates having any combination of layers are within the scope of this invention to the extent that one layer of the laminate is a hydraulically settable sheet. The laminate can be formed by adding, bonding, or otherwise joining at least two layers together. The thickness of the laminate may vary depending on the nature of intended properties of the laminate.

The laminating material that is bonded, adhered, or otherwise joined to the layer of the laminate comprising a hydraulically settable sheet may include another hydraulically settable sheet, a material which imparts a desired property to the hydraulically settable sheet when the two are laminated together, a material which is described below as a coating or an adhesive, or any combination thereof. Examples of materials which enhance the properties of the hydraulically settable sheets include organic polymer sheets, metal foil sheets, ionomer sheets, elastomeric sheets, plastic sheets, fibrous sheets or mats, paper sheets, cellophane sheets, nylon sheets, wax sheets, and metallized film sheets.

Conventional laminators can be utilized to combine a hydraulically settable sheet with another layer. Laminates can also be created by coextruding two or more hydraulically settable sheets or a hydraulically settable sheet with another material.

Laminates within the scope of this invention can be formed by bonding a hydraulically settable sheet and another layer or layers with or without adhesives. The bond between the hydraulically settable sheet and another layer (or between other layers of the laminate) can range from a slight cling to a bond which exceeds the strength of the hydraulically settable sheet or the materials being bonded.

Hydraulically settable sheets can be bonded without the use of adhesives to another layer as long as the hydraulically settable sheet is sufficiently "green" to effectuate an effective bond between the individual laminae. Layers of a laminate comprising water soluble materials may be adhered to a slightly moist or remoistened hydraulically settable sheet.

Bonds can be formed with adhesives through many different processes, including wet-bond laminating, dry-bond laminating, thermal laminating and pressure laminating. Useful adhesives include waterborne adhesives (both natural and synthetic), hot-melt adhesives, and solvent-borne adhesives.

Wet-bond laminating of a hydraulically settable sheet and another layer involves the use of any liquid adhesive to bond two layers together. Useful natural waterborne adhesives for wet-bond lamination include vegetable starch-based adhesives, protein-based adhesives, animal glue, casein, and natural rubber latex. Useful synthetic waterborne adhesives generally include resin emulsions such as stable suspensions of poly(vinyl acetate) particles in water. Waterborne adhesives are low in odor, taste, color, and toxicity, have a broad range of adhesion, and have excellent aging properties.

Thermoplastic polymers are useful hot-melt adhesives that can be applied in a molten state and set to form upon cooling. Hot-melt adhesives generally set quicker than other adhesives.

Useful solvent-borne adhesives include polyurethane adhesives, solvent-borne ethylene-vinyl acetate systems and other rubber resins which are pressure sensitive. It is also within the scope of the present invention to create a laminate by foil stamping. Foil stamping involves the use of heat and pressure to transfer a thin metallic or pigmented coating from a carrier film to the hydraulically settable sheet or container surface to obtain patterned decorative effects. This technique can be utilized in combination with embossing to obtain a laminate with a reflective, glossy, raised surface.

B. Corrugating Processes.

Figure 7:
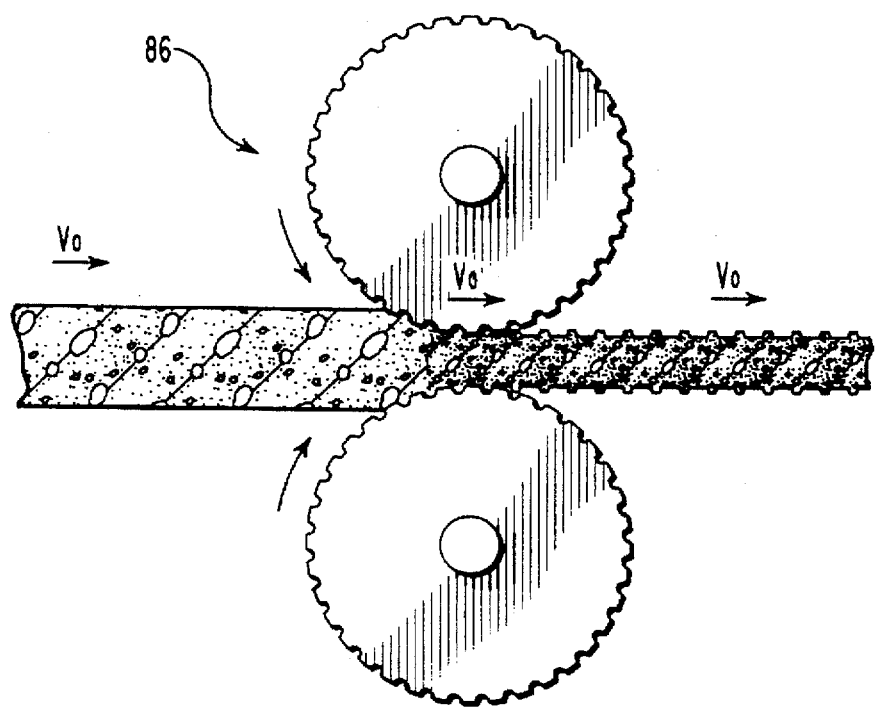
FIG. 7 is a side view of a pair of corrugated rollers used to form a corrugated sheet.

It may be desirable to corrugate a hydraulically settable sheet in a manner similar to corrugated cardboard. This may be accomplished by passing a sheet, preferably in a semi-moist condition, between a pair of corrugated rollers 86 as shown in FIG. 7. The moisture content of the sheet should be controlled so that the corrugation process does not damage the hydraulically settable matrix. If the sheet is too dry, the corrugation process can damage the hydraulically settable matrix, and in some cases may even result in the tearing or splitting of the sheet. Conversely, if the sheet is too moist, the corrugated sheet may lack the green strength necessary to maintain the corrugated shape. Preferably the percent by volume of water in the hydraulically settable sheet is between about 1% and 20%, more preferably between about 3% and 15%, and most preferably between about 5% and 10%.

The corrugated sheet can be utilized as a single sheet or it can be combined with other sheets to form laminates as described above. The corrugated sheet can be laminated with a single flat hydraulically settable sheet or a sheet formed from other materials, thus resulting in a "single-face" corrugated sheet. Sandwiching a corrugated sheet between two flat sheets results in a "double-face" sheet. Multiple wall corrugated sheets can be created by alternating flat and corrugated layers. Single-face, double-face, and multiple wall corrugated sheets are characterized by relatively low density and relative high stiffness and compressive strength. They can be used wherever articles, such as containers and packaging materials, require such properties.

The strength and flexibility of a single corrugated sheet can be altered by varying the number of corrugations or flutes per liner foot. The flutes per linear foot can be increased to create a more flexible sheet or the flutes can be decreased to obtain a strong sheet with a high degree of cushioning ability. Multiple wall corrugated sheets can also be created with two or more corrugated sheets having different amounts of flutes per linear foot. As with scoring, score cutting, and perforating (which are described more fully below), the individual flutes of the corrugated sheets create locations where the sheet might more naturally bend or fold. However, the sheet is actually much stiffer and stronger in the direction perpendicular to the row of the flutes. Therefore, an article, such as a container or other packaging material, should be constructed so that the corrugated sheet will afford maximum flexibility where needed and maximum stiffness where needed, such as where the article will be stacked.

Coatings which are described in greater detail herein below can also be applied as part of the corrugating process. Coatings, particularly waxes or polyethylene, can be applied with hot roll coaters on the corrugator. Coatings can also be applied by curtain coating the corrugated blank before it is converted into an article. Other useful coating processes involving corrugated sheets include dipping completed articles into coatings, such as waxes, or cascading such coatings through and around the flutes of the corrugated article.

C. Coatings and Coating Processes.

It is within the scope of the present invention to apply coatings or coating materials to the hydraulically settable sheets or to articles made from such sheets. Coatings can be used to alter the surface characteristics of the hydraulically settable sheet in a number of ways, including sealing and protecting the sheet or article made therefrom. Coatings may provide protection against moisture, base, acid, grease, organic solvents. They may also provide a smoother, glossier, or scuff-resistant surface and help prevent fiber "fly away". Coatings may also provide reflective, electrically conductive or insulative properties. They may even reinforce the hydraulically settable sheet, particularly at a bend or fold line. Some of the coatings can also be utilized as laminating materials or as adhesives.

Related to the concept of coating is the "sizing" of the sheets, which essentially refers to the sealing of the pores of the sheets. Sizing can be used to improve the smoothness and water resistance of the hydraulically settable sheets. They can either increase or decrease the strength, modulus, and elongation (or extensibility) depending on their composition and amount used. Some sizings or coatings may soften the hydraulically settable matrix, thereby resulting in a more flexible sheet. Others may make the sheet more stiff.

The object of the coating process is usually to achieve a uniform film with minimal defects on the surface of the sheet. Coatings can be applied during the sheet forming process, the article forming process, or after the article is formed. The selection of a particular coating process depends on a number of substrate (i.e., sheet) variables, as well as coating formulation variables. The substrate variables include the strength, wetability, porosity, density, smoothness, and uniformity of the sheet. The coating formulation variables include total solids content, solvent base (including water solubility and volatility), surface tension, and rheology.

The coatings may be applied to the sheets using any coating means known in the art of manufacturing paper, paperboard plastic, polystyrene, sheet metal, or other packaging materials, including blade, puddle, air-knife, printing, Dahlgren, gravure, and powder coating. Coatings may also be applied by spraying the sheet, article, or other object with any of the coating materials listed below or by dipping the sheet, article, or other object into a vat containing an appropriate coating material. Finally, coatings may be coextruded along with the sheet in order to integrate the coating process with the extrusion process. A more detailed description of useful coating processes is set forth in the Andersen-Hodson Technology.

Appropriate organic coatings include edible oils, melamine, polyvinyl chloride, polyvinyl alcohol, polyvinyl acetate, polyacrylates, polyamides, hydroxypropylmethylcellulose, polyethylene glycol, acrylics, polyurethane, polyethylene, polylactic acid, Biopol® (a polyhydroxybutyratehydroxyvalerate copolymer), starches, soybean protein, polyethylene, and synthetic polymers including biodegradable polymers, waxes (such as beeswax or petroleum based wax), elastomers and mixtures thereof. Biopol® is manufactured by ICI in the United Kingdom. Appropriate inorganic coatings include sodium silicate, calcium carbonate, aluminum oxide, silicon oxide, kaolin, clay, ceramic and mixtures thereof. The inorganic coatings may also be mixed with one or more of the organic coatings set forth above.

In some cases, it may be preferable for the coating to be elastomeric or deformable, particularly for articles formed by folding or convoluting. Some coatings may also be used to strengthen places where the hydraulically settable sheets are severely bent, such as where the sheet has been scored. In such cases, a pliable, possibly elastomeric, coating may be preferred. Besides these coatings, any appropriate coating material would work depending on the application involved.

A waterproof coating is desirable for articles intended to be in contact with water. If the sheets are used to manufacture containers or other products intended to come into contact with foodstuffs, the coating material will preferably comprise an FDA-approved coating. An example of a particularly useful coating is sodium silicate, which is acid resistant. Resistance to acidity is important, for example, where the article is a container exposed to foods or drinks having a high acid content, such as soft drinks or juices. It is generally unnecessary to protect the article from basic substances, but increased resistance to basic substances can be provided by an appropriate polymer or wax coating, such as those used to coat paper containers.

Polymeric coatings are useful in forming generally thin layers having low density such as polyethylene. Low density polyethylene is especially useful in creating containers which are liquid-tight and even pressure-tight to a certain extent. Polymeric coatings can also be utilized as an adhesive when heat sealed.

Aluminum oxide and silicon oxide are useful coatings, particularly as a barrier to oxygen and moisture. The coatings can be applied to the hydraulically settable sheet by any means known in the art, including the use of a high energy electron beam evaporation process, chemical plasma deposition and sputtering. Another method of forming an aluminum oxide or silicon oxide coating involves the treating of the hydraulically settable sheet with an aqueous solution having an appropriate pH level to cause the formation of aluminum oxide or silicon oxide on the sheet due to the composition of the sheet.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

D. Scoring and Perforation Processes.

Figure 9:
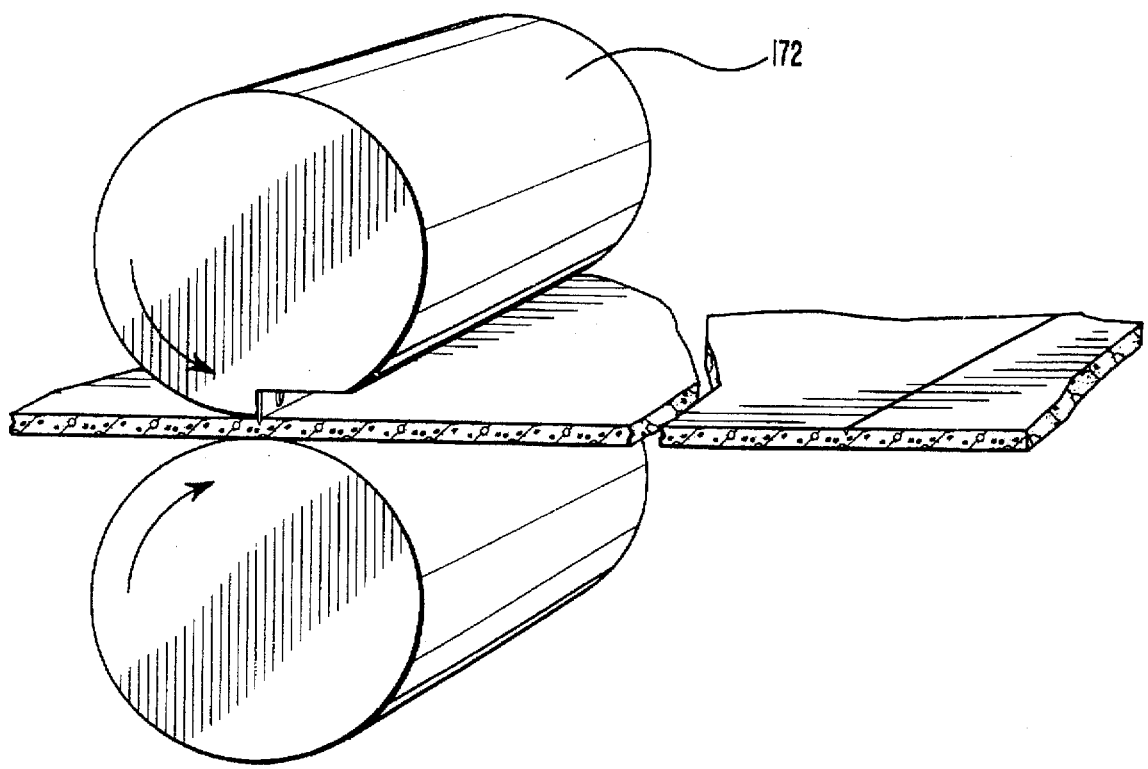
FIG. 9 is a perspective view of a sheet being score cut by a continuous die cut roller.
Figure 10:
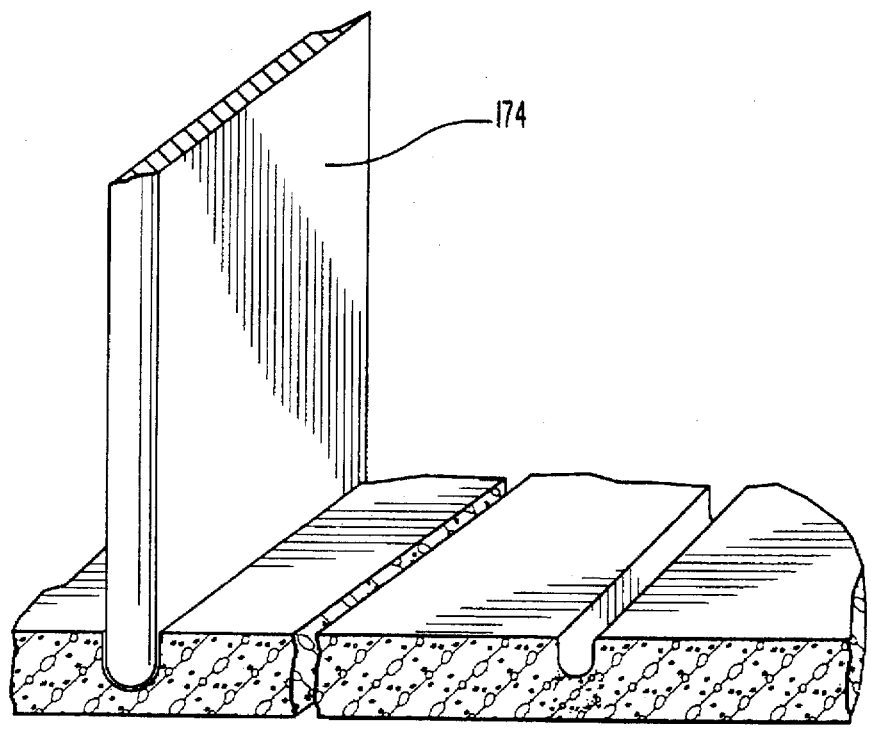
FIG. 10 is a perspective view of a score being pressed into a sheet by a scoring die.
Figure 11:
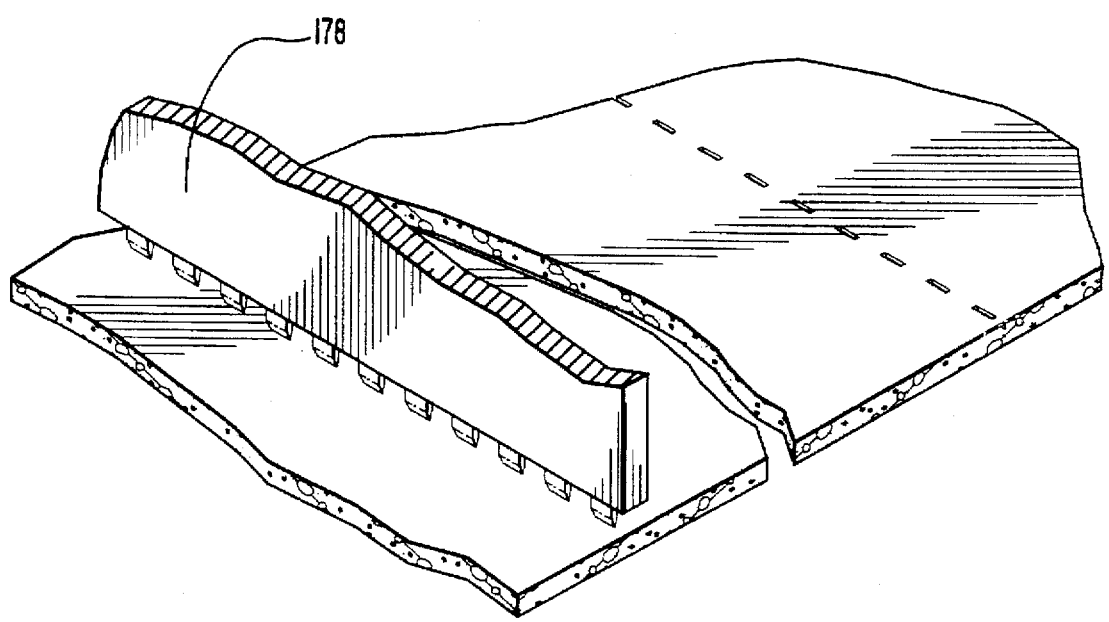
FIG. 11 is a perspective view of a sheet being perforated by a perforation cutter.

In some cases it may be desirable to alternatively score, score cut, or perforate the sheet in order to define a line upon which the sheet may fold or bend. Score cuts can be made by using a knife blade cutter 70 (FIG. 8) mounted on a score press, or it can be accomplished using a continuous die cut roller 74 as shown in FIG. 9. Alternatively, a score (not a score cut) may be pressed into the sheet by means of a rounded scoring die or rule 174 as shown in FIG. 10. The scoring die or rule can be used alone or in conjunction with a score counter. This scoring rule configuration forces the sheet to deform into the groove of the score counter. Finally, a perforation may be made by means of a perforation cutter 178 depicted in FIG. 11.

Where the hydraulically settable sheet has a relatively low fiber content (less than 15% by volume of the total solids), it is preferable to score cut rather than score press the sheet. Conversely, where the sheet has a relatively high fiber content (greater than 15% by volume of the total solids), it is preferable to score press rather than score the sheet. Finally, perforations generally work well in sheets of any fiber content.

The purpose of the score, score cut, or perforation is to create a location on the hydraulically settable sheet where the sheet can be bent or folded. This creates a "hinge" within the sheet with far greater bendability and resilience than possible with an unscored or unperforated hydraulically settable sheet. In some cases multiple score cuts or perforations may be desirable. Scoring or creping can also be utilized to create a more bendable hydraulically settable sheet. These techniques can also be utilized to form a hinge.

Figure 12:
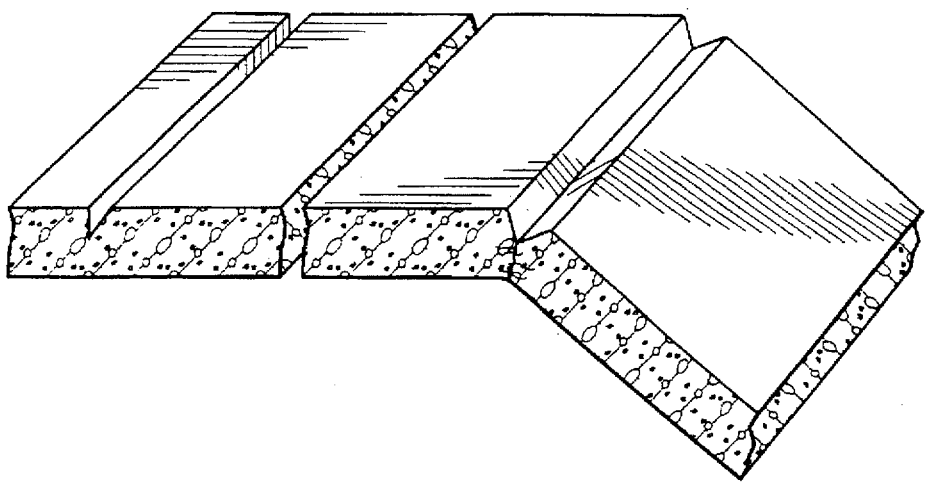
FIG. 12 is a perspective view showing how a sheet with a score cut more easily bends at the score cut.

Cutting a score line or perforation within the sheet creates a better fold line or hinge for a number of reasons. First, it provides a place where the sheet might more naturally bend or fold. Second, cutting a score makes the sheet at the score line thinner than the rest of the sheet, which reduces the amount of lengthwise elongation of the surface while bending the sheet. The reduction of surface elongation reduces the tendency of the hydraulically settable matrix to fracture upon being folded or bent (FIG. 12). Third, the score cut or perforation allows for a controlled crack formation within the hydraulically settable matrix in the event that fracture of the hydraulically settable matrix OCCURS.

It may sometimes be preferable to concentrate more fibers at the location at which the score cut or perforation is made. This can be accomplished by co-extruding a second layer of hydraulically settable material containing a higher fiber content at predetermined timed intervals to correspond with the location of the score cut or perforation. In addition, fibers can be placed on top of, or injected within, the sheet during the extrusion or calendering processes in order to achieve a higher fiber concentration at the desired location. When scoring corrugated sheets it is generally preferable to score the corrugated sheet in the direction perpendicular to the direction of the flutes.

The hydraulically settable sheet will be preferably in a substantially dry or semi-hardened state during the scoring or perforation process. This is desirable to prevent the score or perforation from closing up through the migration of moist material into the score cut. Since scoring generally (and perforation always) involves cutting through a portion of the hydraulically settable matrix, the sheet can even be totally dry without the scoring or perforation process harming the sheet. However, in cases where a score is pressed rather than cut into the sheet surface, the sheet should be moist enough to prevent fracture due to the dislocation of the hydraulically settable matrix.

The depth of the score cut will generally depend on the type of score, the thickness of the hydraulically settable sheet, and the desired degree of bending along the score line. The scoring mechanism should be adjusted to provide for a score of the desired depth. Of course, the die cutter should not be so large as to actually cut through the sheet or render it too thin to withstand the anticipated forces (unless an easily tearable score is desired). Preferably, the score cut should be just deep enough to adequately serve its purpose. A combination of score cuts on alternative sides of the sheet may be preferred in some cases to increase the range of bending motion.

In most cases where a thinner sheet (<1 mm) is being score cut, the cut will have a depth relative to the overall thickness of the sheet that is within the range from between about 10% to about 50%, more preferably within the range from between about 20% to about 35%. In the case of thicker sheets, the score cut will usually be deeper due to the decrease in bendability of the thicker sheet.

It should be understood that the hydraulically settable sheets of the present invention will bend away from a score cut or perforation, while bending toward a score that is pressed into the surface of the sheet. That is, the sides of the sheet defined by a score cut or perforation will close together in the side opposite the score cut or perforation. Conversely, like conventional paper or paperboard products, the sides of the hydraulically settable sheet defined by a score pressed into the sheet surface will close together on the side of the score.

E. Creping and Parchmenting Processes.

The hydraulically settable sheets may alternatively be creped much like conventional paper in order to provide a highly extensible sheet that is capable of absorbing energy at sudden rates of strain. Creped sheets are increasingly important in the production of shipping sacks. Conventional creping is performed either at the wet press section of a paper machine (wet crepe) or on a Yankee dryer (dry crepe). Although the exact parameters of either a wet or dry creping process will differ between the hydraulically settable sheets of the present invention and tree paper, one of ordinary skill in the art will recognize how to adjust the creping process in order to obtain creped hydraulically settable sheets.

It has been found that the hydraulically settable sheets can be treated with strong acids in order to parchment the fibrous surface portion of the sheet matrix. Treating the sheet with, for example, concentrated sulfuric acid causes the cellulosic fibers to swell tremendously and become partially dissolved. In this state, the plasticized fibers close their pores, fill in surrounding voids and achieve more intimate contact between them for more extensive hydrogen bonding. Rinsing with water causes reprecipitation and network consolidation, resulting in fibers that are stronger wet than dry, lint fee, odor free, taste free, and resistant to grease and oils. By combining parchment's natural tensile toughness with extensibility imparted by wet creping, paper with great shock-absorbing capability can be produced.

In the present invention, it can be seen that the parchmenting process would be expected to work better as the fiber content of the sheets is increased. Increased fiber content facilitates the sealing of the pores and increased hydrogen bonding of the fibers. It should be understood, however, that certain acid sensitive aggregates, such as calcium carbonate, should probably not be used where the sheet is to be parchmented.

F. Printing and Related Processes.

It may be desirable to apply print or other indicia, such as trademarks, product information, container specifications, or logos, on the surface of the hydraulically settable sheet. This can be accomplished using any conventional printing means or processes known in the art of printing paper or cardboard products, including planographic, relief, intaglio, porous, and impactless printing. In addition, the sheets or articles may be embossed or provided with a watermark. Because the hydraulically settable sheets have a relatively high porosity like paper or cardboard, the applied ink will tend to dry rapidly. In addition, decals, labels or other indicia can be attached or adhered to the hydraulically settable sheet using methods known in the art. Printed indicia may be applied to a continuous sheet, individual sheets, laminated sheets, blanks, or completed articles depending on the printing process involved and the shape of the article.

IV. Fashioning Hydraulically Settable Sheets into Articles.

The sheets prepared according to the methods set forth above may be used in a dry or semi-dry state in order to fashion various articles of manufacture, including as containers. A vast array of articles of manufacture can be fashioned from a sheet having a hydraulically settable matrix. Some articles can be formed simply by cutting the sheet into a desired shape. Other articles are fashioned from a hydraulically settable sheet by cutting a blank from the sheet and then converting the blank into a desired article by folding, convoluting, spiral winding, molding, assembling the blank or blanks, pouch forming, or other similar methods known to those skilled in the art. In many cases, two or more of these converting processes may be used in combination or in sequence.

Fashioning hydraulically settable sheets or blanks into articles frequently involves seaming a portion of the article by applying adhesives, by crimping, applying pressure, hermetically sealing, remoistening a portion and applying pressure, stapling, taping, sewing, alone or in combination. In many cases, fashioning the hydraulically settable sheets or blanks involves remoistening a portion of the hydraulically settable sheets or blanks, particularly when the sheet is subject to stress by the converting processes such as folding, rolling, spiral winding, molding, assembling or pouch forming.

The structure and qualities of articles within the scope of this invention can also be varied by altering the mix design utilized to form the hydraulically settable sheets. The intended use of an article determines the requisite mix design, the need for the optional processing steps, and the best method for converting a hydraulically settable sheet or blank into an article. The intended use also determines the dimensions of the sheet to be formed and the dimensions of the blank which will be cut from the sheet.

The converting processes of folding, rolling, convoluting, spiral winding, molding, assembling individual pieces, or pouch forming affords an almost infinite variety of containers and other articles. In fact, any known or imaginable container shape is possible using the hydraulically settable sheets of the present invention. The disclosed methods of converting hydraulically settable sheets or blanks into articles of manufacture such as containers and other packaging materials, as well as the specific structural configurations of the containers set forth herein, are given by way of example only and not by limitation. The scope of this invention incorporates all methods presently known in the art for forming articles such as containers and other packaging materials from sheets made of other materials, such as paper, cardboard, plastic, polystyrene, or metal.

A. Cutting and Slotting Blanks.

In many cases, it will be desired to first cut an appropriate shape or "blank" from the hydraulically settable sheet, whether it be a continuous or an individual sheet. Cutting a sheet into a shape or blank corresponding to an article can occur simultaneously to, before, or after the scoring or perforation of the sheet. In some cases an article can be manufactured from a single blank while in others two or more blanks may be assembled into the desired article. In either event, it will usually be necessary to fasten or adhere adjacent ends of the blank together in order for the article to maintain its intended shape.

Figure 13:
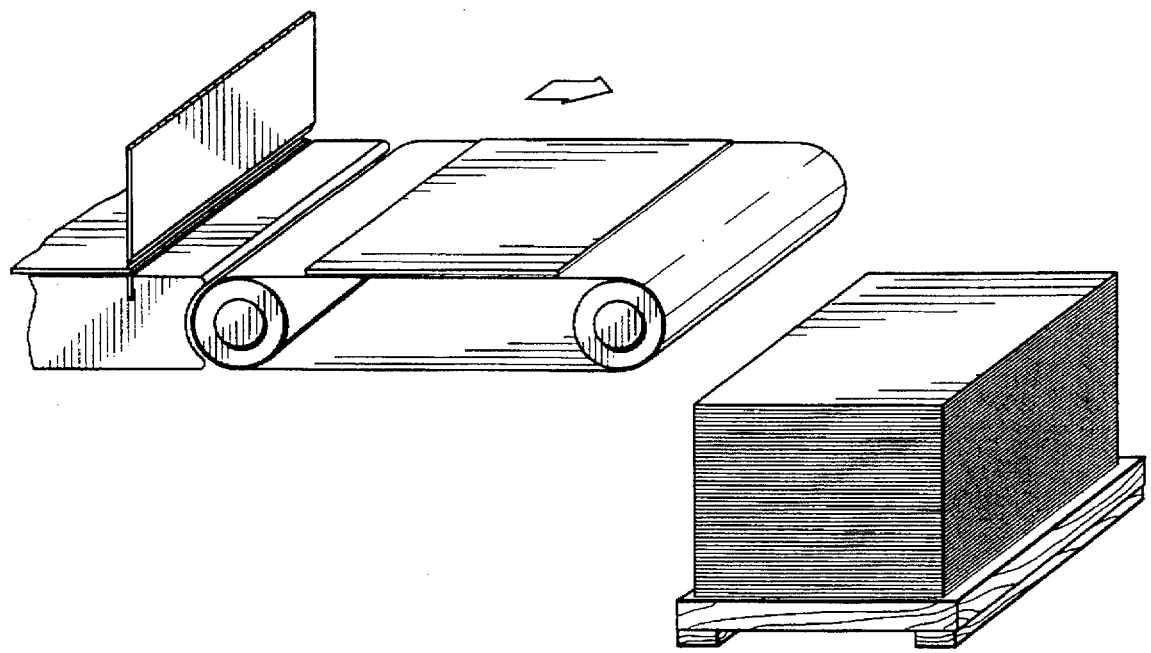
FIG. 13 is a perspective view showing a continuous sheet cut into individual sheets and stacked.

The cutting mechanisms utilized with paper and paperboard can also be utilized to cut a continuous hydraulically settable sheet into individual sheets as shown in FIG. 13. The sheet can be cut into individual sheets by the use of a knife blade cutter mounted on a press, it can also be accomplished using continuous die cut rollers, by pressing a cutting die into the sheet, or other means known in the art. The individual sheets can then be cut into blanks. Some articles can also be formed directly from the individual sheets after cutting the continuous sheet.

Presses can be utilized to simultaneously cut and score a blank from a sheet, which presses consist of two flat beds or platens. One platen or both can be configured with a die having combinations of cutting and scoring rules or knives to simultaneously cut and score the sheet. The die is similar to a large cookie cutter; it generally has wood blocks with rules or knives between the blocks which project beyond the blocks. The blocks are held together inside a frame and held tight through the use of wedges.

Continuous die cut rollers generally permit faster blank formation than the use of presses; however, the continuous die cut rollers are generally more expensive to form. The knives, rules, and score channels forming the dies of these matched rollers are produced by both electrical discharge and mechanical machining. The dies can also be formed by pattern-chemical-etching of thin metal plates. The cutting and scoring patterns on the plates can be coated with chemical-resistant materials and chemicals used to reduce the thickness of the plate in unprotected areas, resulting in raised rules. Scores are formed by pushing the sheet with the rule of one plate into a channel formed between two rules of the second plate, a very similar configuration achieved by the die presses described above. Cutting is achieved by cutting rules on opposing plates which are offset slightly from each other. As these rules rotate they approach each other closely but do not touch while compressing the sheet. The compressive forces within the sheet cause it to rupture, thereby yielding cut edges.

Stacks of cut sheets can be stripped by knocking off the trim, or the portions of the sheet which are not necessary for use as a blank. The trim can be removed from the sheet by a stripper such as a mallet, an air hammer or other means. The portions of the sheet remaining after the blank is removed can be utilized as an aggregate material in subsequent mixtures.

When the article is a container and product visibility is desirable, a hole can be cut into the blank to create a window. The container window can be covered with a transparent film to prevent the escape of contents which will be stored in the container. The transparent film can be secured with adhesives.

Slotting is useful to create flaps of a box, particularly in thick sheets such as corrugated sheets and laminates. Sheets can be slotted by passing between a slotter, which is a pair of rotating disks one of the rotating disks having a U-shaped die or a raised knife. As the sheet is advanced between the two disks, the U-shaped die creates a slot in the sheet by compressing the sheet in the area between the die on one of the disks and the other disk.

After a blank has been cut from a hydraulically settable sheet, the blank can be converted into an article by folding, convoluting, spiral winding, molding, assembling the blank, pouch forming or any combination of these methods.

B. Fashioning Hydraulically Settable Sheets into Articles by Folding the Hydraulically Settable Sheets.

Hydraulically settable sheets and blanks cut from hydraulically settable sheets can be fashioned into a variety of articles by folding the sheet or blank. The term "folding" as used in this specification and the appended claims is intended to include bending a hydraulically settable sheet or blank, doubling over a hydraulically settable sheet or blank, creating a hinge, creasing, pleating, crimping, gathering, plicating and creating mechanical interlocking devices from the hydraulically settable sheet or blank.

Examples of articles which can be fashioned from hydraulically settable sheets and blanks by folding include cartons, boxes, corrugated boxes, sandwich containers, hinged "clam-shell" containers (such as hinged sandwich containers utilized with fast-food sandwiches and hinged salad containers), dry cereal boxes, milk cartons, fruit juice containers, carriers for beverage containers (such as wraparound carriers, basket-style carriers, "six pack" ring-style carriers), ice cream cartons, pleated cups, cone cups, french-fry scoops used by fast-food outlets, fast-food carryout boxes, wraparound casing, open ended bags, and envelopes.

Fashioning the hydraulically settable sheets or blanks by folding may also involve seaming a portion of the hydraulically settable sheets or blanks. The term "seaming" as used in this specification and the appended claims is intended to include bringing at least two portions of a hydraulically settable sheet or blank in contact or bringing a portion of a hydraulically settable sheet or blank in contact with another sheet or blank and joining, merging, combining, connecting, linking, or sealing the portions together by applying adhesives, by crimping, applying pressure, hermetically sealing, remoistening the portions and applying pressure, stapling, taping, sewing or any combinations of these methods of seaming.

Useful adhesives include, but are not limited to, waterborne adhesives (both natural and synthetic), hot-melt adhesives, and solvent-borne adhesives. In addition to the wide variety of adhesives within the scope of this invention a wide variety of adhesive applicators are operable. Useful adhesive applicators include, but are not limited to, straightline gluers, right-angle gluers, in-fold gluers, and plunger-type gluing equipment.

It is within the scope of this invention to fold an integral blank into articles from an integral blank. It is also within the scope of this invention to fashion articles from more than one blank by folding the blanks and assembling the folded blanks into articles, such as containers. In fashioning articles from more than one blank, the blanks can be folded into separate parts which can be assembled and seamed together or the parts can remain separable.

Articles, particularly containers, fashioned from a blank which has been cut from a hydraulically settable sheet by merely folding the blank, frequently utilize mechanical locking devices. Mechanical locking devices are formed by folding, cutting and/or scoring the sheet to create predetermined designs. The designs can then be utilized to fold, tuck, and insert portions of the blank in a manner resulting in a self supporting article. The mechanical locking devices may also provide means for closing, sealing or resealing a container.

Conventional mechanical interlocking devices utilized to fold articles within the scope of this invention include such methods and configurations as interlocking bottom flaps popularly utilized for containers in fast food restaurants, pleating a sheet, locked corners popularly utilized in cartons or boxes, the interlocking holes and tabs popularly utilized in wraparound carriers for beverage containers, and any other method and configuration for tucking portions of a blank used to convert a blank into an article.

Figure 14A:
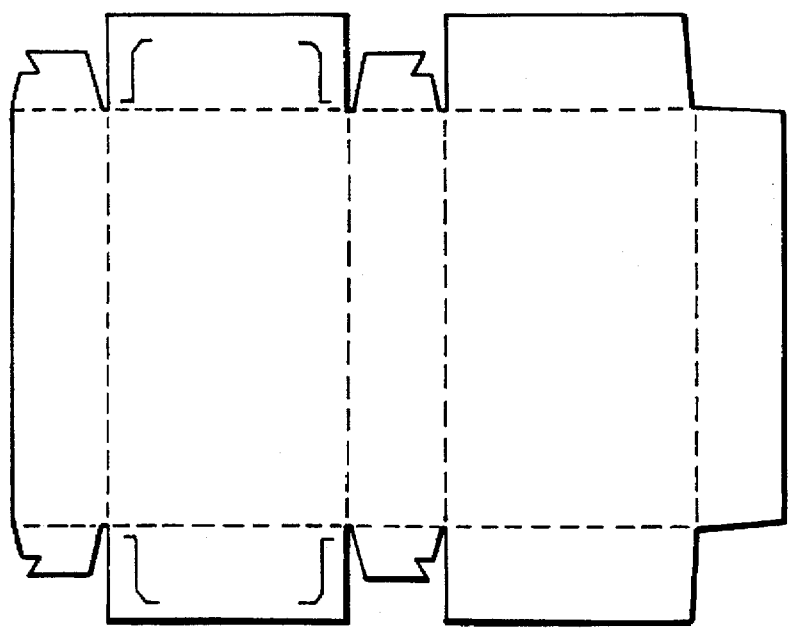
FIG. 14A is a perspective view of a locked-corner hinge-cover carton blank.
Figure 14B:
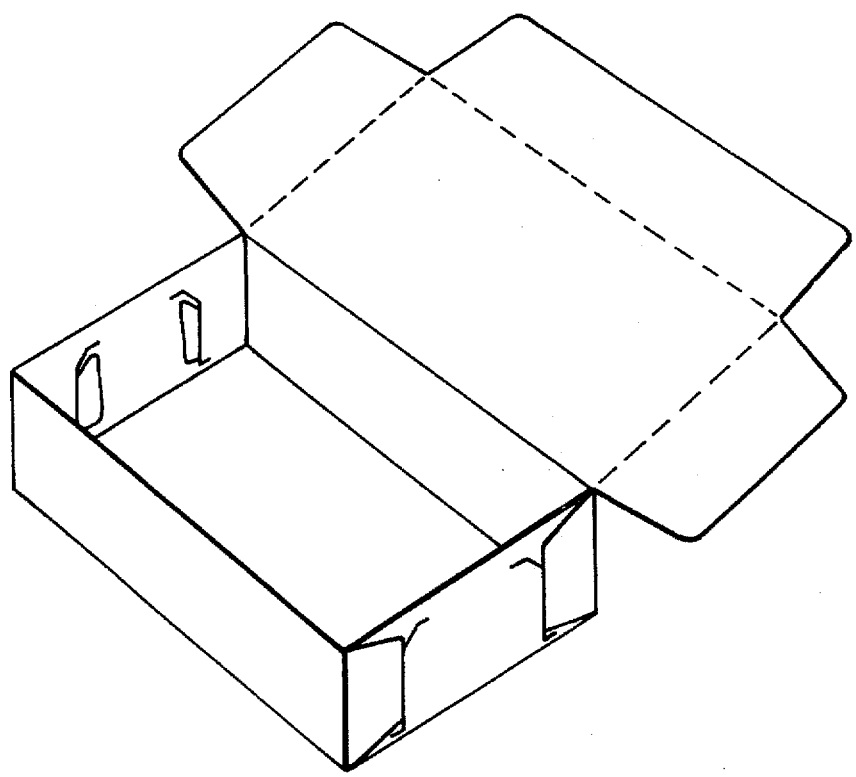
FIG. 14B is a perspective view of a locked-corner hinge-cover carton.
Figure 15A:
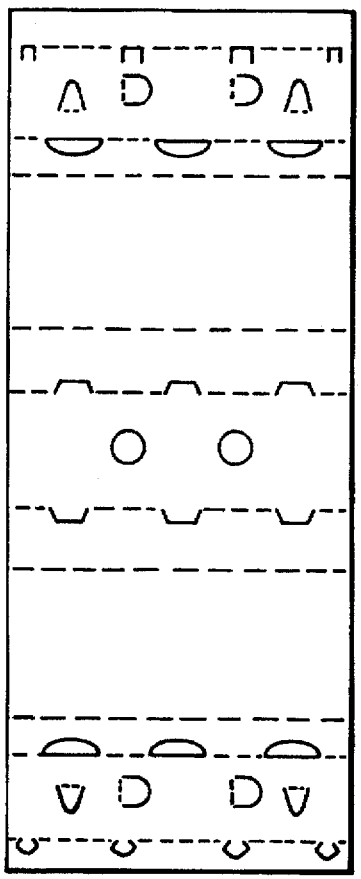
FIG. 15A is a perspective view of a wraparound carrier blank.
Figure 15B:
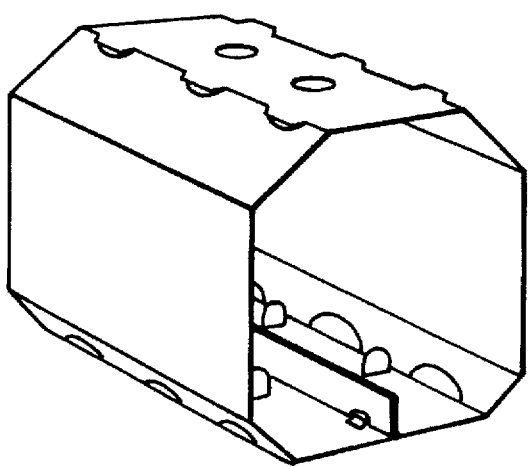
FIG. 15B is a perspective view of a wraparound carrier carton.
Figure 16A:
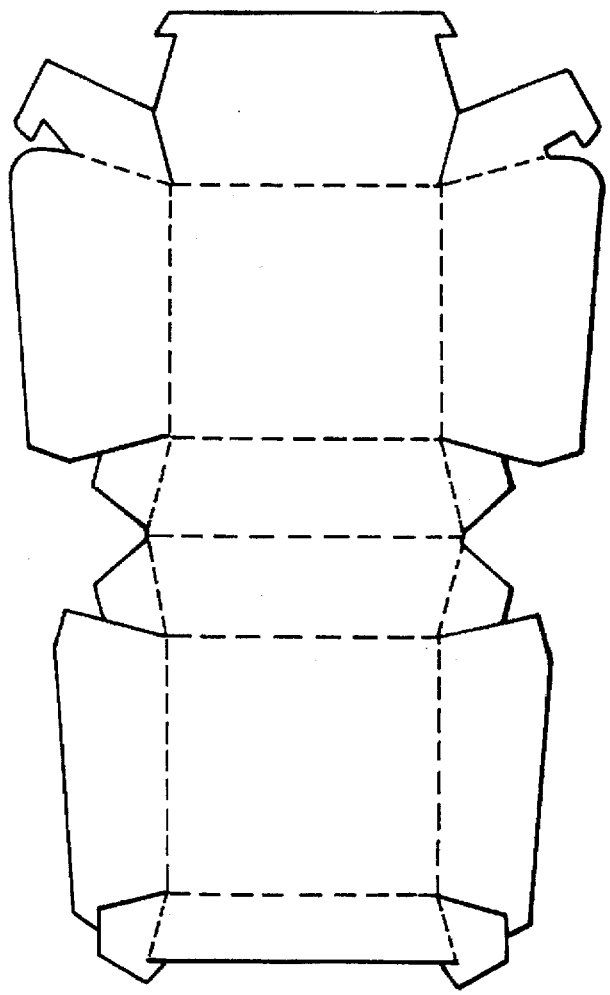
FIG. 16A is a perspective view of a hinged clam-shell container blank.
Figure 16B:
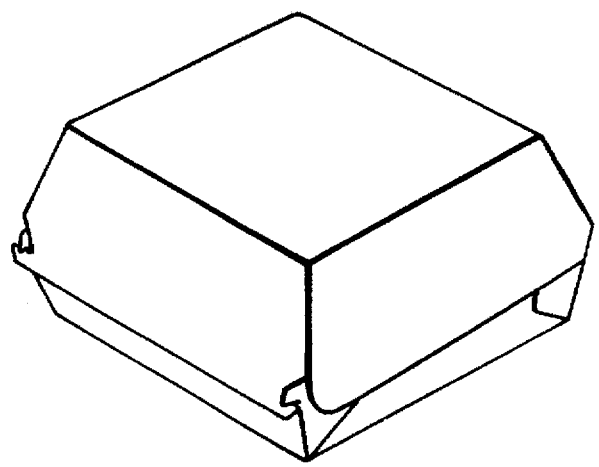
FIG. 16B is a perspective view of a hinged clam-shell container.

Mechanical interlocking devices permit folding integral blanks into articles from integral blanks without the need for seaming. An example of folding an integral blank into an article without seaming is provided by a locked-corner hinge-cover carton. A locked-corner hinge-cover carton blank as depicted in FIG. 14A can be folded into the configuration shown in FIG. 14B. Another example of folding an integral blank without the need for seaming is provided by a wraparound carrier for beverage containers utilizing interlocking holes and tabs. The blank depicted in FIG. 15A can be folded into a wraparound carrier as shown in FIG. 15B. An additional example of a container which can be folded from an integral blank is a hinged "clam-shell" container. "Clam-shell" containers can be fashioned by folding an integral blank as depicted in FIG. 16A into the configuration as shown in FIG. 16B.

Some articles can be fashioned by folding more than one blank into separate container parts, such as a body and a lid. The hinged "clam-shell" container shown in FIG. 16B, for example, can also be fashioned into a separate body and lid which can be attached together by seaming a hinge to the body and lid. The blanks utilized to fashion a hinged "clam shell" container body and lid can also be configured with a hinge extending from either the body and lid.

Figure 17A:
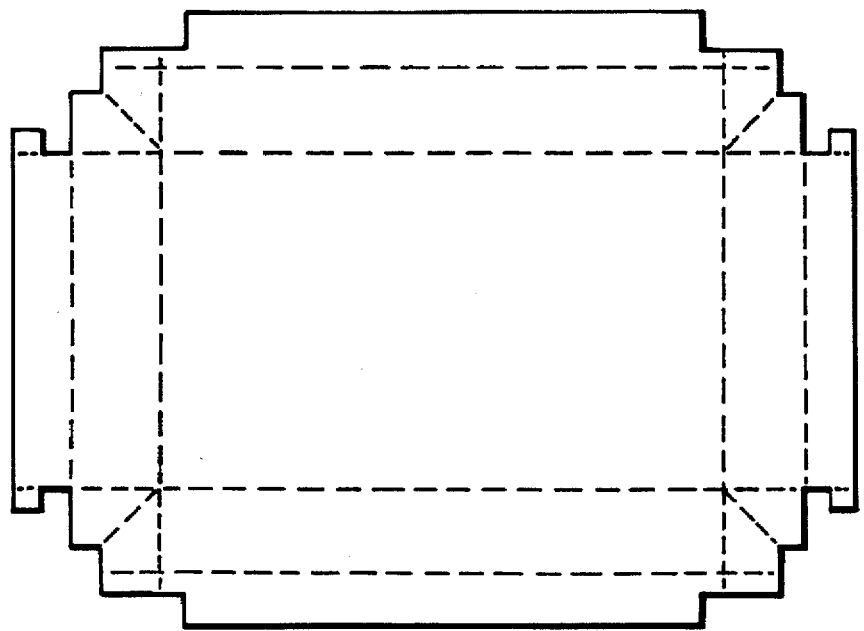
FIG. 17A is a perspective view of a web-corner carton body blank.
Figure 17B:
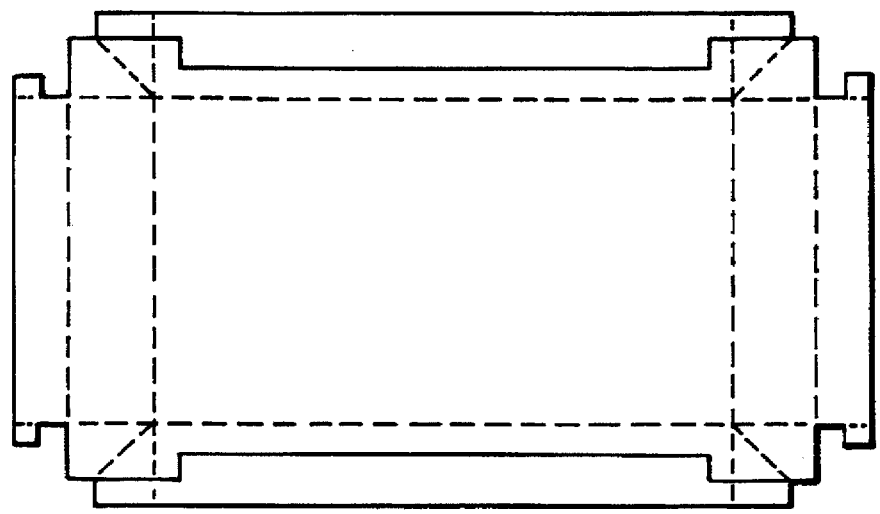
FIG. 17B is a perspective view of a web-corner carton lid blank.
Figure 17C:
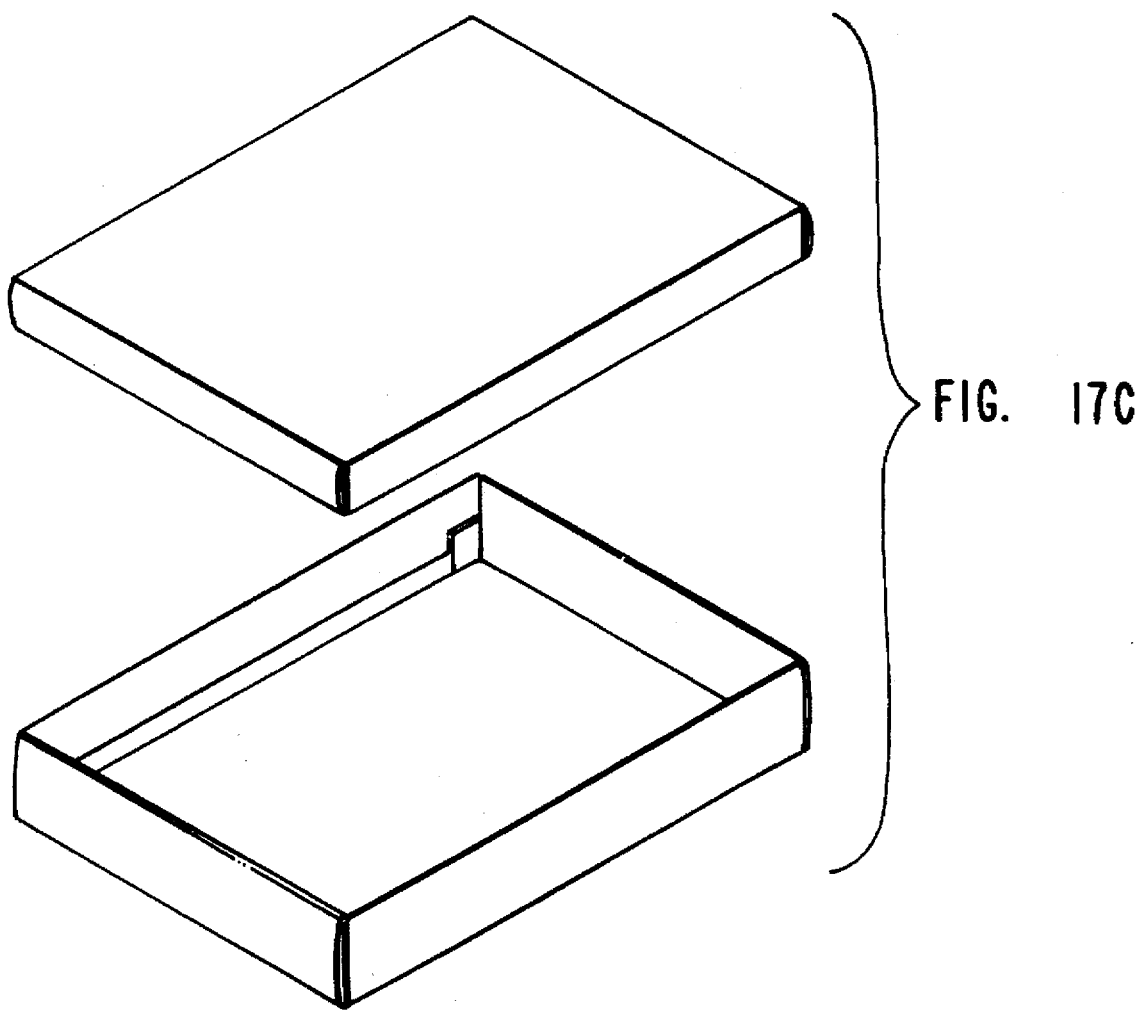
FIG. 17C is a perspective view of a web-corner carton.

Articles can also be fashioned by folding blanks into separate parts which remain separable. A web-corner carton is an example of an article which can be fashioned by folding blanks into separate parts which remain separable. FIG. 17A depicts a blank which can be folded into a web-corner carton body and FIG. 17B depicts a blank which can be folded into a web-corner carton lid. A web-corner carton is shown in FIG. 17C with a web-corner carton body and a web-corner carton lid.

Many articles utilizing mechanical interlocking devices can utilize seaming instead of or in addition to mechanical interlocking devices. A wide variety of articles can be fashioned by both folding portions of the blank into mechanical interlocking devices and seaming portions of the blank or the article. Any combination of mechanical interlocking devices and seams are operable to fashion articles within the scope of this invention.

Figure 18A:
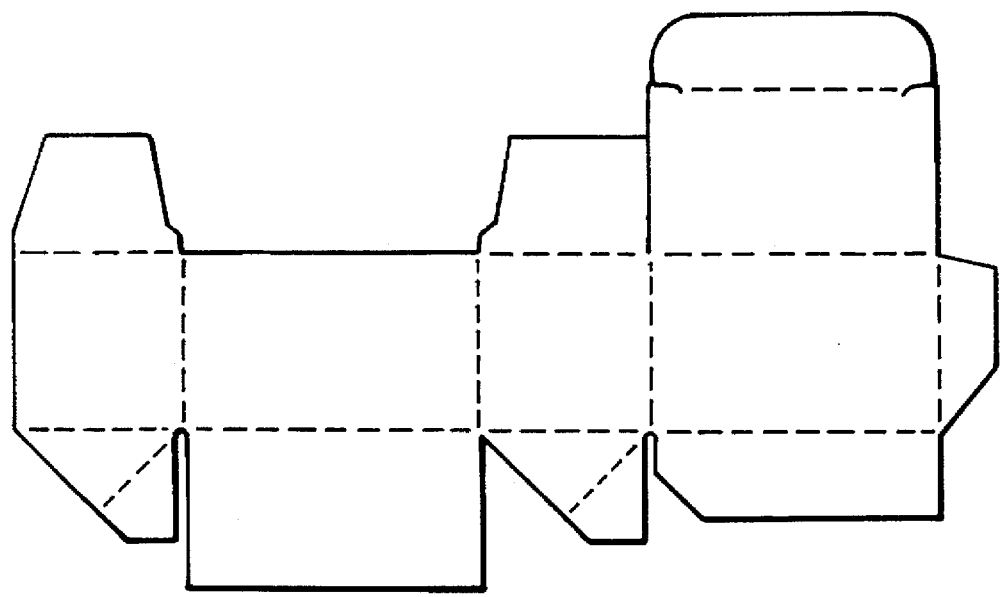
FIG. 18A is a perspective view of a fast-food carryout box blank.
Figure 18B:
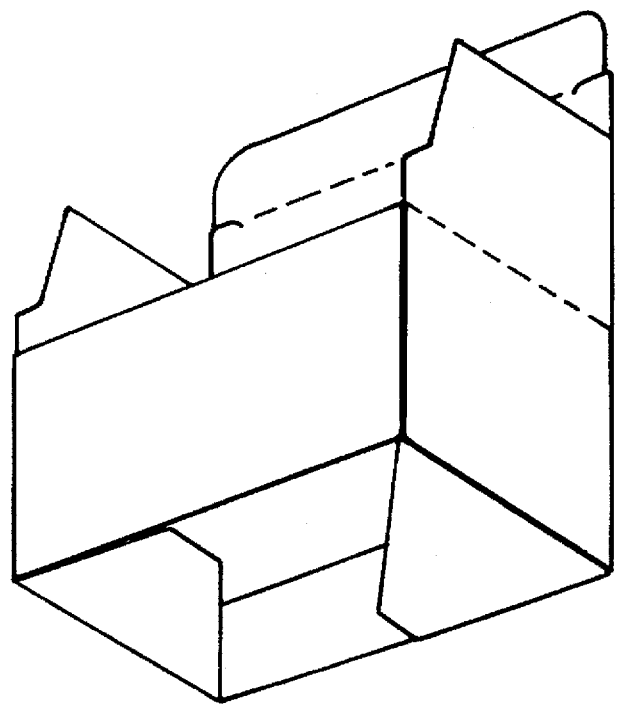
FIG. 18B is a perspective view of a fast-food carryout box.
Figure 19A:
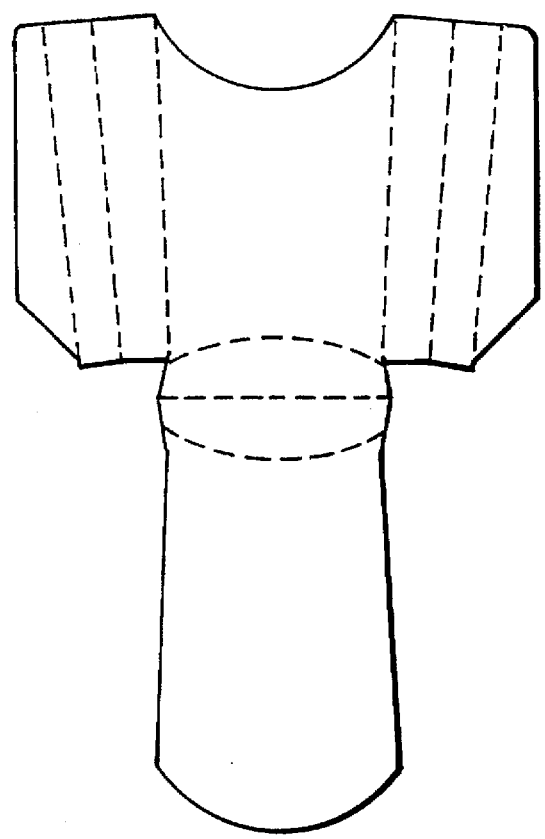
FIG. 19A is a perspective view of a french fry container blank.
Figure 19B:
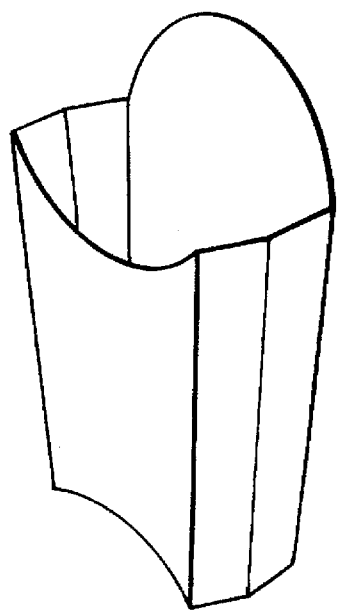
FIG. 19B is a perspective view of a french fry container.

An example of an article fashioned by folding and seaming an integral blank within the scope of this invention is provided by a fast-food carryout box. FIG. 18A depicts a blank which can be folded and seamed to fashion a fast-food carryout box shown in FIG. 18B. The fast-food carryout box shown in FIG. 18B has a bottom formed by folding portions of the blank into mechanical interlocking devices while the side is seamed. Another example of an article fashioned by folding and seaming which is useful in the fast-food industry is a french fry container. A french fry container blank is depicted in FIG. 19A, this blank can be converted into the french fry container configuration as shown in FIG. 19B.

Figure 20A:
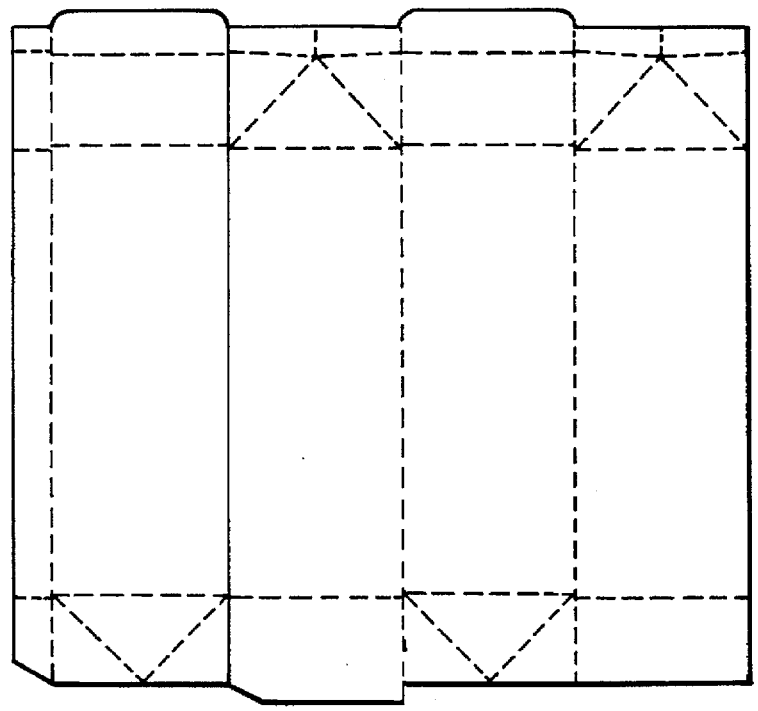
FIG. 20A is a perspective view of a liquid-tight milk carton container blank.
Figure 20B:
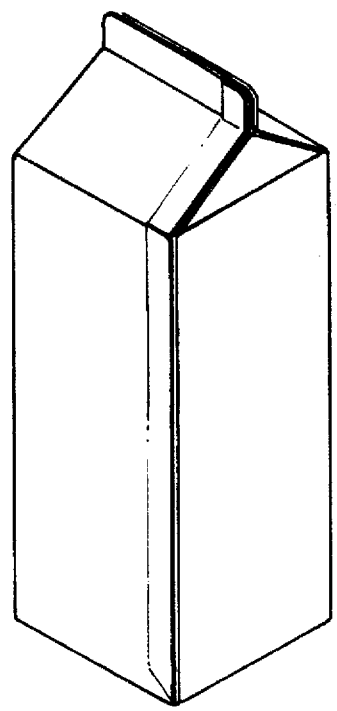
FIG. 20B is a perspective view of a liquid-tight milk carton.
Figure 21A:
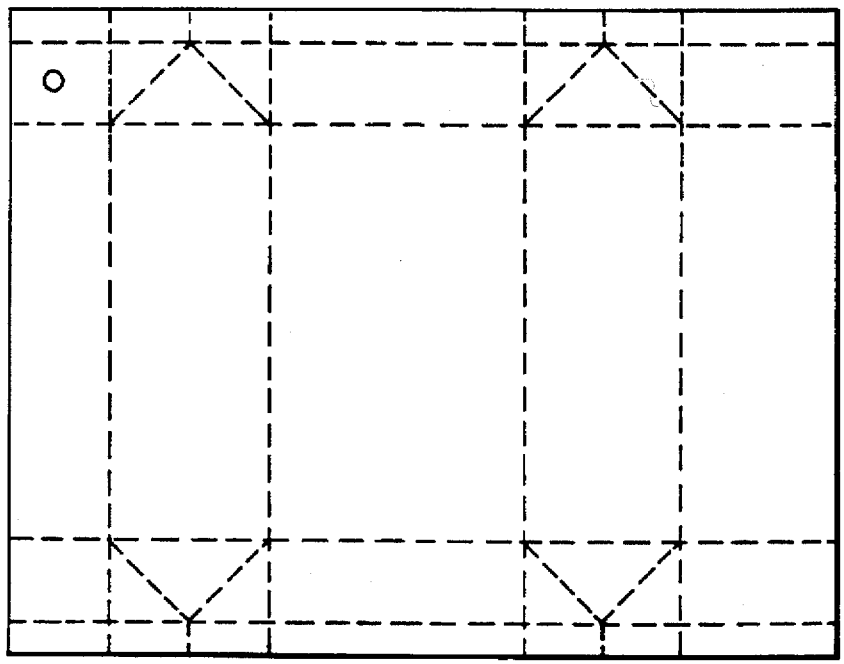
FIG. 21A is a perspective view of a liquid-tight fruit juice container blank.
Figure 21B:
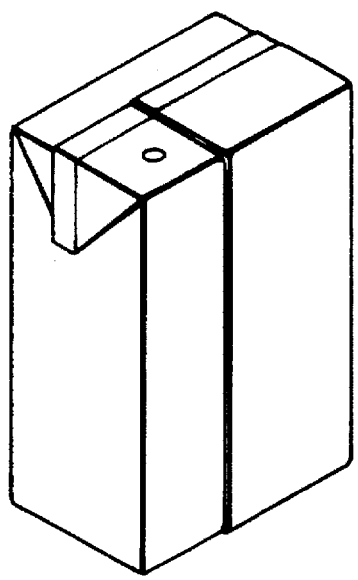
FIG. 21B is a perspective view of a liquid-tight fruit juice container.

Other articles which can be fashioned by folding and seaming an integral blank include the liquid-tight milk carton and fruit juice container. A liquid-tight milk carton can be fashioned from a blank depicted in FIG. 20A into the familiar configuration shown in FIG. 20B. FIG. 21A depicts a blank which can be converted into a liquid-tight fruit juice container as shown in FIG. 21B. Containers such as the milk carton and fruit juice container may also be coated to be liquid-tight or waterproof.

Additionally, articles which can be fashioned by folding and seaming an integral blank include but are not limited to open ended bags, flexible packaging, and envelopes. The blanks utilized to fashion these articles are generally rectangular. Consequently, the blanks can be cut from the sheet by merely cutting a continuous sheet having a predetermined width at lengths corresponding to the size of the fashioned article. Envelopes can also be fashioned by seaming two hydraulically settable sheets or two blanks together.

Figure 22A:
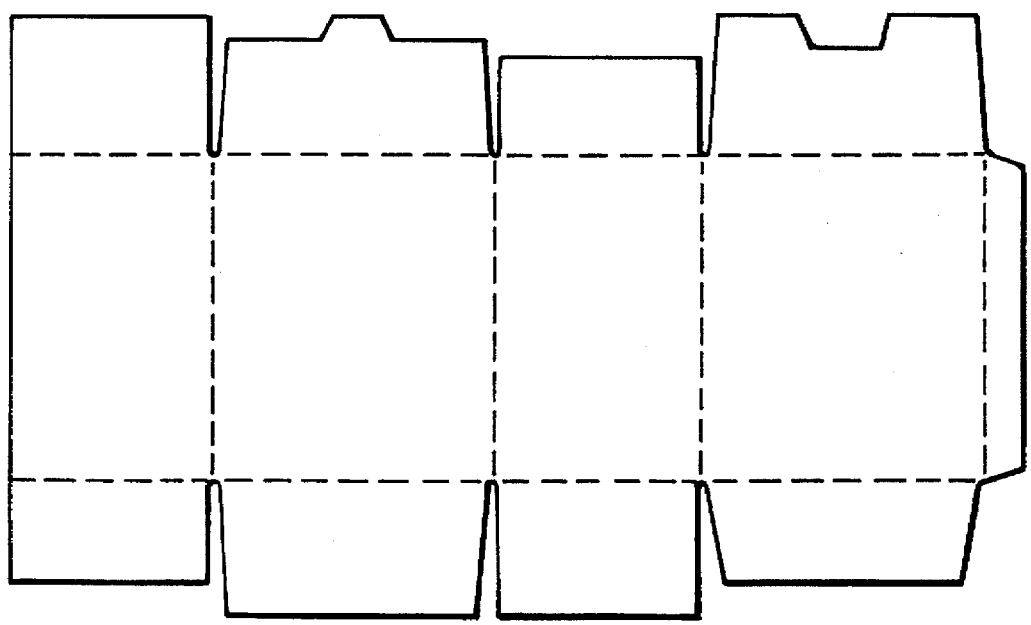
FIG. 22A is a perspective view of a sealed-end carton blank.
Figure 22B:
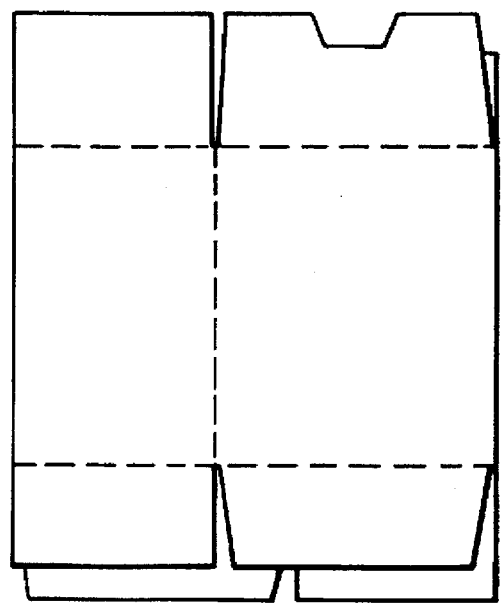
FIG. 22B is a perspective view of a sealed-end carton intermediary shell.
Figure 22C:
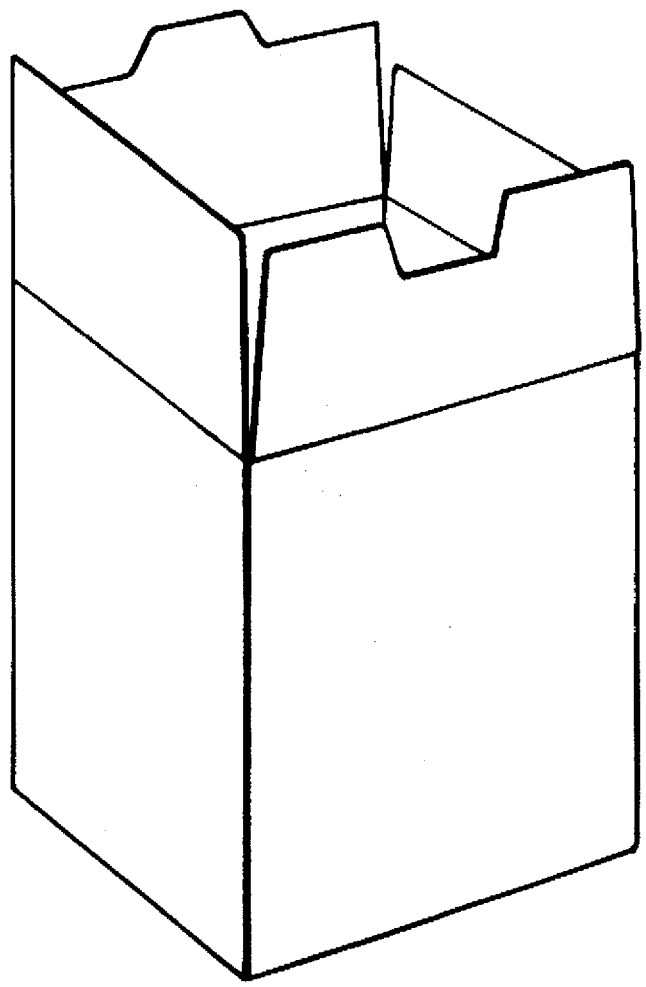
FIG. 22C is a perspective view of a sealed-end carton.

Another example of an article fashioned by folding and seaming within the scope of this invention is provided by a sealed-end carton as shown in FIG. 22C. The sealed-end carton blank is depicted in FIG. 22A having a glue tab panel for creating a side seam. The blank can be folded and side seamed to form an intermediary shell or tube as shown in FIG. 22B. The bottom flaps of the intermediary shell or tube can be folded or seamed resulting in a sealed-end carton as shown in FIG. 22C. The sealed end carton can then be utilized to receive products for storage.

Containers such as the sealed-end carton depicted in FIG. 22C fashioned by folding a blank can be fashioned by automatic processes generally involving the steps of prebreaking the blank along the fold lines, folding the blank into an intermediary shell or tube, and sealing the bottom of the carton by folding and/or seaming.

It is within the scope of this invention to fashion articles from blanks cut from hydraulically settable sheets utilizing automated processes and semi-automated processes. Additionally, conventional equipment utilized to automatically convert paper or paperboard blanks into articles are within the scope of this invention.

The automated process of converting blanks into articles, such as the sealed-end carton depicted in FIG. 22C, from blanks can begin with loading the blanks into a magazine. The blanks, such as the blank shown in FIG. 22A, can be removed one at a time, generally from the bottom by a feed wheel, and carried by sets of endless belts to a prebreak station. At the prebreak station, the score lines can be prebroken by stationary curved plows by moving one or more blank panels out of the original plane to prebreak scores.

After the score lines are prebroken, the panels can be laid back down as the blank moves along on the belts. Prebreaking of scores assists in converting a blank into an article since the force required to bend a previously bent score is greatly reduced. The blank is folded and the sides are seamed to form an intermediary shell or tube as shown in FIG. 22B. The sides can be seamed utilizing any of the above described adhesives such as cold glues, hot melts, or heat sealing of waxes or polymers. Belts can be utilized to carry the blank toward a folding station where guides fold the end panels up on the scores and bring them over on top of each other. The container can be carried by the belts into a nip of a pair of wider belts that can apply pressure as the container is carried along while the adhesive sets. The container can then be shipped or utilized as needed for containing food, beverages and other materials.

Products can be loaded into completed containers by semiautomatic cartoners which require the manual loading of the products to be stored in the container or by fully automatic cartoners which automatically load the products. Additionally, completed containers can be utilized as collapsed containers which are generally flattened after being formed for storage and then reconstructed when needed. French-fry containers are an example of such a collapsed container.

Products can be sealed or enclosed within the containers by a wide variety of means, including but not limited to, the seaming mechanisms discussed above and mechanical locking devices. An example of a means for sealing products within the containers is provided by flaps such as the glued top flaps on a cereal box which can also be mechanically interlocked after the seal is broken. Another example is provided by the gabletop of milk cartons which is glued together to form a seal. Detachable lids such as those used to close soft drink cups may also be used, and may be made from any material including being molded or pressed out of hydraulically settable sheets.

C. Fashioning Hydraulically Settable Sheets into Articles by Convoluting the Hydraulically Settable Sheets.

Hydraulically settable sheets and blanks cut from hydraulically settable sheets can be fashioned into a variety of articles by convoluting the sheet or blank. The term "convoluting" as used in this specification and the appended claims is intended to include rolling a hydraulically settable sheet or blank into an article having the form of a tube. The articles within the scope of this invention fashioned by convoluting may also involve seaming a portion of the hydraulically settable sheets or blanks. The articles have two open ends, one or both open ends can be closed by a closure means for engaging an open end of the articles. The articles can have a variety of cross-sections including but not limited to, a circular cross-section, an oval cross-section, a rectangular cross-section with rounded corners, and a rectangular cross-section.

Examples of articles which can be fashioned from hydraulically settable sheets and blanks by convoluting include cups; cans; containers for products such as frozen juice concentrate, potato chips, ice cream, salt, detergent, and motor oil; mailing tubes; sheet rolls for rolling materials such as wrapping paper, cloth materials, paper towels and toilet paper; sleeves; and straws.

Convoluting a blank can be generally achieved by rolling or wrapping the blank around a mandrel and then seaming the overlapping ends of the blank. The overlapping ends can be seamed together by any of the previously described methods of seaming. A wide variety of closure means can be utilized depending on the desired article. The closure means can be formed from either hydraulically settable materials or other materials. The closure means can also be integral with the convoluted tube. For example, the portion of the sheet forming the open ends of the tube can be tucked or pleated inside the tube.

The tube can be reinforced by wrapping continuous fibers or filament winding around the tube. Continuous fibers (such as fibers made from Kevlar®, polyaramite, glass, carbon, and cellulose) can be utilized. The fibers can be convoluted or spiral wound around the tube.

Figure 23A:
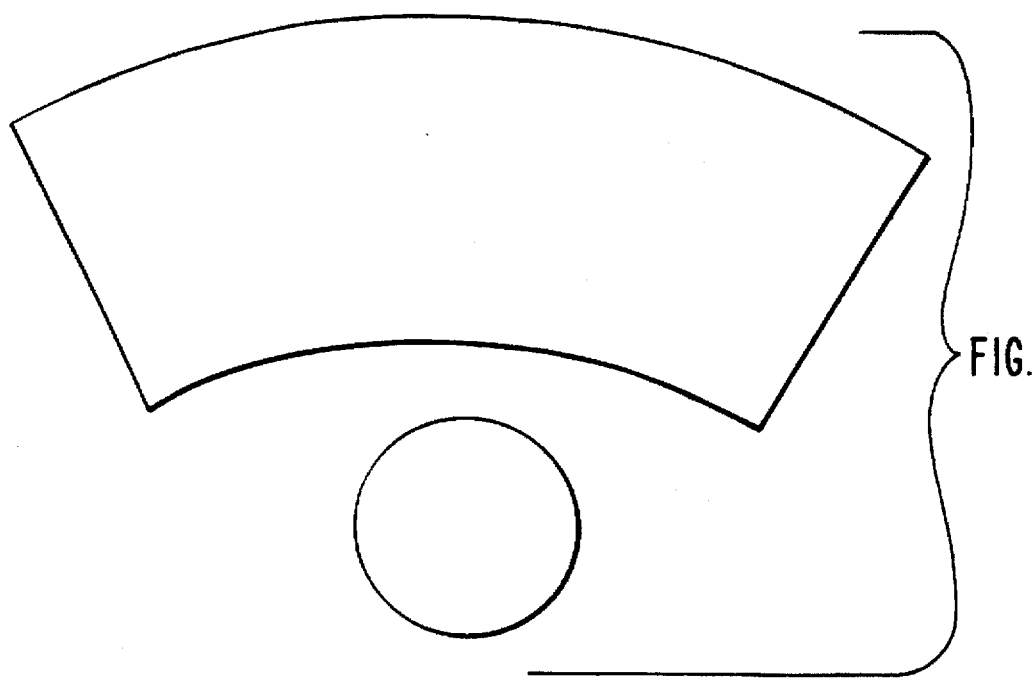
FIG. 23A is a perspective view of a cup blank.
Figure 23B:
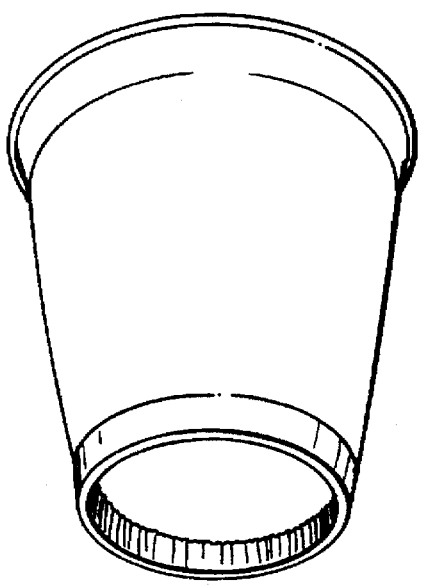
FIG. 23B is a perspective view of a cup.

Cups can be formed by the general method outlined above for forming convoluted articles. A preferred method for manufacturing a two-piece cup within the scope of this invention involves the cutting of two blanks from a hydraulically settable sheet, a sidewall blank and a bottom portion blank as depicted in FIG. 23A. As depicted in FIG. 23B, the sidewall blank is convoluted to form the sidewall of the cup and the bottom portion blank is configured to form the bottom portion of the cup. The convoluted sidewall of the cup is a frustoconical shaped tube and the bottom portion forms a closure means.

The bottom portion can be configured with a central bottom panel and a peripheral depending skirt. The sidewall blank is cut in a conventional arcuate shape utilized to form convoluted cups from paper or plastic. The sidewall blank has two arcuate ends of unequal length which are opposite each other and two straight ends of equal length which are also opposite each other. The length of the longer arcuate end corresponds to the circumference of the opening of the cup while the length of the shorter arcuate end corresponds to the circumference of the cup base.

The sidewall blank is formed into a frustoconical cup shell by convoluting the blank, overlapping the straight ends and seaming the overlapped straight ends by any of the methods described above to form the sidewall of the cup. The cup is completed by assembling the convoluted sidewall and the bottom portion together. The assembly can occur by inserting the bottom portion into the base of the cup shell and seaming the skirt of the bottom portion and the convoluted base of the cup. The bottom portion blank may be prepared with score lines in order to permit the skirt to be gathered or pleated. The bottom of the cup can be configured to allow the cups to be easily stacked or nested and easily denested.

Figure 23C:
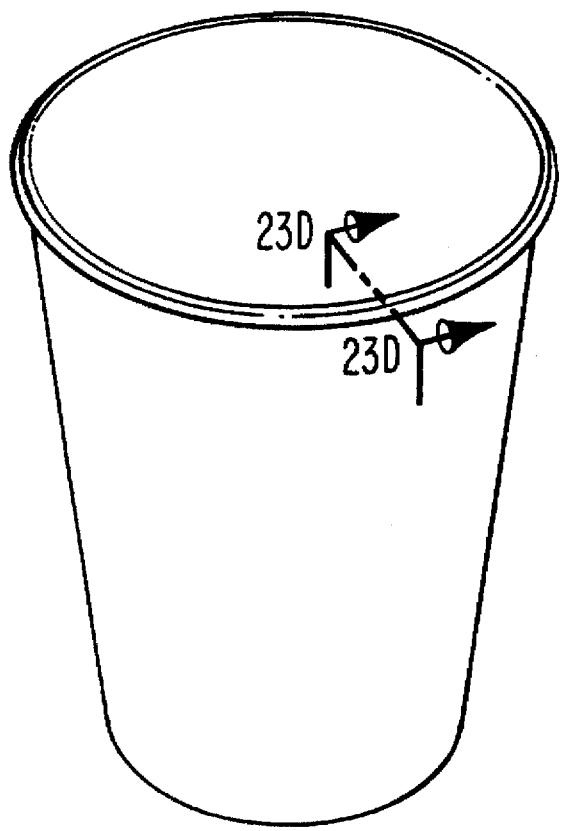
FIG. 23C is a perspective view of a cup.

Additionally, the opening of the cup can be modified to enhance its usefulness for drinking by forming a brim curl or lip as shown in FIG. 23C. The lip strengthens the cup by increasing the stiffness of the opening and the sidewall, where the cup is most likely to collapse when pressure is exerted by the hand when picking up the cup. A lip around the opening also facilitates sealing contents dispensed into the cup by creating a curl or bead which can interlock with a corresponding lid. The lid can also be formed from a hydraulically settable sheet or other materials.

Figure 23D:
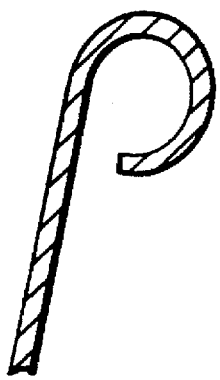
FIG. 23D is an enlarged cross section taken along cutting plane line 23D—23D of FIG. 23C.
Figure 23E:
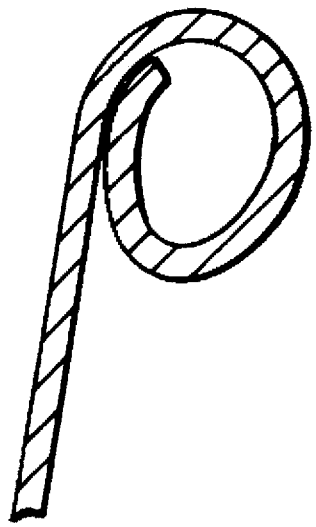
FIG. 23E is another embodiment of the enlarged cross section taken along cutting plane line 23D—23D of FIG. 23C.
Figure 23F:
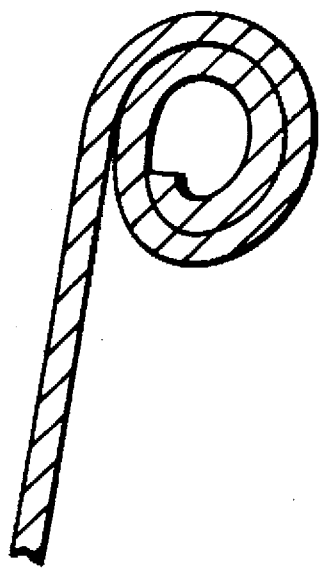
FIG. 23F is another embodiment of the enlarged cross section taken along cutting plane line 23D—23D of FIG. 23C.

The lip can be formed into any conventional configuration including but not limited to curls wherein a diameter of a cross section of the curl has essentially the same length as another diameter of the same cross section, curls wherein a diameter of a cross section of the curl has a different length compared to another diameter of the same cross section, half curls, complete curls, and curls having a plurality of revolutions. An enlarged cross section of the curl shown in FIG. 23C, taken along cutting plane line 23D—23D is shown in FIG. 23D as a half curl. Another embodiment is shown in FIG. 23E of a cross-section taken along cutting plane line 23D—23D of FIG. 23C depicting a complete curl. An additional embodiment is shown in FIG. 23F of a cross-section taken along cutting plane line 23D—23D of FIG. 23C depicting a plurality of curls.

As in the other processes described for fashioning an article from a hydraulically settable sheet, the process for manufacturing cups can be fully automated. Additionally, the automated process is similar or identical to the automated. processes utilized to manufacture cups from paper or plastic blanks.

The automated process generally consists of the following steps: cutting the sidewall blanks and the bottom portion blanks from a hydraulically settable sheet; placing the bottom portion blank on a free end of a mandrel, the blank being releasably retained thereon; wrapping the sidewall blank around the mandrel; overlapping the straight ends of the sidewall blank; seaming or otherwise securing the overlapped ends; seaming or otherwise securing the skirt of the bottom portion blank to the base of the convoluted base of the cup. Additionally, the lip can be formed around the opening of the cup by a lip forming device.

The scope of this invention includes a variety of automated apparatus for fashioning cups from a hydraulically settable sheet. Most of these apparatus involve a series of operational subassemblies which function in timed sequence and interrelationship. The operational subassemblies can be configured linearly around a conveyor with mandrels or circumferentially around a rotating turret with mandrels.

Figure 24:
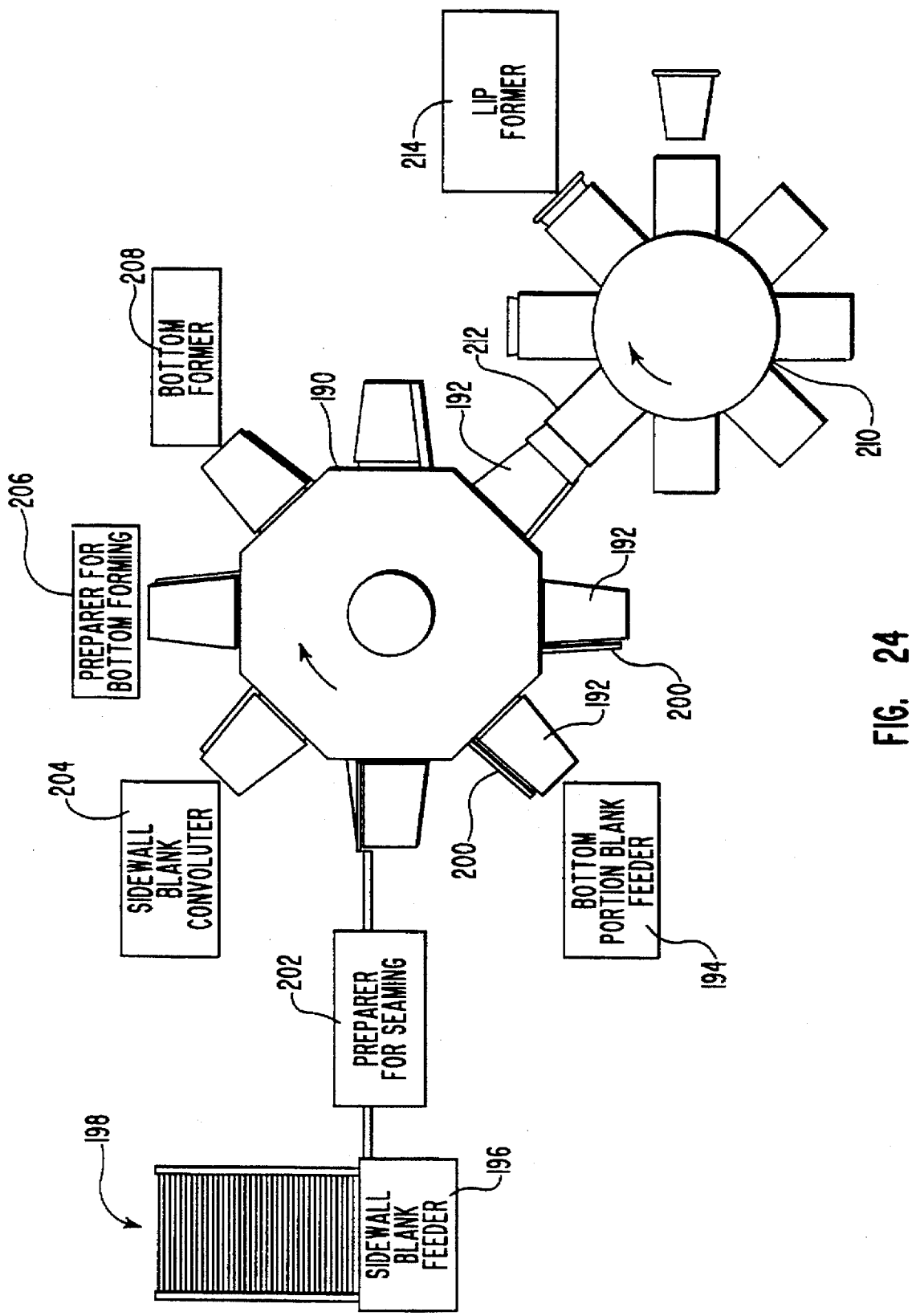
FIG. 24 is a schematic view of an automated cup constructing apparatus.

One automated cup forming apparatus shown in FIG. 24 involves the operation of a rotating indexable turret 190 having a plurality of mandrels 192. The mandrels extend radially outward from the turret, one end of the mandrel is attached to the turret while the other end projects outward and usually has a flat face. The mandrels have a frustoconical shape. The mandrels can also be configured with other shapes to manufacture containers having a tubular shape, a circular cross-section, an oval cross-section, an elliptical cross-section, a rectangular cross-section with rounded corners, and a rectangular cross-section.

The apparatus includes a bottom portion blank feeder 194 which forms the bottom portion blanks and feeds the bottom portion blanks. The bottom portion blank feeder 194 positions the bottom portion blank on the flat face of a mandrel. A sidewall blank feeder 196 feeds sidewall blanks 198 to the mandrel, after the turret indexes the mandrel by properly rotating it. A clamp member 200 can hold the sidewall blank on the mandrel for subsequent forming. Indexing of the turret then moves the mandrel having the sidewall blank to a preparer for seaming 202 which either moistens the ends of the sidewall blank to be overlapped, applies an adhesive or applies a coating such as polyethylene.

The turret is subsequently indexed and a sidewall blank convoluter 204 convolutes the sidewall blanks around the mandrel to form the sidewall of the container. The convoluted sidewall has an opening and a base corresponding to the opening and base of the completed cup. The turret is subsequently indexed to a preparer for bottom forming 206 which either moistens the base and/or the skirt of the bottom portion blank, applies an adhesive or applies a coating. The turret is then indexed to a bottom former 208 which secures the base and the skirt of the bottom portion blank together. After the bottom is formed the cup is ejected and the mandrel is indexed to receive a bottom portion blank from the bottom portion blank feeder and the operational cycle is repeated.

An apparatus can also be utilized without a preparer for seaming and a preparer for bottom forming when the seaming and bottom forming are accomplished by mechanically interlocking the overlapped ends of the convoluted blank and the base and skirt of the bottom portion blank. It also within the scope of this invention to utilize heated mandrels.

The cup can also be further subjected to additional processing steps such as the formation of a lip around the cup opening. One method of forming a lip entails positioning the cup such that the cup opening extends outward and forming the lip around the opening. In this method, the cup is ejected from the mandrel after the bottom of the cup has been formed into one of a plurality of container receiving members 212 which extend radially outward from another indexable turret 210. The ejection of the cup into a receiving member positions the cup such that the cup opening extends outwardly instead of the cup base. The lip is subsequently formed by a lip former 214 and ejected. The lip former may entail complimentary figures on the receiving member and a male die which can compress the opening of the cup to form a bead.

A lip can be formed around the cup opening by several other different methods. The lip can be formed by moistening the opening of the cup and forcing a male die against the cup. The moistened opening of the cup is weaker than the sidewall consequently the opening will curl. The male die can also be spun. Another method involves rotating a pair of grooved rolls about the periphery of the cup in order to form a rolled lip. The blank can also be precurled to ease the formation of a lip. Any other method of forming lips around cup openings known in the art is within the scope of this invention.

D. Fashioning Hydraulically Settable Sheets into Containers by Spiral Winding the Hydraulically Settable Sheets.

Hydraulically settable sheets and blanks cut from hydraulically settable sheets can be fashioned into a variety of articles by spiral winding the sheet or blank. The term "spiral winding" as used in this specification and the appended claims is intended to include wrapping a hydraulically settable sheet or blank in helical rotations into an article having the form of a tube. The articles within the scope of this invention fashioned by spiral winding may also involve seaming a portion of the hydraulically settable sheets or blanks. The articles have two open ends, one or both open ends can be closed by a closure means for engaging an open end of the articles. The articles can have a variety of cross-sections including but not limited to, a circular cross-section, an oval cross-section, a rectangular cross-section with rounded corners, and a rectangular cross-section.

Examples of articles which can be fashioned from hydraulically settable sheets and blanks by spiral winding include: cups; cans; containers for products such as frozen juice concentrate, potato chips, ice cream, salt, detergent, and motor oil; mailing tubes; sheet rolls for rolling materials such as wrapping paper, cloth materials, paper towels and toilet paper; sleeves; and straws.

Figure 25A:
FIG. 25A is a perspective view of a spiral wound container blank.
Figure 25B:
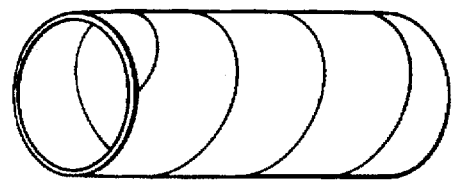
FIG. 25B is a perspective view of a spiral wound tube.
Figure 25C:
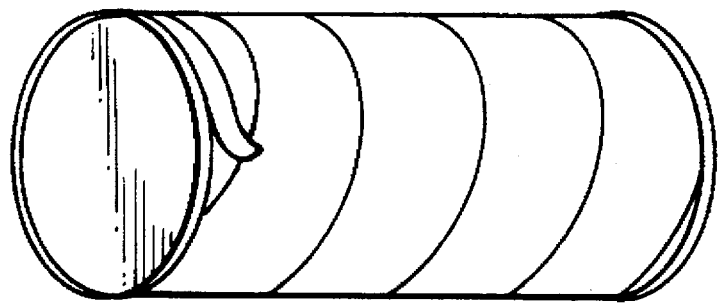
FIG. 25C is a perspective view of a spiral wound container.

Spiral winding a blank into an article can be generally achieved by cutting a hydraulically settable sheet into a blank as shown in FIG. 25A and winding the blank around a mandrel in a spiraling manner. After the tube is formed as shown in FIG. 25B, closure means can be utilized with the tube to form a completed frozen juice concentrate container as shown in FIG. 25C. A wide variety of closure means can be utilized depending on the desired article. The closure means can be formed from either hydraulically settable materials or other materials. The closure means can also be integral with the convoluted tube. For example, the portion of the sheet forming the open ends of the tubes can be tucked or pleated inside the tubes.

The width of the blank utilized in forming a spiral wound article will vary depending on the type of article being fashioned. The width of the blank is, however, generally narrow. The blank is generally coated on one side with a lubricant (such as wax) and wound around a mandrel in a spiral fashion. On each revolution, one edge of the blank abuts the opposite edge of the blank laid down on the mandrel on the previous revolution. The abutting edges can be seamed together by any of the previously described methods of seaming. The angle of the winding is preferably 15° from normal to the longitudinal direction of the mandrel. The degree of the angle, however, may be varied to optimize elasticity and tensile strength of the article.

A second layer of a hydraulically settable sheet may also be applied in a similar fashion over the first layer to provide additional strength and toughness. The second layer is also preferably oriented at an angle of 15° from normal to the mandrel, but in the opposite direction such that the angle between the first layer and the second layer is approximately 30°. An adhesive can be applied to the bottom or inner surface of the second layer in order to bond the second layer to the outside surface of the first layer.

Continuous fibers or filament winding may also be used to provide even additional strength. Continuous fibers (such as fibers made from Kevlar®, polyaramite, glass, carbon, and cellulose), provide an additional layer around the article. The fibers can be convoluted or spiral wound around the article. Fibers which have been wound normal to the longitudinal direction of the article impart strength to the article. However, the strength imparted by the fibers increases by increasing the angle of the winding away from being normal to the longitudinal direction of the tube. Controlling the angle in which the continuous fiber is applied increases the ability to provide reinforcement. Additionally, the use of continuous fiber as a reinforcement permits a reduction in the total volume percent of fiber necessary in the mixture.

A wide variety of closure means can be utilized with the tubes formed by spiral winding a hydraulically settable sheet, including all conventional closure means. Telescoping caps or covers are also within the scope of this invention and can be made from hydraulically settable sheets. The closure means described above for use with cups including the bottom portions and lids are operable with the tubes formed by spiral winding. Additionally, the seam release strip utilized with conventional frozen juice concentrate containers can be utilized as shown in FIG. 25C.

E. Fashioning Hydraulically Settable Sheets into Articles by Molding the Hydraulically Settable Sheets.

Hydraulically settable sheets and blanks cut from hydraulically settable sheets can be fashioned into a variety of articles by molding the sheet or blank. The term "molding" as used in this specification and the appended claims is intended to include shaping a hydraulically settable sheet or blank by applying a force to the sheet or blank.

Examples of articles which can be fashioned from hydraulically settable sheets and blanks by spiral winding include: plates, vending plates, pie plates, trays, baking trays, bowls, breakfast platters, microwaveable dinner trays, "TV" dinner trays, egg cartons, meat packaging platters, dishes and lids.

Figure 26A:
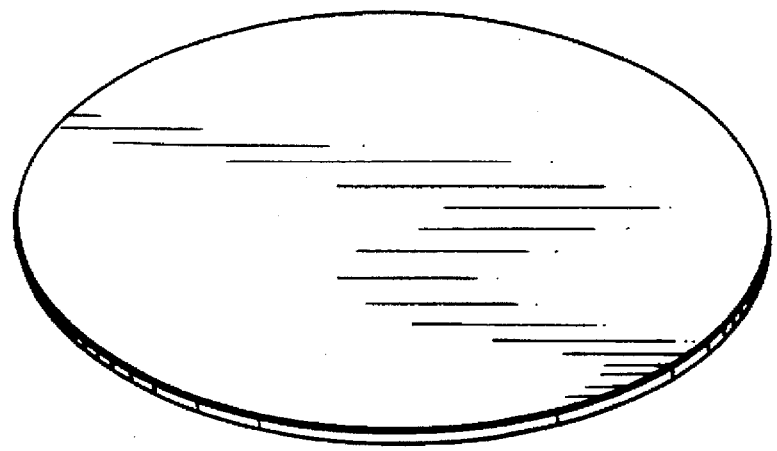
FIG. 26A is a perspective view of a blank utilizing in forming a plate by molding.
Figure 26B:
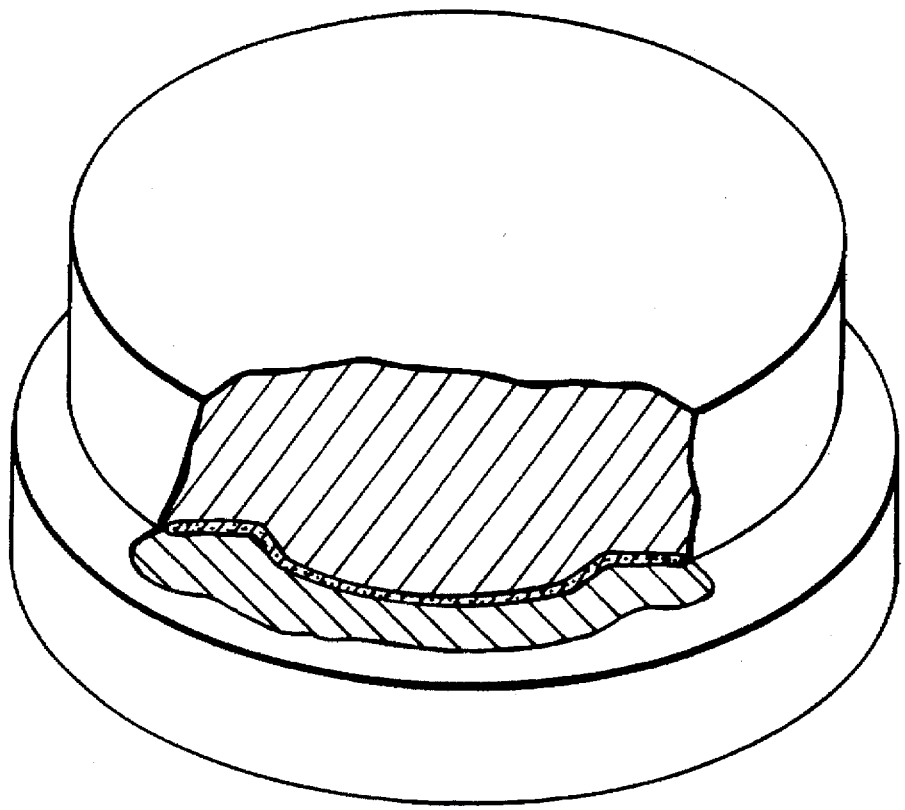
FIG. 26B is a perspective view of a dies utilized to mold a blank into a plate.
Figure 26C:
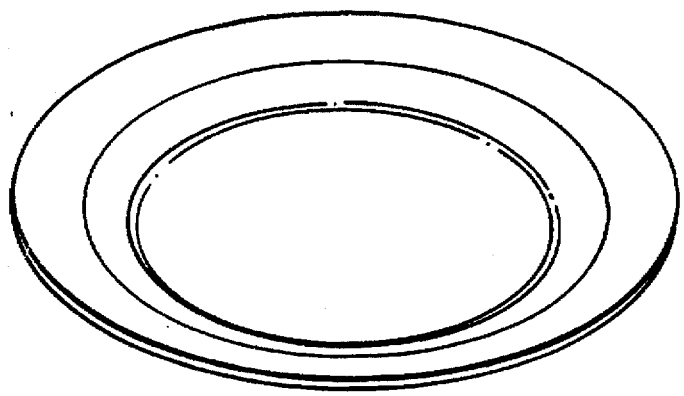
FIG. 26C is a perspective view of a plate formed by molding a blank.

The sheet can be molded between a male die of a desired shape and a female die having a substantially complementary shape of the male die. In many cases it may be desirable to temporarily remoisten the sheet in order to introduce increased flexibility during the molding step. As a blank or a portion of the sheet is molded between the dies, the sheet is formed into an article having the complementary shape of the dies. For example, the blank shown in FIG. 26A can be molded between dies as shown in FIG. 26B to form a plate as shown in FIG. 26C.

Although solid single piece dies (the male die and the female die each comprising one solid piece) are the preferred dies based on ease and economy, alternative dies include split dies, progressive dies, and collapsible dies. These types of dies can be combined in the fashioning process.

For example, a solid male die and split female die can be used together. Split dies are multi-component dies that simultaneously press together, usually from different angles, to form single dies during the molding phase. For example, a female die may comprise two sides and a top which simultaneously press together onto the male die to shape the sheet. Split dies are useful in the production of complex shapes, especially shapes with negative angles, and are easily removed from the mold.

In contrast to the split die where the components press together simultaneously to form the object, a progressive die is a multi-component die whose various parts are pressed together in a delayed sequence to form the desired article.

By selecting the order and time when the various components of the die are pressed together, a complex article can be formed having a more uniform thickness. For example, a progressive male die used to make a bowl may include a base and a side component. By having the base component press first, the remainder of the sheet is pulled in against the side of the female die. The side component of the male die can then be pressed against the female die to form the side of the bowl without stretching the sheet, thereby forming a bowl having a more uniform thickness.

Collapsible dies are also well known in the art. As used herein, the term "collapsible dies" define those dies that expand and contract to assist in fashioning an article.

The amount of pressure exerted by the dies onto the sheet serves several functions which must be considered when determining how much pressure to apply. At a minimum, the pressure must be sufficient to actually mold the sheet between the dies so as to obtain the desired shape. It is preferable that this pressure be sufficient to produce an article with a uniform and smooth finished surface.

The amount of pressure applied to the hydraulically settable sheet may also affect the strength of the resulting article. Research has found that the strength of the resultant product is generally increased where the aggregate and hydraulically settable binder particles are closer together. The greater the pressure used to press the sheet between the dies, the closer the particles are pushed together, thereby increasing the strength of the resulting article in many cases, at least where an uncured or green hydraulically settable sheet is used.

One detriment of using high pressures on the sheet is that the lightweight aggregates in the sheet can be crushed, thereby inhibiting the production of light weight articles and minimizing their insulating capabilities. Accordingly, the pressure applied by the dies should be optimized so as to maximize the strength, structural integrity, and low density of the article.

Under the present invention, the pressure exerted by the male die and the female die on the hydraulically settable sheet is in the range from about 25 psi to about 10,000 psi, with 100 psi to about 7,000 psi being preferred, and 150 psi to about 1,000 psi being most preferred. However, as discussed in the next step, the amount of pressure will vary depending upon the temperature and time of the molding process.

Failure to fully remove the air between the dies can result in air pockets or deformities in the hydraulically settable matrix of the article. Typically, the air simply escapes from between the dies as the dies are pressed together. However, as the depth of the mold cavity increases and the speed of the dies increases, the probability of air being trapped between the dies increases. Accordingly, the speed of the dies should not exceed the capability of the air to escape from the mold cavity.

It is envisioned that the dies could be pressed together in two stages. In the first stage, a high speed could be used to press the dies together to a point just prior to mating. In the second stage, the speed of the dies is slowed down sufficiently to permit the air between the dies to escape prior to complete mating of the dies. This combination of first and second stage speeds permits one to optimize production time. The actual speed of the dies during the second stage varies according to the size and shape of the article being formed and how much air needs to escape.

In an alternative embodiment, the dies also comprise a plurality of vent holes extending through the dies so as to make the dies permeable. As the dies are pressed together, the air between the dies is expelled through the vent holes, thereby preventing the formation of air pockets. The vent holes also prevent the creation of a vacuum within the cavity by allowing air to return into the cavity as the dies are separated. Such a vacuum could exert an undue force on the newly formed article, thereby disrupting its structural integrity.

The vent holes can exist in either or both of the dies. The number of vent holes varies depending on speed of the dies and the amount of air that needs to escape. The diameter of the vent holes varies. For relatively dry sheets, the vent holes typically range from about 0.05 mm to about 5 mm, with 0.1 mm to about 2 mm being preferred, and 0.2 mm to about 0.5 mm being most preferred. It is also preferred that the vent holes be located at positions on the dies corresponding to unobtrusive locations on the articles, for example, the base of the article. For relatively wet and plastic sheets, vent holes cannot be used as they will get plugged by the sheet.

The vent holes also permit the escape of excess steam created when the molds are heated. Heating the molds increases the form stability of the article, increases the rate of hydration, decreases the curing time, and minimizes adherence of the sheets to the mold. Additionally, the molds can be maintained at different temperatures to ease the separation. When the molds are maintained at different temperatures, the article will have a tendency to remain on the die with the lower temperature after the dies are separated. Accordingly, one can select the die on which the article is to remain on as the dies are separated, by having the desired die have a lower temperature.

In an alternative method for fashioning the article from a wet or green sheet, the various methods of vacuum forming, commonly used in the plastics industry, can be incorporated. Common vacuum forming techniques which may be useful include but are not limited to drape forming, straight vacuum forming, drape vacuum forming, multi-step vacuum forming techniques (including snapback, billow/air slip, billow drape, plug-assist, and billow/plug-assist/snapback), pressure forming, and twin sheet forming.

F. Fashioning Hydraulically Settable Sheets into Articles by Assembling Blanks.

Many of the articles fashioned from hydraulically settable sheets and blanks primarily by folding, convoluting, spiral winding, or molding also involve assembling various blanks to form the completed articles. Articles can also be fashioned primarily by assembling hydraulically settable sheets or blanks and may also involve folding, convoluting, spiral winding, or molding. Additionally, articles can be fashioned entirely by assembling blanks. Examples of articles fashioned from hydraulically settable sheets or blanks either primarily or entirely by assembling blanks include rigid setup boxes, carded packaging containers and liners inserted into containers.

The term "assembling" as used in this specification and the appended claims is intended to include arranging more than sheet or blank into an article, at least one sheet or blank having a hydraulically settable matrix. The articles within the scope of this invention fashioned by assembling may also involve seaming a portion of the hydraulically settable sheets or blanks.

1. Rigid Setup Boxes.

Rigid setup boxes within the scope of this invention can be fashioned by assembling blanks cut from a hydraulically settable sheet. Examples of rigid setup boxes include cigar boxes, confectionery boxes, and boxes for cosmetics. Rigid boxes formed from sheets having a hydraulically settable matrix are not collapsible and generally are covered by a thin decorative cover sheet.

Figure 27A:
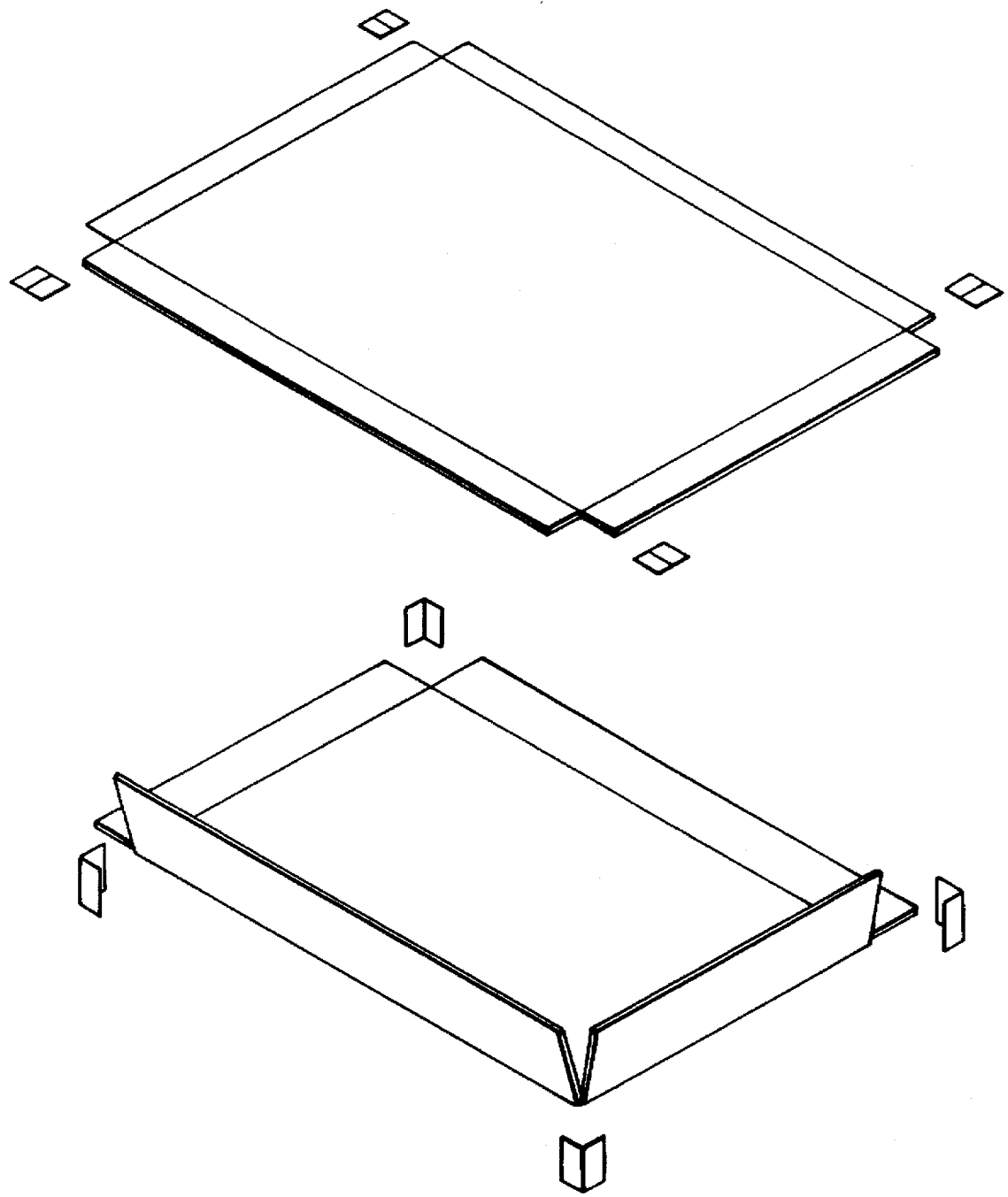
FIG. 27A is a perspective view of a rigid box body blank and a rigid box lid blank.

Rigid boxes can be formed by merely cutting appropriate blanks and assembling the blanks together. The blanks utilized to form a rigid box are generally created in the same manner as other blanks. The blanks may also be scored to permit the folding of the blanks. The blanks of most rigid boxes include a box body blank and a lid blank as shown in FIG. 27A. The corners or portions of the box body blanks and lid blanks can be notched by corner cutters so that when the blanks are assembled, corners can be formed by the sides and bottom of the box body or lid. The corners formed by constructing the blanks can be stayed by placing small, thin stays cut from hydraulically settable sheets or other materials and coated with an adhesive around each corner. Staying machines can be utilized to secure the corners in such a manner.

Figure 27B:
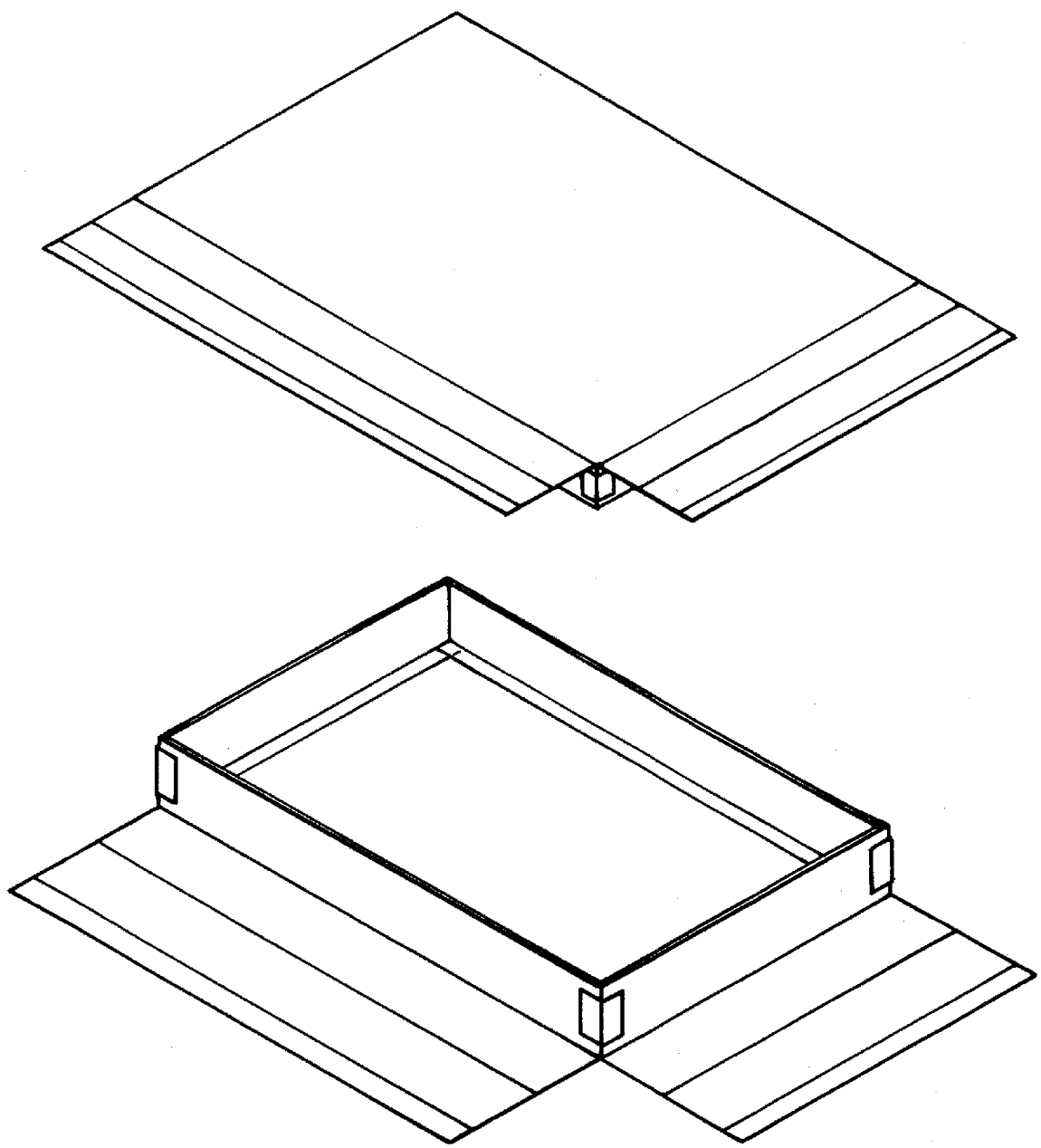
FIG. 27B is a perspective view of a rigid box body with a cover sheet.

In addition to the stays, cover sheets are useful in the fashioning of rigid boxes. The cover sheet can be thin and decorative and can be utilized to cover the box body and the lid as shown in FIG. 27B. The decorative cover sheet can be applied by many different methods. Additionally, the cover sheet can be a hydraulically settable sheet or a paper sheet. The cover sheet can be applied to the box body or the lid each as a single sheet or in separate pieces.

Additionally, the rigid box can have windows, domes, embossing, platforms, hinges, lids, and compartments. The rigid box can be designed to have a variety of structural configurations, including but not limited to, a telescope box, an ended box, a padded-cover box, special shapes (such as oval or heart-shaped), slide tray, neck or shoulder style, hinged cover, slanted side, full telescope, box-in-box, specialty box, interior partition, extension bottom, three-piece, slotted partition, and interior platform.

2. Carded Packaging Containers.

Figure 28:
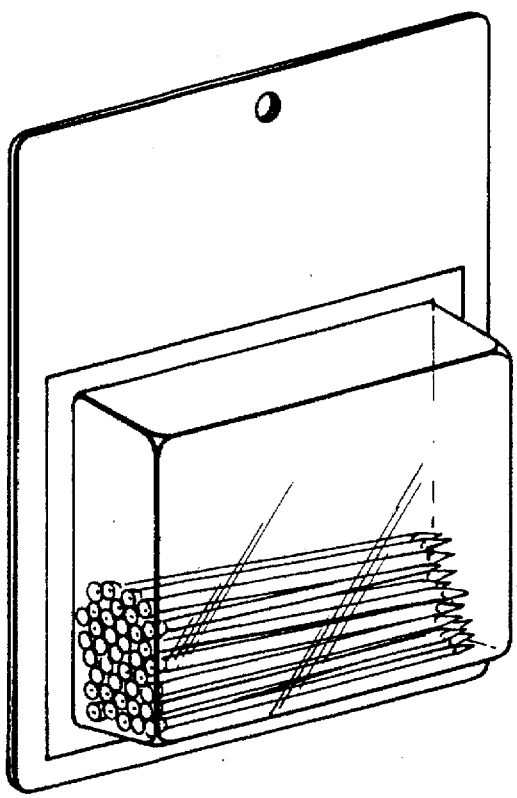
FIG. 28 is a perspective view of a blister packaging container.
Figure 29:
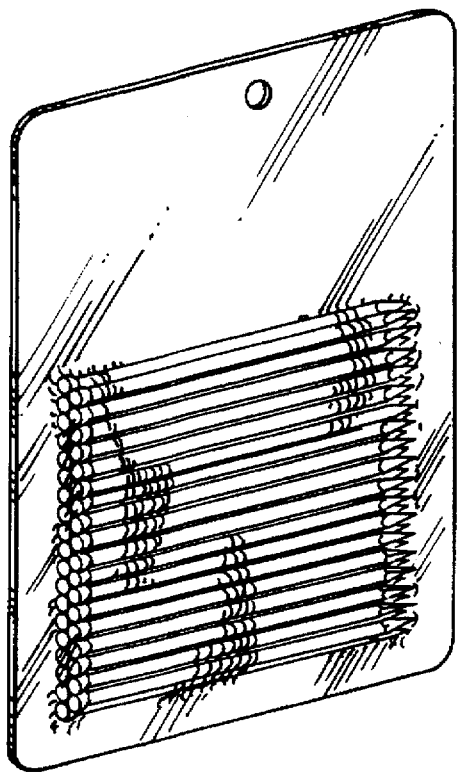
FIG. 29 is a perspective view of a skin packaging container.

Carded packaging containers are particularly useful for visually displaying a product. Carded packaging containers within the scope of this invention can be fashioned by assembling a support card cut from a hydraulically settable sheet and a cover formed from either plastic or a hydraulically settable sheet, the cover being transparent or translucent. The support card can readily accept printing indicia and the cover permits the packaged product to be visually displayed. Carded packaging containers can be utilized to package and display many products including food products such as lunch meats, office products, cosmetics, hardware items, and toys. Carded packaging containers involve two varieties, blister packaging containers and skin packaging containers as shown in FIGS. 28 and 29 respectively. Both containers are shown storing nails to depict the difference between the containers.

Blister packaging containers utilize a preformed, blister to contain a product and a support card cut from a hydraulically settable sheet which supports the product within the blister. The preformed blister can be a hydraulically settable sheet or plastic. The preformed blister is generally either transparent or translucent, allowing display of the product. The support cards utilized in blister packaging containers can have a wide variety of configurations including a flat support card, a two piece support card, and a hinged support card.

The flat support card is generally utilized with a blister which is sealed to the card or inserted into slits in the card. The two piece support card is generally utilized to sandwich the ends of a hinged blister. The hinged support card is generally utilized in blister packaging by dividing the card into equal lengths by the hinge, the base of a blister is inserted into one of the lengths to anchor the blister and the two lengths are then sealed together.

Skin packaging containers within the scope of this invention also involve the use of a support card cut from a hydraulically settable sheet for supporting the product, however, the blister is not preformed. The product is utilized as a mold over which a heated plastic film or "skin" is drawn and heat sealed to the support card. This can be accomplished by heating a plastic film, draping the film over the product and the support card, and applying vacuum pressure to bring the film in contact with the support card. The heat within the film creates a heat seal.

3. Liners Inserted into Containers.

It is also within the scope of this invention to assemble a lined container by inserting a liner into containers fashioned from hydraulically settable sheets. Liners within the scope of this invention include single use disposable liners and reusable liners. The liners can be formed from a hydraulically settable sheet or from other materials. The liners can be inserted manually or automatically.

G. Fashioning Hydraulically Settable Sheets into Containers by Pouch Forming.

Hydraulically settable sheets can also be utilized in a process known in the packaging industry as form/fill/seal containers or pouches. Forming pouches with form/fill/sea techniques permits a continuous operation of forming pouches, filling the pouches with products and seaming the pouches by seaming. The term "pouch forming" as used in this specification and the appended claims is intended to include the continuous formation of series of pouches, filling the pouches with products, closing the pouches by seaming and cutting the pouches apart from each other after the pouch has been formed, filled and closed or after the pouch has been formed.

Containers which can be fashioned from hydraulically settable sheets and blanks by pouch forming include but are not limited to: dried soup pouches, candy wrappers, cereal bags, potato chip bags, powder packaging, tablet pouches, condiment pouches, and cake mix bags.

The operation of forming pouches can be generally accomplished by three different methods including but not limited to horizontal, vertical and two sheet pouch forming.

Horizontal forming, filling, and closing by seaming generally involves folding a continuous sheet in half along its length, seaming the sheet at intervals to form a series of pouches which are then filled and closed. The process begins by advancing a sheet horizontally across a plow assembly which folds the sheet in half. The folded sheet is seamed at intervals into pouches to permit the filling of products into the pouches. The pouches can be filled with products by gravity or other means.

Figure 30:
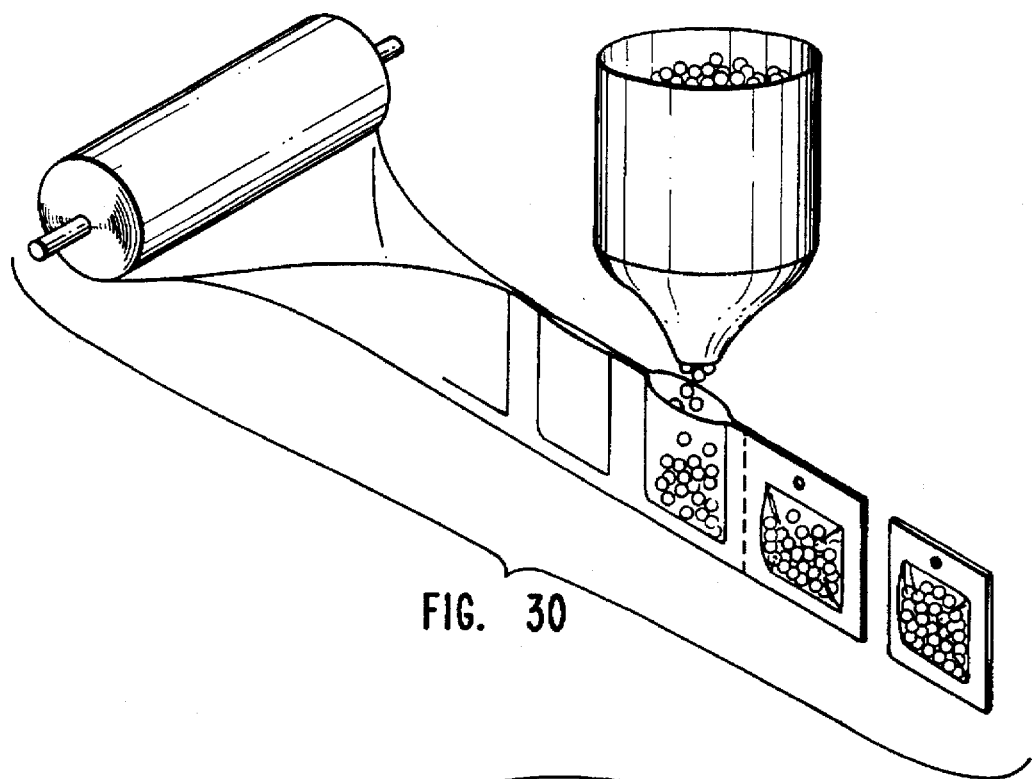
FIG. 30 is a perspective view of a series of pouches which are being formed, filled, and seamed by the horizontal method.

FIG. 30 depicts a series of pouches which are being formed, filled, and closed by the horizontal method. After the pouches have been completely seamed, the pouches can be separated from each other by cutting along the connecting side seams. The pouches can also be perforated along the connecting side seams for subsequent detachment. The pouches can also be separated from each other before filling the pouches with products.

Figure 31:
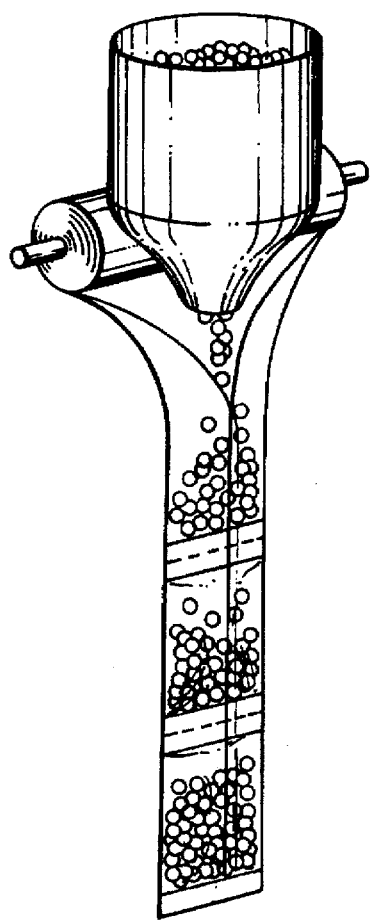
FIG. 31 is a perspective view of a series of pouches which are being formed, filled, and seamed by the vertical method.

Vertical forming, filling, and seaming generally involves forming a continuous sheet into a tube along its length, seaming the tube at intervals to form a series of pouches, filling the pouches and then closing the pouch by seaming. The sheet is formed into a tube by advancing the sheet vertically over a plow assembly. The tube is then seamed at intervals into pouches and filled in a similar fashion utilized in horizontal forming, filling, and closing. FIG. 31 depicts a series of pouches which are being formed, filled, and closed by the vertical method. The pouches can also separated from each other before filling the pouches with products.

Figure 32:
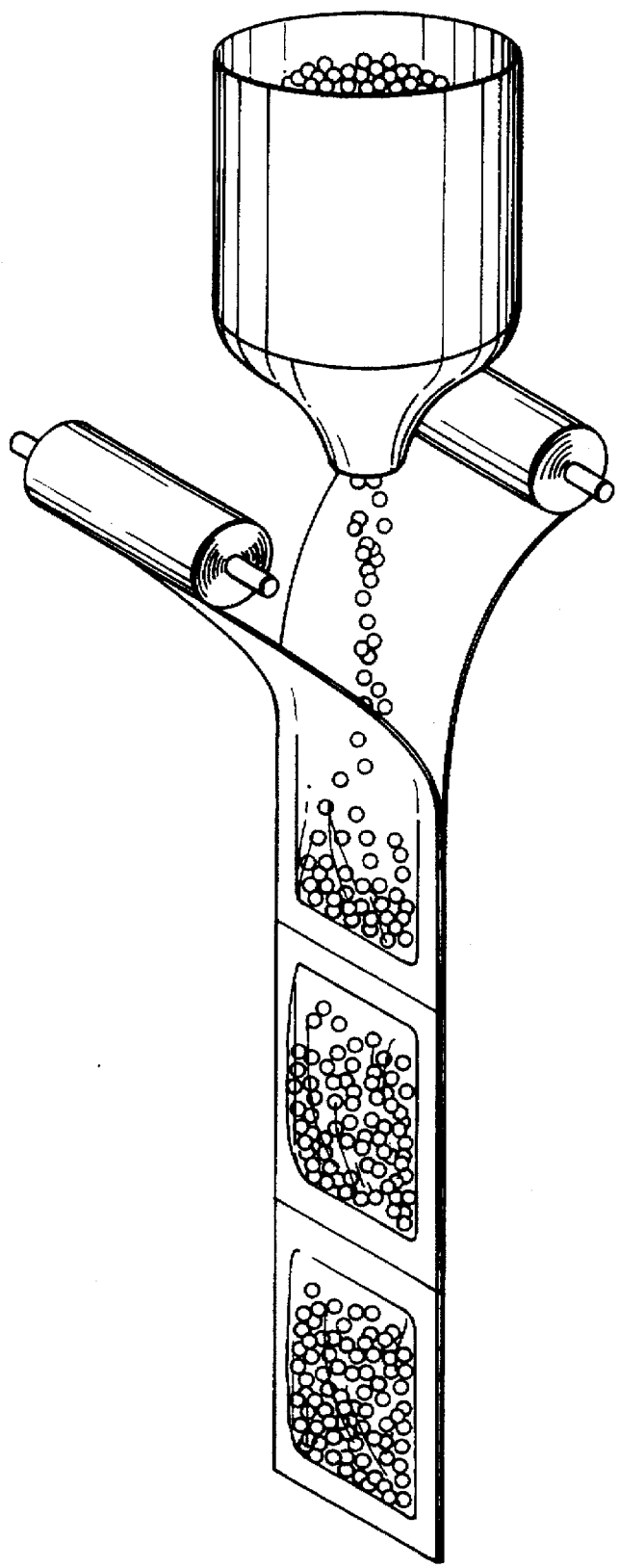
FIG. 32 is a perspective view of a series of pouches being formed by combining two sheets, filling the pouch and seaming the sheets on four sides, with one pouch not yet completely seamed.

The third method involves forming pouches by combining two sheets, at least one of the sheets being a hydraulically settable sheet or laminated sheet. The hydraulically settable sheet or laminated sheet can be combined with a wide variety of other sheets including but not limited to a hydraulically settable sheet, a laminated sheet, a paper sheet, an aluminum foil sheet, cellophane sheet, a plastic sheet, and any laminates of these sheets. The two sheets can be combined vertically or horizontally, each pouch having four seamed sides. FIG. 32 depicts a series of pouches being formed by combining two sheets, filling the pouch and seaming the sheets on four sides, with one pouch not yet completely seamed.

The pouches can be seamed by any of the methods which have been disclosed including the use of adhesives, plastics, crimping, pressure seaming, hermetically sealing, and by utilizing the properties of the hydraulically settable sheet itself. The pouches formed within the scope of this invention can have any structural configuration, including but not limited to, three-sided seam pouches, four-sided fin seam pouches, bottom gusset pouches, standup pouches, pillow pouches, shaped seam pouches, wraparound pouches, multiple compartment pouches, and die-cut pouches.

V. Examples of the Preferred Methods of Manufacture.

To date, numerous tests have been performed comparing the properties of sheets of varying thickness using a number of mix designs and sheet forming techniques. The following examples are presented in order to more specifically teach the method of forming sheets according to the present invention.

In the earlier examples, hydraulically settable mixtures were molded into relatively thick-walled sheets (2–4 mm) in order to create plate-like objects having relatively high insulation ability. The goal of these earlier experiments was primarily to discover mix designs which would yield strong, yet highly insulative plates and other food or beverage container products. Nevertheless, during the course of these early tests it was discovered that hydraulically settable mixtures could be formed into thinner, stronger, more flexible sheets than what was previously thought. Later examples using more refined mix designs yielded greatly improved hydraulically settable sheets.

EXAMPLES 1–4

Hydraulically settable sheets were formed from the following cementitious mixtures containing hollow glass spheres (diameter <100 microns) as the aggregate in order to form lightweight plate-like objects.

| Example | Cement | Water | Tylose ® FL 15002 | Glass Spheres |
|---|---|---|---|---|
| 1 | 4 kg | 2.18 kg | 200 g | 445 g |
| 2 | 3 kg | 1.85 kg | 150 g | 572 g |
| 3 | 2 kg | 1.57 kg | 100 g | 857 9 |
| 4 | 1 kg | 1.55 kg | 100 g | 905 g |

The cementitious mixtures were prepared by first combining the hydraulic cement, Tylose®, and water together using a high shear mixer for 5 minutes. Thereafter, the glass spheres were added and mixed for 5 minutes using a low shear mixer. The resultant cementitious mixtures in Examples 1–4 had water to cement ratios of approximately 0.55, 0.62, 0.79, and 1.58, respectively. Even with the high water-to-cement ratio of Example 4, the cementitious mixture was form stable in the green state and readily moldable. The percentage by weight of the glass spheres in each of Examples 1–4 was 6.5%, 10.3%, 18.9%, and 25.3%, respectively.

The cementitious mixtures were formed into relatively thick sheets having a thickness ranging from 2.0–4.0 mm. The resulting sheets were extremely lightweight, having densities in the range from about 0.25 to 0.5. Tests showed that these extremely lightweight materials were highly insulating. In fact, 2.0 mm thick sheets were placed in an oven at 150° C. for three hours; thereafter, they could be removed by hand. This means that the surface temperature was significantly less than 60° C., which may be due to the relatively low specific heat of the lightweight hydraulically settable materials made in these examples.

EXAMPLES 5–8

The cementitious mixtures of Examples 1–4 were altered by adding varying amounts of abaca fiber, which were blended in during the high shear mixing step.

| Example | Corresponding Example | Amount of Abaca fiber |
|---|---|---|
| 5 | 1 | 149 g |
| 6 | 2 | 152 g |
| 7 | 3 | 180 g |
| 8 | 4 | 181 g |

The resultant percentage by weight of the abaca fibers in Examples 5–8 was 2.1%, 2.7%, 3.8%, and 4.8%, respectively. These hydraulically settable sheets formed therefrom were as lightweight and insulative as those made in Examples 7–10, but were much tougher and had a higher fracture energy. In addition, adding more fibers made the sheets somewhat more flexible, which would make them more useful in, e.g., containers having hinged flaps or other closure mechanisms. Hence, this example demonstrated that the use of abaca fibers, as well as other types of fibers, allowed the formation of hydraulically settable sheets having more flexibility, ductility, and toughness than what was previously thought possible.

EXAMPLES 9–11

Hydraulically settable sheets were prepared using the mix design and procedures set forth in Example 1 (i.e., 4 kg of portland white cement), with the exception that aluminum powder (<100 mesh) and NaOH were added to the cementitious mixtures in the following amounts:

| Example | Aluminum | NaOH |
|---|---|---|
| 9 | 4 g | 21.9 g |
| 10 | 6 g | 34.7 g |
| 11 | 8 g | 34.7 g |

The NaOH was added to the cementitious mixture to activate the aluminum by establishing a pH in the preferable range of about 13.1–13.8. In addition, the molded plate-like sheets were heated to about 80° C. for 30–60 minutes. This resulted in a final hardened material with increased porosity, decreased bulk density, and higher insulation ability. It was also shown that the rate and extent of the reaction of aluminum metal can be altered by adjusting the amount of aluminum and heat that are added. As more of each is added, the material becomes lighter, fluffier and softer, making good cushioning material.

It is important to note that shrinkage cracks were not observed in the sheets of Examples 9–11, even though the cementitious mixtures were heated and much of the water was driven off rapidly.

EXAMPLES 12-14

Hydraulically settable sheets were formed from cementitious mixtures containing 4 kg of portland white cement, 1.4 kg of water, and 40 g of Tylose® FL 15002, along with the following amounts of aluminum, NaOH, and abaca fibers, in order to form lightweight plate-like objects:

| Example | Aluminum | NaOH | Abaca Fibers |
|---|---|---|---|
| 12 | 10.0 g | 22.3 g | 60 g |
| 13 | 15.0 g | 22.3 g | 60 g |
| 14 | 22.5 g | 22.3 g | 60 g |

The cementitious mixtures were prepared substantially according to the procedures set forth in Example 1, with the exception that fibers rather than hollow glass spheres added. Like the cementitious mixtures of Examples 9-11, these materials were extremely lightweight and are very insulative because of the amount of air that was incorporated into the hydraulically settable mixtures. However, the hydraulically settable sheets of these examples have increased toughness and fracture energy because of the addition of the fibers.

EXAMPLES 15-18

Hydraulically settable sheets were formed from cementitious mixtures containing 4 kg of portland white cement, 1.96 kg of water, 200 g of Tylose® FL 15002, and 60 g of abaca fiber, along with the following amounts of aluminum, NaOH, and hollow glass spheres, in order to form lightweight plate-like objects:

| Example | Glass Spheres Fine | Glass Spheres Medium | Glass Spheres Coarse | Aluminum | NaOH |
|---|---|---|---|---|---|
| 15 | 133 g | 317 g | 207 g | 4.0 g | 19.7 g |
| 16 | 133 g | 317 g | 207 g | 6.0 g | 31.2 g |
| 17 | 133 g | 317 g | 207 g | 8.0 g | 31.2 g |
| 18 | 133 g | 317 g | 207 g | 0.0 g | 0 g |

The cementitious mixtures were prepared substantially according to the procedures set forth in Examples 9-11, with the exception that hollow glass spheres having three different diameters were used. The average diameter of the hollow glass spheres designated as "fine" was 30 microns; of the "medium" was 47 microns; and of the "course" was 67 microns. The percentage by weight of the total amount of glass spheres in each of the cementitious mixtures of Examples 15-17 was 2.1%. Of course, Example 18 does not incorporate aluminum and NaOH.

The hydraulically settable sheets formed therefrom were relatively thick, (2.5 mm), were extremely lightweight (specific gravity <0.7) and were very insulative because of the amount of air and the effective packing of the glass balls incorporated into the mixtures. The cementitious mixtures of these examples demonstrated the value of packing the aggregates in order to maximize their effect in the resultant composition. While the cementitious mixture of Example 18 is a good composition for many circumstances, its insulative capabilities are not as great as the cementitious mixtures of Examples 15-17.

EXAMPLES 19-20

Cementitious mixtures containing the following components were used to make hydraulically settable sheets:

| Example | Cement | Water | Tylose® FL 15002 | Abaca Fibers | Surfactant |
|---|---|---|---|---|---|
| 19 | 10 kg | 23.0 kg | 300 g | 200 g | 300 g |
| 20 | 10 kg | 20.0 kg | 300 g | 200 g | 300 g |

In these examples, microfine cement was utilized to make the hydraulically settable sheets. The cementitious mixtures were made by mixing the components for about 10 minutes in a high energy mixer of the type discussed above, which is available from E. Khashoggi Industries. This high energy and high speed mixer introduced significant amounts of air into the cementitious mixtures; this air was entrained within the cementitious mixture by use of the surfactant and stabilized by the Tylose®. The resulting cementitious mixtures were passed between a pair of rollers and formed into relatively thin sheets (1 mm). The sheets were more quickly dried by passing them through a heat tunnel. These sheets had a specific gravity of between 0.25 and 0.4.

The sheets were subsequently scored, folded into the shape of a cereal box, and glued together using adhesive techniques known in the art. From these examples it was learned that scoring relatively thin hydraulically settable sheet allowed that sheets then folded or bent much like paper or cardboard products of the same general thickness.

EXAMPLES 21-22

Cementitious mixtures containing the following components were used to make hydraulically settable sheets:

| Example | Cement | Water | Tylose® FL 15002 | Graphite Fibers | Surfactant |
|---|---|---|---|---|---|
| 21 | 4.23 kg | 8.1 kg | 120 g | 260 g | 135 g |
| 22 | 10.0 kg | 20.0 kg | 300 g | 300 g | 300 g |

In these examples, microfine cement was utilized. Like the products of Examples 19 and 20, the hydraulically settable mixtures of these examples were made by mixing the components for about 10 minutes in a high shear mixer of the type discussed above. This high shear speed mixer introduced significant amounts of air into the cementitious mixtures; this air was entrained within the cementitious mixture by the surfactant.

However, due to the graphite fibers, the mixture was not as easily foamed and was not as lightweight and insulative as materials containing no graphite fibers. The resulting cementitious mixtures were passed between a pair of rollers and formed into relatively thin sheets (1 mm), which were subsequently scored, folded into the shape of a cereal box, and glued together using adhesive techniques known in the art.

EXAMPLE 23

A hydraulically settable plate-like sheet was formed from a cementitious mixture and using the procedure set forth in Example 19, with the exception that about 1.2 kg of glass spheres was added to the "foamed" mixture of cement, water, and Tylose®. The resultant sheet (2 mm thick) had an insulative ability not significantly different from standard polystyrene foam plates. The plate-like sheet made in this example was placed in an oven for three hours at 150° C. and could still be removed with bare fingers.

EXAMPLE 24

Relatively thin hydraulically settable sheets were formed by molding a cementitious mixture which included the following:

| | |
|---|---|
| Portland White Cement | 1.0 kg |
| Water | 2.5 kg |
| Tylose ® FL 15002 | 200 g |
| Hollow Glass Spheres (<100 microns) | 1.0 kg |
| Abaca Fiber | 10% by volume |

The cementitious mixture was made by prewetting the abaca fiber (which was pretreated by the manufacturer so that greater than 85% of the cellulose is α-hydroxycellulose) and then adding the excess water and the fibers to a mixture of Tylose® and portland cement. This mixture was mixed at relatively high speed for about 10 minutes, and then at a relatively slow speed for 10 minutes after the hollow glass spheres were added. The resulting cementitious mixture had a water to cement ratio of approximately 2.5.

This mixture was passed between a pair of rollers and formed into relatively thin sheets having a thickness of about 1 mm. Wet sheets were scored and then folded in an attempt to create a box. However, there was a fair amount of splitting and a box with sufficient strength and integrity could not be formed.

Thereafter, sheets were first allowed to harden and then were scored, folded into the shape of a box, and glued together by cementing or gluing methods well-known in the paper art. The amount of splitting at the fold was negligible, which demonstrated that it is preferable to score and then fold the thin sheets after they have been allowed to harden or solidify somewhat. The thin sheets were formed into a box that had the shape, look and weight of a dry cereal box used presently manufactured from cardboard stock.

EXAMPLE 25

The dried sheets formed in Example 24 were cut into the appropriate shape, rolled to form a cup, and glued using adhesive means known in the art. Examples 24 and 25 demonstrate that it is possible to make boxes, cups, or other containers of similar shape presently made from cardboard, paper, or plastic.

The following examples demonstrate that highly flexible hydraulically settable sheets having high toughness and strength can be manufactured. They are useful in containment applications where cushioning and flexibility are of particular interest.

EXAMPLES 26–30

Flexible, cushioning sheets were formed from cementitious mixtures containing the following:

| Example | Plastic Spheres | Cement | Water | Tylose ® |
|---|---|---|---|---|
| 26 | 0.12 kg | 1.0 kg | 2.0 kg | 0.1 kg |
| 27 | 0.1213 kg | 0.8 kg | 2.0 kg | 0.1 kg |
| 28 | 0.1225 kg | 0.6 kg | 2.0 kg | 0.1 kg |
| 29 | 0.1238 kg | 0.4 kg | 2.0 kg | 0.1 kg |
| 30 | 0.1251 kg | 0.2 kg | 2.0 kg | 0.1 kg |

The "plastic spheres" are made from polypropylene and have average particle sizes less than 100 microns and an average density of 0.02 g/cm$^3$. The cementitious mixtures were mixed and then formed into sheets according to the procedure set forth in Example 24. The hydraulically settable sheets were relatively strong and very flexible compared to previous mix designs. The compressive strength of the plate made according to Example 26 was 2 MPa and the tensile strength was 1 MPa. The surprising feature is that the compressive and tensile strengths are of the same magnitude, which is very unusual for most cement products. Usually the compressive strength is far greater than tensile strength. As less cement is added, the compressive and tensile strengths decrease in increments, with the plate of Example 30 having a tensile strength of 0.5 MPa.

These packaging materials could be physically compressed without crumbling like their nonflexible, hydraulically settable counterparts in earlier examples, even when subject to forces that were greater than forces normally experienced by polystyrene containment materials. The flexible hydraulically settable materials were alternatively extruded into the shape of rectangular shaped bars, which more dramatically demonstrated the degree of flexibility made possible by this mixture.

The densities of the hydraulically settable packaging materials made in these examples ranged between 0.1 and 0.6 g/cm$^3$, with the density decreasing as less cement is used.

EXAMPLES 31–35

Flexible hydraulically settable sheets were made according to Examples 26–30, except that prewetted abaca fibers were added to the cementitious mixture in the following amounts, as measured by unit volume:

| Example | Abaca Fiber |
|---|---|
| 31 | 2% |
| 32 | 4% |
| 33 | 6% |
| 34 | 8% |
| 35 | 10% |

The fibers were well-dispersed throughout the hydraulically settable mixture using a high shear mixer. The resulting hydraulically settable sheets made therefrom had substantially the same densities and flexibilities as those in Examples 26–30, but with increasing tensile strengths as the amount of abaca fiber was increased. The tensile strengths of the materials formed herein ranged up to 15 MPa.

EXAMPLE 36

Hydraulically settable containers are formed using any of the compositions and procedures set forth in Examples 26–35, except that the plastic balls are concentrated near the surface of the cementitious mixture, yielding a molded material in which the plastic balls are concentrated at or near the surfaces of the final hardened product. The sheets and containers formed therefrom have a higher concentration of plastic balls near the surface of the hydraulically settable matrix where flexibility is more important, and virtually no plastic balls in the center of the objects where flexibility is less important. The advantage of this is greater flexibility at the surfaces with the same amounts or less of plastic balls in the overall compositions. At the same time, the rigidity of the center of the container walls makes them as durable and tough as the more rigid containers above.

EXAMPLE 37

Using any of the foregoing compositions, corrugated hydraulically settable sheets containing a fluted inner structure sandwiched between two flat sheets are formed. The flat outer sheets are formed by calendering a sheet of the material into a flat sheet of the appropriate thickness. The corrugated, or fluted inner sheet (which is similar to the fluted or corrugated inner sheet of an ordinary cardboard box) is formed by passing either a hardened or remoistened flat hydraulically settable sheet of the appropriate thickness through a pair of rollers with intermeshing corrugated surfaces or teeth.

Glue is applied to the surfaces of the corrugated sheet, which is then sandwiched between two flat sheets and allowed to harden.

EXAMPLE 38

Using any of the foregoing compositions, a hydraulically settable sheet is molded and then fashioned into the shape of a carton. Depending on the composition, the carton will exhibit high strength, durability, flexibility, low weight, and/or low density.

EXAMPLE 39

Using any of the foregoing compositions, a hydraulically settable sheet is molded and then fashioned into the shape of a lid. Depending on the composition, the lid will exhibit high strength, durability, flexibility, low weight, and/or low density.

EXAMPLE 40

Using any of the foregoing compositions, a hydraulically settable sheet is molded and then fashioned into the shape of a partition. Depending on the composition, the partition will exhibit high strength, durability, flexibility, low weight, and/or low density.

EXAMPLE 41

Using any of the foregoing compositions, a hydraulically settable sheet is molded and then fashioned into the shape of a liner. Depending on the composition, the liner will exhibit high strength, durability, flexibility, low weight, and/or low density.

EXAMPLE 42

Using any of the foregoing compositions, a hydraulically settable sheet is molded and then fashioned into the shape of a box. This may be carried out by extrusion, and/or calendering, and/or score cutting, and/or folding. Depending on the composition, the box will exhibit high strength, durability, flexibility, low weight, and/or low density.

In the following examples, very thin sheets were formed (0.1–0.5 mm) which had many characteristics and properties which made them suitable for use much like paper, cardboard, plastic, polystyrene, or metal sheets of similar thickness and weight. The desired properties were designed into the sheets using a microstructural engineering approach. This allowed for the manufacture of sheets having a variety of desirable properties, including properties not generally possible using mass-produced sheet-like objects presently manufactured from the foregoing materials.

EXAMPLES 43–60

Sheets capable of being formed into a variety of objects (including food and beverage containers) were manufactured from a moldable cementitious mixture which contained the following components:

| Portland Cement | 1.0 kg |
| Perlite | 0.5 kg |
| Mica | 0.5 kg |
| Fiber (Southern pine) | 0.25 kg |
| Tylose ® FL 15002 | 0.2 kg |
| Water | 2.5 kg |

The portland cement, mica, fiber, Tylose®, and water were mixed together in a high shear mixer for 5 minutes, after which the perlite was added and the resulting mixture mixed for an additional 5 minutes in a low shear mixer. The cementitious mixture was then placed into an auger extruder and extruded through a die having an opening in the shape of a slit. Continuous sheets having a width of 300 mm and a thickness of 6 mm were extruded.

The sheets were thereafter passed between one or more pairs of reduction rollers in order to obtain sheets having final thicknesses of 0.2 mm, 0.25 mm, 0.3 mm, 0.35 mm, 0.4 mm, 0.45 mm, and 0.5 mm, respectively. The rollers had a diameter of 17 cm and were made of stainless steel coated with polished nickel to aid in preventing the cementitious mixture from sticking to the rollers. In addition, the rollers were heated to a temperature of 110° C. to further prevent sticking between the mixture and the rollers.

In order to obtain sheets having the desired thickness, the extruded sheets were reduced in steps by using reduction roller pairs having progressively smaller gap distances between the rollers. The sheet thicknesses were reduced as follows:

6 mm→2 mm→0.5 mm→final thickness (0.45 mm, 0.4 mm, 0.35 mm, 0.3 mm, 0.25 mm, or 0.2 mm)

A combination of the extrusion process and the calendering process yielded sheets with substantially unidirectionally oriented fibers along the length (or direction of elongation) of the sheet. Because of this, the sheets had higher tensile strength in the lengthwise direction (10–12 MPa) compared to the widthwise direction (5–6 MPa).

The hardened hydraulically settable sheets were finished, coated, and then formed into a number of different food and beverage containers. For example, a "cold cup" (such as those in which cold soft drinks are dispensed at fast food restaurants) was made by cutting an appropriate shape from a sheet, rolling the shape into the shape of a cup, adhering the ends of the rolled sheet using conventional water-based glue, placing a disc at the bottom of the cup and then crimping the bottom of the rolled wall portion in order to hold the bottom in place, and curling the rim of the cup to strengthen the rim and create a smoother drinking surface. Sheets having thicknesses of 0.3 mm and 0.4 mm were used to make the cups.

The amount of deflection when applying a constant force 1 inch below the rim was comparable to conventional paper cups. The uncoated hydraulically settable cups did not leak when an aqueous solution containing methylene blue and 0.1% surfactant was placed inside the cup for 5 minutes. Of course, any leakage that may occur could be prevented by an appropriate coating.

A hinged "clam shell" container (such as those presently used in the fast food industry to package hamburgers) was made by cutting an appropriate shape from a sheet, score cutting the sheet to form the desired fold lines, folding the sheet into the shape of a clam shell container, and adhering the ends of the folded sheet (using both adhesive and interlocking flap means) to preserve the integrity of the container. Sheets having thicknesses of 0.4 mm and 0.5 mm were used to make the hinged clam shell containers.

The sheet was found to more easily bend or close together on the side of the sheet opposite the score cut. It should be noted that normal scores in conventional materials generally allow the sheet to more easily bend or close together on the side of the score. The resulting hinged clam shell containers exhibited comparable or superior insulating ability compared to paper hinged clam shells.

A french fry container (such as those used to serve cooked french fries in the fast food industry) was made by cutting an appropriate shape from a sheet, score cutting the sheet to form the desired fold lines, folding the sheet into the shape of a french fry container, and adhering the ends of the folded sheet using adhesive means to preserve the integrity of the container. Sheets having thicknesses of 0.25 mm, 0.3 mm, 0.35 mm, 0.4 mm, 0.45 mm, and 0.5 mm were used to make the french fry containers.

A frozen food box (such as those used by supermarkets to package frozen foods such as vegetables or french fries) was made by cutting an appropriate shape from a sheet, score cutting the sheet to form the desired fold lines, folding the sheet into the shape of a frozen food box, and adhering the ends of the folded sheet using adhesive means to preserve the integrity of the box. Sheets having thicknesses of 0.25 mm, 0.3 mm, 0.35 mm, 0.4 mm, 0.45 mm, and 0.5 mm were used to make the frozen food boxes.

A cold cereal box was made by cutting an appropriate shape from a 0.3 mm thick sheet, score cutting the sheet to form the desired fold lines, folding the sheet into the shape of a cold cereal box, and adhering the ends of the folded sheet using adhesive means to preserve the integrity of the cereal box.

A straw was made by rolling a piece of a 0.25 mm sheet into the form of a straw and adhering the ends together using adhesion means known in the art. In making the straw, as in making each of the containers set forth above, it was advantageous to remoisten the sheet somewhat in order to temporarily introduce a higher level of flexibility into the sheet. This minimized splitting and tearing of the sheet. Nevertheless, the cup could be rolled and crimped without the remoistening of the sheet without visible tearing and splitting.

The containers were found to break down in the presence of water over time, with 1 day being the average time of disintegration. The excess waste material that was trimmed from the sheets when making the containers was easily recycled by simply breaking it up and mixing it back into the hydraulically settable mixture.

The various containers that were made are set forth as follows, including the thickness of the sheet used to make each container:

| Example | Container | Sheet Thickness |
| --- | --- | --- |
| 43 | cold cup | 0.3 mm |
| 44 | cold cup | 0.4 mm |
| 45 | clam shell | 0.4 mm |
| 46 | clam shell | 0.5 mm |
| 47 | french fry box | 0.25 mm |
| 48 | french fry box | 0.3 mm |
| 49 | french fry box | 0.35 mm |
| 50 | french fry box | 0.4 mm |
| 51 | french fry box | 0.45 mm |
| 52 | french fry box | 0.5 mm |
| 53 | frozen food box | 0.25 mm |
| 54 | frozen food box | 0.3 mm |
| 55 | frozen food box | 0.35 mm |
| 56 | frozen food box | 0.4 mm |
| 57 | frozen food box | 0.45 mm |
| 58 | frozen food box | 0.5 mm |
| 59 | cold cereal box | 0.3 mm |
| 60 | drinking straw | 0.05 mm |

EXAMPLE 61

The hydraulically settable sheets used to manufacture the containers in Examples 43–60, 60 were printed using conventional printing presses used to print conventional paper sheets. The ink was able to dry as fast or faster compared to when using conventional paper sheets. The printed sheets could then be formed into any of the containers listed above the same as without being printed.

EXAMPLE 62

A printed hydraulically settable sheet obtained in Example 61 was formed into the shape of a cup according to the procedure set forth in Example 43, except that the top rim was treated with a mineral oil lubricant prior to the step of curling the top of the cup. Nevertheless, as above, curling was possible without mineral oil. The cup had all of the necessary properties of weight, strength, and water resistance for commercial use in the fast food industry, as well as including identifying information.

EXAMPLE 63

Hinged clam shell containers were made using the sheets made according to Examples 43–60, 60. The sheets were tested to determine the optimum score cut depth which would allow for the easiest bend, while at the same time leaving a hinge with the highest strength and resilience. Score depths ranging between 20% to 50% were tested, with a score depth of 25% yielding the best results. In addition, it was found that thicker sheets (0.4–0.5 mm) gave a better score and yielded a stronger, more rigid hinged clam shell container.

EXAMPLE 64

A hinged clam shell was made using the sheets of Examples 43–60, 60, except that a triple reverse hinge was used. That is, a series of three score cuts were cut into the outer side of the claim shell container. Because this decreased the distance that each individual score line had to bend, the resulting hinge could be opened and closed more times without breaking compared to a single score cut hinge.

EXAMPLE 65

Cold cups made according to Examples 43 and 44 were passed through a commercial wax coating machine, whereby a uniform layer of wax was applied to the surface. The layer of wax completely sealed the surface of the cup to moisture and rendered it watertight.

EXAMPLE 66

Cold cups made according to Examples 43 and 44 were coated with an acrylic coating using a fine spraying nozzle. As did the wax in Example 65, the layer of acrylic coating completely sealed the surface of the cup to moisture and rendered it watertight. However, the acrylic coating had the advantage that it was not as visible as the wax coating. Because a thinner acrylic coating was possible, the cup looked almost as if it were uncoated. The glossiness of the cup could be controlled by using different types of acrylic coatings.

EXAMPLE 67

Cold cups made according to Examples 43 and 44 were coated with a commercially used melamine coating using a fine spraying nozzle. As in Examples 65 and 66, the layer of melamine coating completely sealed the surface of the cup to moisture and rendered it watertight. However, the melamine coating was also less visible and could be applied in a thinner coat compared to the wax coating. The glossiness of the cup could be controlled by using different types of melamine coatings.

EXAMPLE 68

Cold cups made according to Examples 43 and 44 were coated with a totally environmentally sound coating consisting of a mixture of hydroxymethylcellulose plasticized with polyethylene glycol. This coating completely sealed the surface of the cup to moisture and rendered it watertight. However, the surface looked even more natural and less glossy compared to cups coated with wax, acrylic, or melamine.

EXAMPLES 69–72

Hinged clam shell containers made according to Examples 45 and 46 were alternatively coated with the same coating materials used to coat the cold cups in Examples 65–68. The results were substantially identical to those achieved with the coated cups.

| Example | Coating Material |
|---|---|
| 69 | wax |
| 70 | acrylic |
| 71 | melamine |
| 72 | plasticized hydroxymethylcellulose |

EXAMPLES 73–76

French fry containers made according to Examples 47–52 were alternatively coated with the same coating materials used to coat the cold cups in Examples 65–68. The results were substantially identical to those achieved with the coated cups.

| Example | Coating Material |
|---|---|
| 73 | wax |
| 74 | acrylic |
| 75 | melamine |
| 76 | plasticized hydroxymethylcellulose |

EXAMPLES 77–80

Frozen food containers made according to Examples 53–58 were alternatively coated with the same coating materials used to coat the cold cups in Examples 65–68. The results were substantially identical to those achieved with the coated cups.

| Example | Coating Material |
|---|---|
| 77 | wax |
| 78 | acrylic |
| 79 | melamine |
| 80 | plasticized hydroxymethylcellulose |

EXAMPLES 81–84

Cold cereal boxes made according to Example 59 were alternatively coated with the same coating materials used to coat the cold cups in Examples 65–68. The results were substantially identical to those achieved with the coated cups.

| Example | Coating Material |
|---|---|
| 81 | wax |
| 82 | acrylic |
| 83 | melamine |
| 84 | plasticized hydroxymethylcellulose |

EXAMPLES 85–88

Drinking straws made according to Example 60, 60 are alternatively coated with the same coating materials used to coat the cold cups in Examples 65–68. The results are substantially identical to those achieved with the coated cups with regard to the outer surface of the straws, although it is more difficult to adequately coat the inside of the straw in this manner.

| Example | Coating Material |
|---|---|
| 85 | wax |
| 86 | acrylic |
| 87 | melamine |
| 88 | plasticized hydroxymethylcellulose |

EXAMPLE 89

The same mix design set forth in Examples 43–60, 60 was used to manufacture sheets of varying thickness between 0.25 mm and 0.5 mm. The mixing, extrusion, and calendering processes were in every way the same. Dry sheets of each thickness were cut into circular shapes and formed into a paper plate using a commercial mechanical press fitted with a progressive die used to make such plates out or paper stock. The details of the stamped hydraulically settable plates stood out perfectly and were substantially similar in shape, strength and appearance compared to conventional paper plates. However, the hydraulically settable plates were found to be more rigid than conventional paper plate and, hence, possess more structural integrity when food is placed on or within the plates.

EXAMPLE 90

Dry sheets obtained in Example 89 were first wetted to contain 5% additional water by weight of the initially dry sheet before they were pressed into plates (keeping in mind that the apparently "dry" sheets contain water within the hydraulically settable matrix even when they feel dry and possess maximum stiffness). The added water helped the sheets become more flexible (i.e., higher elongation before rupture) which resulted in a plate that had a better impression and detail compared to conventional paper plates formed by the same process. The press was heated to 200° C. and the extra water evaporated during the very short press time (<1 sec) through vent holes in the heated mold, yielding a dry product of higher stiffness than paper.

EXAMPLE 91

Dry sheets obtained in Example 89 were first wetted to contain 10% additional water by weight of the initially dry sheet before they were pressed into plates. The added water helped the sheets become even more flexible, although the impressions and detail were comparable to the results of Example 90. As a result of adding extra water, the molding took a little more time in order to drive off the extra water and form a plate that was substantially dry. It was found that the molding time could be reduced by increasing the temperature of the mold. The final product was stiffer than comparable paper plates.

EXAMPLE 92

Dry sheets obtained in Example 89 were first wetted to contain 20% additional water by weight of the initially dry sheet before they were pressed into plates. The added water helped the sheets become even more flexible than the sheets in Example 91 to the point where the molding process could be classified as a wet sheet molding process rather than dry sheet stamping. The resulting product was superior to a paper stamping process because there were no fold lines whatsoever in the pressed material. The final product was stiffer than comparable paper plates.

EXAMPLE 93

Dry sheets obtained in Example 89 were first wetted to contain 30% additional water by weight of the initially dry sheet before they were pressed into plates. The added water helped the sheets become slightly more flexible than the sheets in Example 92, although the molding process and results were similar. The resulting product was superior to a paper stamping process because there were no fold lines whatsoever in the pressed material. Because of the extra water, the molding process took a little longer than when less water was used to moisten the sheets. Heating the molds to a higher temperature was found to reduce molding times. The final product was stiffer than comparable paper plates.

EXAMPLE 94

The processes of Examples 89–93 were repeated in every way except that a commercial acrylic coating was applied to one side of the sheets prior to their being pressed into plates as above. In the case where a sheet was remoistened, the water was sprayed on the side opposite the side onto which the coating was placed. The coating provided the plates with a glossier surface and rendered them more water resistant.

EXAMPLE 95

The processes of Examples 89–93 were repeated in every way except that a commercial polyethylene coating was applied to one side of the sheets prior to their being pressed into plates as above. In the case where a sheet was remoistened, the water was sprayed on the side opposite the side onto which the coating was placed. The coating provided the plates with a glossier surface and rendered them more water resistant.

EXAMPLES 96–102

The processes set forth in Examples 89–95 were repeated except that the sheets were pressed into the shape of a bowl using a conventional press used to manufacture disposable paper bowls from paper stock. The hydraulically settable bowls had a diameter of 15 cm and a depth of 3 cm. Because of the deeper impression and greater degree of bending and deformation necessary to form a bowl from a flat sheet, sheets having an added moisture content less than 10% yielded some defects. However, the use of at least 10% added water gave a good product with better impressions, no folding and a smoother surface compared to bowls made from paper.

| Example | Added Water | Coating |
|---|---|---|
| 96 | 0% | none |
| 97 | 5% | none |
| 98 | 10% | none |
| 99 | 20% | none |
| 100 | 30% | none |
| 101 | variable | acrylic |
| 102 | variable | polyethylene |

EXAMPLES 103–109

The molding processes set forth in Examples 89–95 were repeated except that the sheets were pressed into the shapes of a two-part breakfast platter, including a top and bottom half. The top half had a length of 20 cm and a depth of 3.5 cm, while the bottom half had a length of 21 cm and a depth of 1.0 cm. Sheets having a thickness of 0.8 mm were used, yielding pieces which each weighed between 12–15 g. Although they were as similar in weight compared to existing breakfast platters used in the fast food industry, they were less flimsy.

The top and bottom halves were complementary in size and could be interlocked together to form a closed container using tabs on the sides of the top half and slots in the sides of the bottom half. The product was flexible enough that nonshattering failure occurred when crushed. Those that were coated exhibited a synergistic effect between the coating and the hydraulically settable matrix, wherein the product became stronger, tougher and more elastic before rupture due to the high elongation of the elastomeric coating.

| Example | Added Water | Coating |
|---|---|---|
| 103 | 0% | none |
| 104 | 5% | none |
| 105 | 10% | none |
| 106 | 20% | none |
| 107 | 30% | none |
| 108 | variable | acrylic |
| 109 | variable | polyethylene |

EXAMPLE 110

A two-part breakfast platter was manufactured using the mix design set forth in Examples 103–109, except that instead of drying and then rewetting the calendered sheet a wet sheet was directly molded into the shape of the breakfast platter. The wet sheet was readily molded and resulted in very few surface and structural defects. The breakfast platter made in this example had a thickness of 0.5 mm and possessed similar weight and insulation properties as the platter made in the previous examples.

EXAMPLE 111

Containers set forth above were placed in a microwave oven and tested for microwave compatibility; that is, they were tested to determine whether the containers themselves, or the food items within them, become hot when container and food were exposed to microwave radiation. Although the containers may have been expected to absorb some of the radiation and become hot in light of the water tied up within the hydraulically settable matrix, in fact, the containers themselves remained cool. Because of the low dielectric constant of the material, all of the energy was found to go into the food not the container.

For the same reason, steam which may have condensed onto the surface of the container during initial stages of the microwaving were found to quickly revaporize under further microwaving. Therefore, when the food container was opened, no condensed steam was found on the surface of the container after the microwave process. Any excess steam comes out when the container is opened, leaving food which looks and tastes better. This is in sharp contrast to polystyrene containers which tend to accumulate large amounts of condensed steam on the container surfaces, thereby rendering a "soggier," and hence less desirable, food product. In addition, polystyrene containers often melt if the food is heated too long.

The specific heats of the hydraulically settable materials of the present invention are relatively low, being about 0.9 J/g·K and having a low thermal constant within the range of 0.06–014 W/m·K. This allows for less thermal conductance from the food to the container during the microwave process. It was possible, therefore, to in all cases remove the container from the microwave without burning the hands. After the container was removed from the microwave oven it slowly warmed (by absorbing some of the heat within the food) but never become too hot to touch.

EXAMPLE 112

Flat paper sheets suitable for manufacturing a wide variety of food and beverage containers were manufactured from a hydraulically settable mixture containing the following:

| | |
|---|---|
| Portland Cement | 1.0 kg |
| Perlite | 0.3 kg |
| Hollow Glass Spheres (<0.1 mm) | 0.8 kg |
| Mica | 0.5 kg |
| Fiber (Southern pine) | 0.25 kg |
| Tylose ® FL 15002 | 0.2 kg |
| Water | 2.6 kg |

The cement, mica, fiber, Tylose®, and water were mixed together in a high shear mixer for 5 minutes, after which the perlite and hollow glass spheres were added and the resulting mixture mixed using low shear. The mixture was extruded using an auger extruder and a die into a sheet 30 cm wide and 0.6 cm thick. The sheet was passed successively between pairs of heated rollers in order to reduce the thickness of the sheet to between 0.1 mm and 2 mm.

As a result of the lower specific surface area of the glass spheres (200–250 m²/kg) compared to perlite, the mixture of Example 112 yielded a product with a more uniform thickness and improved surface finish compared to the mix design of Examples 43–60, 60. The reduced specific surface area of the aggregates reduced the amount of moisture that was removed when contacting the heated calendering rollers. The material, therefore, remains more moldable, retains the optimum rheology, and results in less microdefects and more uniformity during the calendering process.

EXAMPLE 113

The sheets made according to Example 112 were cut, rolled, and glued into 10 oz. drinking cups using a commercial paper cup manufacturing machine. The cups were alternatively coated with a wax coating in order to render them more waterproof.

EXAMPLE 114

The mix design and molding processes of Examples 43–60, 60 were repeated in every way except that the mica was substituted with 0.5 kg kaolin. The sheets made using this alternative mix design yielded sheets that had a glossier surface than where mica was used. The glossier surface resulted from the alignment of the smaller kaolin particles within the sheet surface when the sheet was successively passed between a pair of calendering rollers, which also acted like a pair of smoothing rollers.

EXAMPLE 115

The mix design and molding process of Example 114 were repeated in every way except that 1.0 kg of kaolin was used. The sheets that were molded using this increased amount of kaolin had a smoother surface finish than when only 0.5 kg kaolin was used.

EXAMPLE 116

The mix design and molding process of Example 114 were repeated in every way except that 1.5 kg of kaolin was used. The sheets that were molded using this increased amount of kaolin had a smoother surface finish than when only 0.5 kg or 1.0 kg of kaolin was used. However, the increase in kaolin yield a more brittle sheet. In addition, drying defects due to the increased specific surface area were somewhat problematic when passing the sheet between the reduction rollers.

EXAMPLE 117

The mix design and molding processes of Examples 43–60, 60 were repeated in every way except that the perlite was excluded and the amount of mica was increased to 1.5 kg. The resulting sheets made using this alternative mix design had a smoother finish. However, the hydraulically settable matrix was more dense and more brittle. In addition, there was an increase in drying defects. The sheets could be rolled into cups but with minor surface defects in the form cracks. Also curling of the top was less successful than in Examples 43 and 44.

EXAMPLE 118

The mix design and molding process of Examples 43–60, 60 were repeated in every way except that the amount of perlite was increased to 1.0 kg. The resulting sheets and containers made therefrom had a slightly lower density but slightly lower strength and toughness.

EXAMPLE 119

The mix design and molding process of Examples 43–60, 60 were repeated in every way except that the amount of perlite was increased to 0.75 kg. The resulting sheets and containers made therefrom had a slightly lower density but slightly lower strength and toughness. However, the strength characteristics were somewhat better than when 1.0 kg of perlite was used, as in Example 118.

EXAMPLE 120

The mix design and molding process of Examples 43–60, 60 were repeated in every way except that the amount of perlite was reduced to 0.25 kg. The resulting sheets and containers made therefrom had a higher fiber content, slightly higher density, but had greater strength and toughness.

EXAMPLE 121

The mix design and molding process of Examples 43–60, 60 were repeated in every way except that perlite was eliminated from the mix design altogether. The resulting sheets and containers made therefrom had a slightly higher density, but had greater strength and toughness.

EXAMPLE 122

An insulating cup was manufactured by directly molding a hydraulically settable mixture that contained the following components:

| Portland cement | 1.0 kg |
| Hollow Glass Spheres (<1 mm) | 1.1 kg |
| Fiber (Southern Pine) | 0.08 kg |
| Tylose® FL 15002 | 0.1 kg |
| Water | 2.5 kg |

The cement, fiber, Tylose® and water were mixed together for 5 minutes using a high shear mixer. Thereafter, the hollow glass spheres were added and the resulting mixture mixed for an additional 5 minutes in a low shear mixer. The resulting mixture had the consistency of a dough-like material and could be easily molded while retaining its shape while in the green state.

The mixture was molded using a male and female die pair into the shape of a cup. The mold dies where heated to a temperature of 110°–130° C. to prevent sticking. After demolding the cup was self-supporting in the green state. The green cup was allowed to dry.

The cup had a compressive strength of 1.1 MPa, a tensile strength of 0.8 MPa, and a k-factor of 0.07 W/m·K.

EXAMPLE 123

The mix design and molding process of Example 122 was repeated in every way, except that the glass spheres were substituted with 1.1 kg of perlite. The resulting dried molded cup had a compressive strength of 8.0 MPa, a tensile strength of 3.2 MPa, and a k-factor of 0.14 W/m·K. Thus, the use of perlite instead of hollow glass spheres yields a cup with greatly increased tensile and compressive strength, but with a higher level of thermal conductivity.

EXAMPLE 124

The mix design and molding process of Example 122 was repeated in every way, except that glass spheres having carefully graded diameters were used in order to increase the particle packing efficiency of the hydraulically settable material. In particular 231 g of fine, 528 g of medium, and 341 g of course hollow glass spheres were included, for a total content of 1.1 kg. The average diameter of the hollow glass spheres designated as "fine" was 30 microns; of the "medium" was 47 microns; and of the "course" was 67 microns.

The mixture had better workability due to the decrease in interstitial spaces between the particles. The resulting cups had a smoother surface and slightly superior strength characteristics. The k-factor was 0.083 W/m·K (slightly higher than in Example 122) due to the slight decrease in interstitial space and increase in overall density of the material.

The following examples relate to tests that were performed in order to optimize the mix designs that would yield products having the preferred performance criteria. Although only sheets were made in the remaining test examples, it will be understood to one of ordinary skill in the art how such sheets could be formed into appropriate food or beverage containers using any of the methods (including the examples) set forth within the specification. In addition, many of the mix designs could also have application in either direct molding or wet sheet molding food or beverage containers.

EXAMPLES 125–130

Hydraulically settable sheets having a thickness of 0.4 mm were manufactured according to the processes set forth in Examples 43–60, 60 from a hydraulically settable mixture containing the following components:

| Portland Cement | 1.0 kg |
| Perlite | variable |
| Mica | 0.5 kg |
| Tylose® FL 15002 | 0.2 kg |
| Fiber (Southern pine) | 0.25 kg |
| Water | variable |

The effect of adding varying amounts of perlite was studied to determine the effect on the properties of the material, particular the strength properties of the hardened sheet. Because of the water-absorbing behavior of perlite, it was necessary to decrease the amount of water as the amount of perlite was decreased in order to maintain the same level of rheology and workability.

| Example | Perlite | Water |
|---|---|---|
| 125 | 0.5 kg | 2.15 kg |
| 126 | 0.4 kg | 2.05 kg |
| 127 | 0.3 kg | 1.85 kg |
| 128 | 0.2 kg | 1.65 kg |
| 129 | 0.1 kg | 1.50 kg |
| 130 | 0.0 kg | 1.40 kg |

The extrusion and calendering processes had the effect of longitudinally orienting the fibers in a substantially unidirectional manner. Therefore, the sheets possessed a "strong" and a "weak" direction. The sheets were tested for tensile strength in the two directions, designated as 0° for the strong direction and 90° for the weak direction, along with the level of elongation before failure was measured and Young's modulus of elasticity.

The sheets were also tested for strength in the intermediate, or 45°, direction although only exemplary results for tests in this direction are given. The tensile strength, elongation, and Young's modulus of the sheets in the 45° direction generally fell between those measured in the strong and weak directions, although as a general rule they were closer to the same properties measured in the weak direction. The results are set forth as follows:

| | Strength (MPa) | | Elongation ($\Delta$ L/L) | | Modulus (MPa) | |
|---|---|---|---|---|---|---|
| Example | 0° | 90° | 0° | 90° | 0° | 90° |
| 125 | 10.67 | 5.18 | 1.57% | 0.66% | 2297 | 1375 |
| 126 | 11.2 | 5.33 | 2.38% | 1.25% | 2156 | 1559 |
| 127 | 13.45 | 6.27 | 2.22% | 1.00% | 2956 | 1548 |

| Example | Strength (MPa) 0° | 90° | Elongation (Δ L/L) 0° | 90° | Modulus (MPa) 0° | 90° |
| --- | --- | --- | --- | --- | --- | --- |
| 128 | 16.06 | 7.73 | 3.05% | 1.01% | 3006 | 1674 |
| 129 | 17.91 | 10.0 | 1.38% | 0.98% | 3375 | 2605 |
| 130 | 13.87 | 6.76 | 1.03% | 0.48% | 3058 | 2434 |

These examples demonstrate that as the amount of perlite was decreased (which increased the concentration of fiber), the tensile strength, elongation, and Young's modulus all increased, except after the amount of perlite was reduced below a certain amount. Both the tensile strength and the Young's modulus continued to increase until the perlite was left out altogether, as in Example 130. However, the ability of the material to elongate increased as the perlite was decreased, until less than 0.2 kg was used, after which the elongation dropped considerably. Reducing the amount of perlite beyond a certain point in this mix design results in an increased amount of defects in the sheets, which decreases the strength, elongation, and elasticity of the sheets.

However, in general, as the amount of perlite is decreased, the concentrations of fiber, rheology modifying agent, and hydraulic cement are increased, which would be expected to add to the tensile strength. In addition, increasing the concentration of cement would add to the stiffness (modulus) while negatively affecting the elongation ability of the product.

Another interesting point is that the ratio of tensile strength in the strong and weak directions was only about 2:1 in these sheets, whereas in paper products the ratio is typically 3:1.

While the sheets tested above were substantially dry, sheets made according to Examples 125–130 were further dried in an oven in order to obtain a sheet of maximum dryness. The further drying of the sheets was performed in order to portray a more accurate picture of the strength and other properties of the sheets under constant conditions. Depending on the mix designs, humidity during the test procedures, or other variables, the sheets would be expected to absorb or retain a certain amount of moisture. The strength, elongation, and modulus of elasticity results for the further dried sheets are set forth as follows:

| Example | Strength (MPa) 0° | 90° | Elongation (Δ L/L) 0° | 90° | Modulus (MPa) 0° | 90° |
| --- | --- | --- | --- | --- | --- | --- |
| 125 | 14.01 | N/A | 1.53% | N/A | 2559 | N/A |
| 126 | 13.6 | 6.23 | 1.34% | 1% | 1799 | 2071 |
| 127 | 16.81 | 8.11 | 1.76% | 1.08% | 2659 | 1587 |
| 128 | 19.32 | 8.91 | 1.82% | 1.16% | 4002 | 1609 |
| 129 | 20.25 | 11.23 | 1.41% | 0.63% | 3448 | 1536 |
| 130 | 17.5 | N/A | 0.81% | N/A | 3457 | N/A |

As shown by these examples, totally drying the sheets decreases the elongation somewhat, whereas the strength and modulus of elongation are increased. Theses examples therefore teach that where increased strength and stiffness are important, the sheet should be totally dry. Where increased elongation is important, the elongation may be controlled with the humidity of the sheet.

EXAMPLES 131–135

Hydraulically settable sheets having a thickness of 0.4 mm were manufactured according to the process set forth in Examples 43–60, 60 from a hydraulically settable mixture containing the following component:

| | |
| --- | --- |
| Portland Cement | 1.0 kg |
| CaCO₃ (talc) | variable |
| Tylose ® FL 15002 | 0.20 kg |
| Fiber (Southern pine) | 0.25 kg |
| Water | variable |

The effect of adding varying amounts of talc was studied to determine the effect on the properties of the material, particular the strength properties of the hardened sheet. Because of the reduced water-absorbing behavior of talc compared to perlite, it was not necessary to decrease the amount of water by the same level as the amount of talc was decreased in order to maintain the same level of rheology and workability.

| Example | CaCO₃ | Water |
| --- | --- | --- |
| 131 | 5.0 kg | 2.25 kg |
| 132 | 4.0 kg | 2.15 kg |
| 133 | 3.0 kg | 2.05 kg |
| 134 | 2.0 kg | 2.00 kg |
| 135 | 1.0 kg | 1.96 kg |

The strength, elongation, and Young's modulus of each of the totally dry sheets formed from the different mix designs are set forth as follows:

| Example | Strength (MPa) 0° | 90° | Elongation (Δ L/L) 0° | 90° | Modulus (MPa) 0° | 90° |
| --- | --- | --- | --- | --- | --- | --- |
| 131 | 11.59 | N/A | N/A | N/A | N/A | N/A |
| 132 | 16.16 | N/A | 0.72% | N/A | 4638 | N/A |
| 133 | 14.82 | 5.22 | 0.97% | 0.42% | 4521 | 3521 |
| 134 | 20.43 | 8.26 | 1.11% | 0.56% | 4301 | 2773 |
| 135 | 18.43 | 7.98 | 1.13% | 0.51% | 3902 | 3320 |

The use of talc yields sheets with a smoother, more defect-free surface as well as a more homogeneous microstructure compared to where perlite is used.

EXAMPLES 136–142

Hydraulically settable sheets having a thickness of 0.4 mm were manufactured according to the process set forth in Examples 43–60, 60 from a hydraulically settable mixture containing the following components:

| | |
| --- | --- |
| Portland Cement | 1.0 kg |
| Perlite | 0.5 kg |
| Mica | 0.5 kg |
| Tylose ® FL 15002 | variable |
| Fiber (Southern pine) | 0.25 kg |
| Water | variable |

The level of Tylose® was altered in order to determine the effect of increasing amounts of Tylose® within the hydraulically settable mixture. Increasing the amount of Tylose® within the mixture required the addition of more water in order to dissolve the Tylose® and maintain similar rheology and workability.

| Example | Tylose ® | Water |
|---|---|---|
| 136 | 0.1 kg | 2.25 kg |
| 137 | 0.3 kg | 2.75 kg |
| 138 | 0.4 kg | 3.00 kg |
| 139 | 0.5 kg | 3.25 kg |
| 140 | 0.6 kg | 3.50 kg |
| 141 | 0.7 kg | 3.75 kg |
| 142 | 0.8 kg | 4.0 kg |

The tensile strength and elongation properties increased up to a point as more Tylose® was added, while the Young's modulus fluctuated. The results of testing oven dried sheets made using the various mix designs are as follows:

| Example | Strength (MPa) 0° | 90° | Elongation (Δ L/L) 0° | 90° | Modulus (MPa) 0° | 90° |
|---|---|---|---|---|---|---|
| 136 | N/A | N/A | N/A | N/A | N/A | N/A |
| 137 | 13.84 | 7.25 | 1.41% | 0.75% | 2954 | 1692 |
| 138 | 16.43 | 7.9 | 1.9% | 0.83% | 2400 | 2075 |
| 139 | 21.31 | 11.58 | 3.64% | 1.06% | 3347 | 2370 |
| 140 | 16.11 | 10.35 | 1.84% | 1.13% | 2816 | 1797 |
| 141 | 15.73 | 9.56 | 1.81% | 0.93% | 2690 | 1851 |
| 142 | 18.86 | 10.33 | 2.35% | 1.45% | 2790 | 1570 |

As illustrated, increasing the concentration of Tylose® will generally tend to increase the tensile strength, modulus, and elongation before rupture. A higher elongation ability would be expected to aid in curling the rim of a cup formed from a sheet, while increasing the strength of the sheet at a score cut. However, as the concentration of Tylose® is increased above a certain amount, the material becomes less workable and more defects are introduced within the hydraulically settable matrix, which would be expected to reduce the strength, modulus, and elongation of the sheet. Nevertheless, the amount of defects (and resulting strength properties) can be improved by optimizing the calendering process.

EXAMPLE 143

Based on the understanding that tensile strength and elongation generally increase as both the amount of fiber and Tylose® is increased within a mix design, a mix design was made which maximized both. The cementitious mixture included the following components:

| Portland cement | 1.0 kg |
|---|---|
| Water | 2.2 kg |
| Perlite | 0.1 kg |
| Fiber (Southern pine) | 0.25 kg |
| Tylose ® FL 15002 | 0.5 kg |

The mixture was extruded and then passed between a series of pairs of rollers into a sheet having a thickness of 0.4 mm. The totally dried sheet was found to have superior strength and elongation properties. The tensile strength was tested as 39.05 MPa in the strong direction and 18.86 MPa in the weak direction; the elongation was 1.97% in the strong direction and 1.23% in the weak direction; and the modulus of elasticity was 3935 in the strong direction and 2297 in the weak direction, which is comparable to normal paper.

Examples 144–148

Hydraulically settable sheets having a thickness of 0.4 mm were manufactured according to the process set forth in Examples 43–60, 60 from a hydraulically settable mixture containing the following components:

| Portland Cement | 1.0 kg |
|---|---|
| Hollow glass spheres (4000 psi) | variable |
| Tylose ® FL 15002 | 0.2 kg |
| Fiber (Southern pine) | 0.25 kg |
| Water | variable |

The effect of adding varying amounts of hollow glass spheres was studied to determine the effect on the properties of the material, particular the strength properties of the hardened sheet. Although glass spheres do not absorb large amounts of water, less water was required to maintain the same rheology as the amount of glass spheres was decreased because of the corresponding decrease in interparticulate space.

| Example | Glass Spheres | Water |
|---|---|---|
| 144 | 0.5 kg | 1.6 kg |
| 145 | 0.4 kg | 1.45 kg |
| 146 | 0.3 kg | 1.40 kg |
| 147 | 0.2 kg | 1.35 kg |
| 148 | 0.1 kg | 1.25 kg |

The strength, elongation, and Young's modulus of each of the totally dry sheets formed from the different mix designs are set forth as follows:

| Example | Strength (MPa) 0° | 90° | Elongation (Δ L/L) 0° | 90° | Modulus (MPa) 0° | 90° |
|---|---|---|---|---|---|---|
| 144 | 10.34 | 3.69 | 2.2% | 1.52% | 1166 | 620 |
| 145 | 11.1 | 4.79 | 2.02% | 1.49% | 1446 | 677 |
| 146 | 12.38 | 5.71 | 1.58% | 1.15% | 1800 | 870 |
| 147 | 14.52 | 6.89 | 1.5% | 1.1% | 1935 | 1220 |
| 148 | 19.45 | 9.66 | 1.54% | 0.96% | 2660 | 1741 |

As see with glass spheres, the modulus of elasticity is much lower while the elongation is fairly high compared to other mix designs. The sheets are therefore more pliable and elastic. The sheets formed in Examples 144–148 were highly thermally insulating, with k-factors ranging from 0.08–0.14 W/m·K.

EXAMPLES 149–152

Hydraulically settable sheets having a thickness of 0.4 mm were manufactured according to the process set forth in Examples 43–60, 60 from a hydraulically settable mixture containing the following components:

| Portland Cement | 1.0 kg |
|---|---|
| Perlite | 0.5 kg |
| Mica | variable |
| Tylose ® FL 15002 | 0.2 kg |
| Fiber (Southern pine) | 0.25 kg |
| Water | variable |

The effect of adding varying amounts of mica was studied to determine the effect on the properties of the material, particular the strength properties of the hardened sheet. Because of the water-absorbing behavior of mica, it was necessary to increase the amount of water as the amount of mica was increased in order to maintain the same level of rheology and workability.

| Example | Mica | Water |
| --- | --- | --- |
| 149 | 1.0 kg | 2.7 kg |
| 150 | 1.5 kg | 2.9 kg |
| 151 | 2.0 kg | 3.0 kg |
| 152 | 2.5 kg | 3.2 kg |

The strength, elongation, and Young's modulus of each of the totally dry sheets formed from the different mix designs are set forth as follows:

| Example | Strength (MPa) 0° | 90° | Elongation (Δ L/L) 0° | 90° | Modulus (MPa) 0° | 90° |
| --- | --- | --- | --- | --- | --- | --- |
| 149 | 9.92 | 4.61 | 0.825% | 0.652% | 2127 | 1257 |
| 150 | 9.37 | 5.3 | 0.71% | 0.49% | 3079 | 2188 |
| 151 | 11.14 | 4.05 | 0.79% | 0.314% | 3100 | 1520 |
| 152 | 11.41 | 4.76 | 0.58% | 0.32% | 2693 | 1282 |

Increasing the concentration of mica increases the strength of the sheets while reducing their elongation ability. Sheets containing larger amounts of mica became very brittle.

EXAMPLE 153

Using any of the mix designs set forth above, a hydraulically settable mixture is made by substituting gypsum hemihydrate for the hydraulic cement in roughly the same quantity by weight. The hydraulically settable mixture will have a faster setting time but will generally result in sheets having similar strength, elongation, and stiffness properties.

EXAMPLE 154

Using any of the mix designs set forth above, a hydraulically settable mixture is made by substituting calcium oxide for the hydraulic cement. The hydraulically settable mixture will have a slower setting time due to the slower reaction between calcium oxide and carbon dioxide, but will generally result in sheets having similar strength, elongation, and stiffness properties. However, by removing much of the water within the mixture during of after the molding process, the level of quickly attained green strength will be possible.

EXAMPLE 155

A hydraulically settable mixture is made having the following components:

| | |
| --- | --- |
| Gypsum hemihydrate | 1.0 kg |
| Perlite | 0.5 kg |
| Tylose ® | 0.075 kg |
| Fiber | 0.25 kg |
| Water | 2.6 kg |

The gypsum, Tylose®, fiber, and water are mixed together in a high shear mixer for 3 minutes, after which the perlite is added and mixed in a low shear mixer for an additional 3 minutes.

The mixture is extruded into a sheet having a thickness of 6 mm and then calendered in order to reduce the thickness of the sheets in steps to yield sheets having a final thickness ranging between 0.25 mm to 0.5 mm.

These sheets are readily formed into an appropriate food or beverage container using any appropriate procedure set forth in this Specification. The strength properties are comparable to containers made using hydraulic cement and may be useful in the place of, e.g., paper, cardboard, or polystyrene containers.

EXAMPLE 156

Any of the cementitious mix designs using hydraulic cement is altered to include about 25% gypsum hemihydrate by weight of the hydraulic cement. The gypsum acts as a water absorbing component (or internal drying agent) and results quicker form stability. The strength properties of containers formed therefrom are comparable to mixtures not including gypsum.

EXAMPLE 157

A set accelerator is included within any of the above mix designs, resulting in a hydraulically settable mixture that will more quickly achieve form stability. The final strength of the material will be comparable to materials in which a set accelerator is not used.

EXAMPLE 158

Waste hydraulically settable containers were composted along with waste food. After 4 weeks, the containers were completely broken down and resulted in compost which substantially resembled potting soil.

EXAMPLE 159

Hydraulically settable sheets using any of the mix designs set forth above are used to manufacture printed reading materials, such as magazines or brochures. Such magazines and brochures contain both thinner, more flexible sheets, as well as thicker, less flexible sheets. The thinner, more flexible sheets have a thickness of about 0.25–0.05 mm, while the thicker, less flexible sheets have a thickness of about 0.1–0.2 mm.

EXAMPLE 160

Hydraulically settable sheets were prepared and then coated with an external sizing to determine the effect, if any, on the strength and other properties of the sheets. The sheets were formed by extruding, and then passing between a pair of rollers, a moldable mixture containing the following:

| | |
| --- | --- |
| Calcium Carbonate | 0.5 kg |
| Hydraulic Cement | 0.5 kg |
| Hollow Glass Spheres | 0.5 kg |
| Southern Pine | 0.4 kg |
| Tylose ® FL 15002 | 0.4 kg |
| Water | 2.1 kg |

A hardened sheet (Sheet 1) formed therefrom and having a thickness of 1 mm had a tensile strength of 18.48 MPa, a modulus of 1863 MPa, and an elongation before failure of 2.42%. Sheet 1 was then "sized" (or coated in order to seal the pores of the sheet) using an aqueous starch solution. The resulting sized sheet had a tensile strength of 21.83 MPa, a modulus of 2198 MPa, and an elongation before failure of 2.02%. This shows that a starch sizing increases the tensile strength and stiffness of an inorganically filled sheet.

A second hardened sheet formed from the above moldable mixture (Sheet 2) was found to have a tensile strength of 21.21 MPa, a modulus of 2120 MPa, and an elongation before failure of 3.22%. Sheet 2 was then sized using an aqueous latex-kaolin sizing (70% loading). The sized sheet had a tensile strength of 18.59 MPa, a modulus of 3305 MPa, and an elongation before failure of 2.13%. This shows that a latex-kaolin sizing decreases the tensile strength while increasing the stiffness of an inorganically filled sheet. This coating reduced the water absorption of the sheet to a more significant degree than the starch coating.

Another portion of Sheet 2 was instead sized using a of latex-kaolin-starch (70% loading) sizing. The sized sheet had a tensile strength of 15.31 MPa, a modulus of 3954 MPa, and an elongation before failure of 1.28%. This shows that a kaolin-latex-starch sizing decreases the tensile strength while increasing the stiffness of an inorganically filled sheet to a greater degree than a latex-kaolin sizing.

A third hardened sheet formed from the above moldable mixture (Sheet 3) was found to have a tensile strength of 11.11 MPa, a modulus of 1380 MPa, and an elongation before failure of 1.86%. Sheet 3 was then sized using a latex-kaolin sizing (50% loading), yielding a sized sheet having a tensile strength of 10.78 MPa, a modulus of 2164 MPa, and an elongation before failure of 1.62%. This sizing material slightly decreases the strength while moderately increasing the stiffness of the sheet.

Another portion of Sheet 3 was instead sized using a latex-kaolin-starch sizing (50% loading), yielding a sheet having a tensile strength of 10.86 MPa, a modulus of 1934 MPa, and an elongation before failure of 1.15%.

VI. SUMMARY

From the foregoing, it will be appreciated that the present invention provides improved compositions and methods for manufacturing cementitious and other hydraulically settable sheets that can be formed into a variety of objects presently formed from paper, cardboard, polystyrene, or plastic.

The present invention also provides compositions and methods which yield hydraulically settable sheets which here properties similar to those of paper, cardboard, polystyrene, and plastic. Such hydraulically settable sheets can be formed into a variety of containers and other objects using the same or similar manufacturing apparatus and techniques as those presently used to form such objects from paper, cardboard, polystyrene, or plastic.

The present invention further provides compositions and methods for manufacturing hydraulically settable sheets which do not result in the generation of wastes involved in the manufacture of paper, cardboard, plastic, or polystyrene materials. Further, such sheets, as well as containers or other objects made therefrom, are readily degradable into substances which are commonly found in the earth.

In addition, the present invention provides compositions and methods which make possible the manufacture of sheets, containers, and other objects at a cost comparable to and even superior to existing methods of manufacturing paper or polystyrene products.

Finally, the present invention provides compositions and methods for mass producing cementitious sheets which can rapidly be formed and substantially dried within a matter of minutes from the beginning of the manufacturing process.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture comprising at least a portion of a substantially hardened hydraulically settable sheet, the sheet being formed from a hydraulically settable mixture comprising a hydraulically settable binder, rheology-modifying agent, fibers, and water, wherein the fibers are substantially homogeneously dispersed throughout the hydraulically settable sheet such that the sheet can be bent, folded or rolled to significantly mechanically deform the sheet after the hydraulically settable sheet has been substantially dried during formation of the article of manufacture without complete rupture of the hydraulically settable sheet, said hydraulically settable sheet having a maximum thickness of about 5 mm.

2. An article of manufacture as defined in claim 1, wherein the hydraulically settable sheet has a thickness in a range from about 0.01 mm to about 5 mm.

3. An article of manufacture as defined in claim 1, wherein the hydraulically settable sheet has a thickness up to about 3 mm.

4. An article of manufacture as defined in claim 1, wherein the hydraulically settable sheet has a thickness up to about 1 mm.

5. An article of manufacture as defined in claim 1, wherein the hydraulically settable sheet has a thickness in a range from about 0.5 mm to about 1 mm.

6. An article of manufacture as defined in claim 1, wherein the hydraulically settable sheet has a thickness in a range from about 0.01 mm to about 0.5 mm.

7. An article of manufacture as defined in claim 1, wherein the rheology-modifying agent increases the yield stress of the hydraulically settable mixture and the cohesive strength of the sheet formed therefrom.

8. An article of manufacture as defined in claim 1, wherein the rheology-modifying agent is included within the hydraulically settable mixture in an amount in a range from about 0.1% to about 30% by volume of total solids of the hydraulically settable mixture.

9. An article of manufacture as defined in claim 1, wherein the rheology-modifying agent is included within the hydraulically settable mixture in an amount in a range from about 0.5% to about 15% by volume of total solids of the hydraulically settable mixture.

10. An article of manufacture as defined in claim 1, wherein the rheology-modifying agent is included within the hydraulically settable mixture in an amount in a range from about 1% to about 10% by volume of total solids of the hydraulically settable mixture.

11. An article of manufacture as defined in claim 1, wherein the rheology-modifying agent is included within the hydraulically settable mixture in an amount in a range from about 2% to about 5% by volume of total solids of the hydraulically settable mixture.

12. An article of manufacture as defined in claim 1, wherein the rheology-modifying agent comprises a cellulosic material or a derivative thereof.

13. An article of manufacture as defined in claim 12, wherein the cellulosic material is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

14. An article of manufacture as defined in claim 1, wherein the rheology-modifying agent comprises a starch or a derivative thereof.

15. An article of manufacture as defined in claim 14, wherein the starch is selected from the group consisting of amylopectin, amylose, seagel, starch acetates, starch hydroxyethyl ethers, ionic starches, long-chain alkylstarches, dextrins, amine starches, phosphate starches, dialdehyde starches, and mixtures or derivatives thereof.

16. An article of manufacture as defined in claim 1, wherein the rheology-modifying agent comprises a protein or a derivative thereof.

17. An article of manufacture as defined in claim 16, wherein the protein is selected from the group consisting of prolamine, collagen, gelatin, glue, casein, and mixtures or derivatives thereof.

18. An article of manufacture as defined in claim 1, wherein the rheology-modifying agent comprises a synthetic organic material.

19. An article of manufacture as defined in claim 18, wherein the synthetic organic material is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures or derivatives thereof.

20. An article of manufacture as defined in claim 1, wherein the rheology-modifying agent comprises a material selected from the group consisting of alginic acid, phycocolloids, agar, gum arabic, guar gum, locust bean gum, gum karaya, gum tragacanth, and mixtures or derivatives thereof.

21. An article of manufacture as defined in claim 1, wherein the fibers increase the tensile strength of the article of manufacture.

22. An article of manufacture as defined in claim 1, wherein the fibers have a concentration in a range from about 0.2% to about 50% by volume of total solids in the hydraulically settable mixture.

23. An article of manufacture as defined in claim 1, wherein the fibers have a concentration in a range from about 1% to about 30% by volume of total solids in the hydraulically settable mixture.

24. An article of manufacture as defined in claim 1, wherein the fibers have a concentration in a range from about 5% to about 20% by volume of total solids in the hydraulically settable mixture.

25. An article of manufacture as defined in claim 1, wherein the fibers include organic fibers.

26. An article of manufacture as defined in claim 25, wherein the organic fibers are selected from the group of fibers consisting of hemp, cotton, bagasse, abaca, southern pine, southern hardwood, and mixtures thereof.

27. An article of manufacture as defined in claim 1, wherein the fibers include inorganic fibers.

28. An article of manufacture as defined in claim 27, wherein the inorganic fibers are selected from the group of fibers consisting of glass, silica, ceramic, carbon, metal, and mixtures thereof.

29. An article of manufacture as defined in claim 1, wherein the fibers include a mixture of different fibers that vary in strength and flexibility.

30. An article of manufacture as defined in claim 1, wherein the hydraulically settable mixture includes an aggregate material.

31. An article of manufacture as defined in claim 30, wherein the aggregate material comprises a lightweight aggregate.

32. An article of manufacture as defined in claim 31, wherein the lightweight aggregate decreases the density and increases the insulation ability of the hydraulically settable sheet.

33. An article of manufacture as defined in claim 31, wherein the lightweight aggregate is selected from the group consisting of perlite, cork, vermiculite, hollow glass spheres, porous ceramic spheres, lightweight expanded geologic materials, pumice, and mixtures thereof.

34. An article of manufacture as defined in claim 30, wherein the aggregate material comprises a higher density aggregate.

35. An article of manufacture as defined in claim 34, wherein the higher density aggregate increases the strength and mass of the hydraulically settable sheet.

36. An article of manufacture as defined in claim 34, wherein the higher density aggregate is selected from the group consisting of clay, gypsum, calcium carbonate, mica, silica, alumina, sand, gravel, sandstone, limestone, partially hydrated cement materials, and mixtures thereof.

37. An article of manufacture as defined in claim 30, wherein the aggregate material comprises an organic aggregate selected from the group consisting of seeds, starches, gelatins, agar materials, and mixtures or derivatives thereof.

38. An article of manufacture as defined in claim 30, wherein the aggregate material has a concentration up to about 90% by volume of total solids of the hydraulically settable mixture.

39. An article of manufacture as defined in claim 30, wherein the aggregate material has a concentration in a range from about 5% to about 70% by volume of total solids of the hydraulically settable mixture.

40. An article of manufacture as defined in claim 30, wherein the aggregate material has a concentration in a range from about 20% to about 50% by volume of total solids of the hydraulically settable mixture.

41. An article of manufacture as defined in claim 30, wherein the aggregate material comprises individual particles that are size optimized in order to achieve a predetermined particle packing density of the aggregate material.

42. An article of manufacture as defined in claim 1, wherein the hydraulically settable binder comprises a hydraulic cement.

43. An article of manufacture as defined in claim 42, wherein the hydraulic cement comprises portland cement.

44. An article of manufacture as defined in claim 1, wherein the hydraulically settable binder comprises gypsum hemihydrate.

45. An article of manufacture as defined in claim 1, wherein the hydraulically settable binder has a concentration in a range from about 2% to about 60% by volume of total solids of the hydraulically settable mixture.

46. An article of manufacture as defined in claim 1, wherein the hydraulically settable binder has a concentration in a range from about 4% to about 40% by volume of total solids of the hydraulically settable mixture.

47. An article of manufacture as defined in claim 1, wherein the hydraulically settable binder has a concentration in a range from about 5% to about 30% by volume of total solids of the hydraulically settable mixture.

48. An article of manufacture as defined in claim 1, wherein the water has a concentration in a range from about 5% to about 50% by volume of the hydraulically settable mixture.

49. An article of manufacture as defined in claim 1, wherein the article of manufacture includes a second sheet laminated to the hydraulically settable sheet.

50. An article of manufacture as defined in claim 49, wherein the second sheet is a hydraulically settable sheet.

51. An article of manufacture as defined in claim 49, wherein the second sheet is a nonhydraulically settable sheet.

52. An article of manufacture as defined in claim 49, wherein the second sheet is selected from the group consisting of organic polymer sheets, metal foil sheets, fiber sheets, ceramic sheets, ionomer sheets, elastomeric sheets, plastic sheets, cellophane sheets, nylon sheets, wax sheets, metallized film sheets, and combinations thereof.

53. An article of manufacture as defined in claim 1, wherein the hydraulically settable sheet is corrugated.

54. An article of manufacture as defined in claim 1, wherein the hydraulically settable sheet is creped.

55. An article of manufacture as defined in claim 1, further including a coating on at least a portion of the hydraulically settable sheet.

56. An article of manufacture as defined in claim 55, wherein the coating increases the ability of the hydraulically settable matrix to resist penetration of water into the hydraulically settable sheet.

57. An article of manufacture as defined in claim 55, wherein the coating enhances the ability of the hydraulically settable sheet to be liquid-tight.

58. An article of manufacture as defined in claim 55, wherein the coating enhances the ability of the hydraulically settable sheet to be pressure-tight.

59. An article of manufacture as defined in claim 55, wherein the coating increases the ability of the hydraulically settable sheet to resist penetration of grease or oils into the hydraulically settable sheet.

60. An article of manufacture as defined in claim 55, wherein the coating increases the flexibility of the hydraulically settable sheet.

61. An article of manufacture having a hydraulically settable sheet as defined in claim 55, wherein the coating is safe for use with foods or beverages.

62. An article of manufacture having a hydraulically settable matrix as defined in claim 55, wherein the coating comprises a biodegradable material.

63. An article of manufacture having a hydraulically settable matrix as defined in claim 55, wherein the coating is selected from the group consisting of edible oils, melamine, polyvinyl chloride, polyvinyl alcohol, polyvinyl acetate, polyacrylate, hydroxypropylmethylcellulose, polyethylene glycol, acrylics, polyurethane, polylactic acid, starch, soy bean protein, polyethylene, synthetic polymers, waxes, elastomers, and mixtures or derivatives thereof.

64. An article of manufacture having a hydraulically settable matrix as defined in claim 55, wherein the coating is selected from the group consisting of sodium silicate, calcium carbonate, aluminum oxide, silicon oxide, clay, kaolin, ceramic, and mixtures or derivatives thereof.

65. An article of manufacture as defined in claim 1, wherein a surface of the article includes an indicia.

66. An article of manufacture as defined in claim 1, wherein the hydraulically settable sheet includes a score cut.

67. An article of manufacture as defined in claim 1, wherein the hydraulically settable sheet includes a score.

68. An article of manufacture as defined in claim 1, wherein the hydraulically settable sheet includes a perforation.

69. An article of manufacture as defined in claim 1, wherein the hydraulically settable sheet includes a slot.

70. An article of manufacture as defined in claim 1, wherein the hydraulically settable sheet is translucent.

71. An article of manufacture as defined in claim 1, wherein the hydraulically settable sheet is opaque.

72. An article of manufacture as defined in claim 1, wherein the article of manufacture is a container.

73. An article of manufacture as defined in claim 1, wherein the article of manufacture is a food or beverage container.

74. An article of manufacture as defined in claim 1, wherein the article of manufacture comprises a packaging container.

75. An article of manufacture as defined in claim 1, wherein the article of manufacture includes a seam.

76. An article of manufacture as defined in claim 1, wherein the article of manufacture includes mechanical interlocking devices.

77. An article of manufacture as defined in claim 1 wherein the article is a cup.

78. An article of manufacture as defined in claim 1, wherein the article is a two piece cup comprising a sidewall and a bottom portion.

79. An article of manufacture as defined in claim 78, wherein the sidewall has a seam.

80. An article of manufacture as defined in claim 78, further including a seam between the sidewall and the bottom portion.

81. An article of manufacture as defined in claim 78, wherein the cup includes a lip so as to strengthen the cup.

82. An article of manufacture as defined in claim 77, wherein the cup is a pleated cup.

83. An article of manufacture as defined in claim 77, wherein the cup is a cone cup.

84. An article of manufacture as defined in claim 1, wherein the article of manufacture is a hinged clam-shell container.

85. An article of manufacture as defined in claim 1, wherein the article of manufacture is a carton.

86. An article of manufacture as defined in claim 1, wherein the article of manufacture is a milk carton.

87. An article of manufacture as defined in claim 1, wherein the article of manufacture is a fruit juice container.

88. An article of manufacture as defined in claim 1, wherein the article of manufacture is a container derived from a laminated sheet.

89. An article of manufacture as defined in claim 88, wherein the laminated container is in the form of a corrugated box.

90. An article of manufacture as defined in claim 1 wherein the article of manufacture is a fast-food carryout box.

91. An article of manufacture as defined in claim 1, wherein the article of manufacture is a french fry container.

92. An article of manufacture as defined in claim 1, wherein the article of manufacture is a carrier for beverage containers.

93. An article of manufacture as defined in claim 1, wherein the article of manufacture is a box.

94. An article of manufacture as defined in claim 1, wherein the article of manufacture is a bag.

95. An article of manufacture as defined in claim 1, wherein the article of manufacture is an envelope.

96. An article of manufacture as defined in claim 1, wherein the article of manufacture is a tube.

97. An article of manufacture as defined in claim 96, wherein the tube comprises a convoluted hydraulically settable sheet.

98. An article of manufacture as defined in claim 96, wherein the tube comprises a spiral wound hydraulically settable sheet.

99. An article of manufacture as defined in claim 96, further comprising continuous fibers wrapped around the tube.

100. An article of manufacture as defined in claim 96, further comprising continuous fibers woven around the tube.

101. An article of manufacture as defined in claim 96, further comprising continuous fibers integral in the hydraulically settable sheet comprising the tube.

102. An article of manufacture as defined in claim 96, further comprising closure means for engaging an open end of the tube.

103. An article of manufacture as defined in claim 102, wherein the tube has at least one open end engaged by the closure means, the tube being selected from the group consisting of a can, a frozen juice concentrate container, a potato chip container, an ice cream container, a salt container, a detergent container, a motor oil container, and a mailing tube.

104. An article of manufacture as defined in claim 96, wherein the tube comprises a tube having two open ends, the tube being selected from the group consisting of a straw, a sleeve, and a sheet roll.

105. An article of manufacture as defined in claim 1, wherein the article of manufacture is a plate.

106. An article of manufacture as defined in claim 1, wherein the article of manufacture is a platter.

107. An article of manufacture as defined in claim 1, wherein the article of manufacture is a tray.

108. An article of manufacture as defined in claim 1, wherein the article of manufacture is a bowl.

109. An article of manufacture as defined in claim 1, wherein the article of manufacture is an egg carton.

110. An article of manufacture as defined in claim 1, wherein the article of manufacture is a lid.

111. An article of manufacture as defined in claim 1, wherein the article of manufacture is a rigid setup box.

112. An article of manufacture as defined in claim 111, further comprising a cover sheet wrapped around the rigid setup box.

113. An article of manufacture as defined in claim 111, wherein the rigid setup box has a box body and a lid.

114. An article of manufacture as defined in claim 1, wherein the article of manufacture is a carded packaging container having a support card and a cover.

115. An article of manufacture as defined in claim 114, wherein the cover is a translucent hydraulically settable sheet.

116. An article of manufacture as defined in claim 114, wherein the cover includes a plastic cover.

117. An article of manufacture as defined in claim 116, wherein the cover includes a rigid blister.

118. An article of manufacture as defined in claim 116, wherein the cover includes a plastic skin cover.

119. An article of manufacture as defined in claim 1, wherein the article of manufacture is a pouch.

120. An article of manufacture as defined in claim 1, wherein the article of manufacture is a container and a liner.

121. An article of manufacture as defined in claim 1, wherein the article of manufacture is a magazine.

122. An article of manufacture as defined in claim 1, wherein the article of manufacture is a book cover.

123. An article of manufacture as defined in claim 1, wherein the article of manufacture is a notebook.

124. An article of manufacture as defined in claim 1, wherein the article of manufacture is substantially flat.

125. An article of manufacture as defined in claim 1, wherein the article of manufacture is substantially curved.

126. An article of manufacture as defined in claim 1, wherein the article of manufacture has an oval cross-section.

127. An article of manufacture as defined in claim 1, wherein the article of manufacture has a rectangular cross-section.

128. An article of manufacture as defined in claim 1, wherein the article of manufacture has an triangular cross-section.

129. An container comprising at least a portion of a substantially hardened hydraulically settable sheet, the sheet being formed from a hydraulically settable mixture comprising a hydraulically settable binder, rheology-modifying agent, fibers, and water, wherein the fibers are substantially homogeneously dispersed throughout the hydraulically settable sheet such that the sheet can be bent, folded or rolled to significantly mechanically deform the sheet after the hydraulically settable sheet has been substantially dried during formation of the container without complete rupture of the hydraulically settable sheet, said hydraulically settable sheet having a maximum thickness of about 1 cm.

130. A container as defined in claim 129, wherein the container comprises a food container.

131. A container as defined in claim 129, wherein the container comprises a beverage container.

132. A container as defined in claim 129, wherein the container comprises a packaging container.

133. A container as defined in claim 129, wherein the hydraulically settable sheet has been convoluted into a desired shape of the container.

134. A container as defined in claim 129, wherein the hydraulically settable sheet has been spiral wound into a desired shape of the container.

135. An article of manufacture comprising at least a portion of a substantially dried hydraulically settable sheet, the sheet being formed from a hydraulically settable mixture comprising a hydraulically settable binder, water, an aggregate material, fibers, and a rheology-modifying agent, wherein the fibers are substantially homogeneously dispersed throughout the hydraulically settable sheet such that the sheet can be bent, folded or rolled to significantly mechanically deform the sheet after the hydraulically settable sheet has been substantially dried during fashioning of the article of manufacture without complete rupture of the hydraulically settable sheet, said hydraulically settable sheet having a maximum thickness of about 5 mm.

136. An article of manufacture as defined in claim 135, wherein the hydraulically settable sheet has been convoluted into the desired shape of the article.

137. An article of manufacture as defined in claim 135, wherein the article comprises a food or beverage container.

138. An article of manufacture as defined in claim 135, wherein the article of manufacture comprises a box.

139. An container comprising at least a portion of a substantially dried hydraulically settable sheet, the sheet being formed from a hydraulically settable mixture comprising a hydraulically settable binder, water, an aggregate material, fibers, and a rheology-modifying agent, wherein the fibers are substantially homogeneously dispersed throughout the hydraulically settable sheet such that the sheet can be bent, folded or rolled to significantly mechanically deform the sheet after the hydraulically settable sheet has been substantially dried during fashioning of the container without complete rupture of the hydraulically settable sheet, said hydraulically settable sheet having a maximum thickness of about 1 cm.

140. A container as defined in claim 139, wherein the container further includes a coating on at least a portion of the hydraulically settable sheet.

141. A container as defined in claim 139, wherein the container comprises a cup.

142. A container as defined in claim 139, wherein the container comprises a box.

143. An article of manufacture comprising at least a portion of a substantially hardened hydraulically settable sheet, the sheet being formed from a hydraulically settable mixture comprising a hydraulically settable binder, rheology-modifying agent, fibers, and water, the hydraulically settable sheet being characterized in that it can be bent, folded or rolled to significantly mechanically deform the sheet after the hydraulically settable sheet has been substantially dried and during formation of the article of manufacture without complete rupture of the hydraulically settable sheet, the hydraulically settable sheet being corrugated.

144. An article of manufacture comprising at least a portion of a substantially hardened hydraulically settable sheet, the sheet being formed from a hydraulically settable mixture comprising a hydraulically settable binder, rheology-modifying agent, fibers, and water, the hydraulically settable sheet being characterized in that it can be bent, folded or rolled to significantly mechanically deform the sheet after the hydraulically settable sheet has been substantially dried and during formation of the article of manufacture without complete rupture of the hydraulically settable sheet, wherein the article is a carton.

* * * * *

UNITED STATES PATENT AND TRADEMARK OFFICE
CERTIFICATE OF CORRECTION

PATENT NO.  : 5,665,439
DATED       : September 9, 1997
INVENTOR(S) : Per Just Andersen; Simon K. Hodson It is certified that error appears in the above-identified patent and that said Letters Patent is hereby corrected as shown below:

Other Publications, Page 4, Right Column, line 35, "Anderson" should be --Andersen--

Other Publications, Page 6, Right Column, line 3, "Pastas" should be --Pastes--

Figure 8:
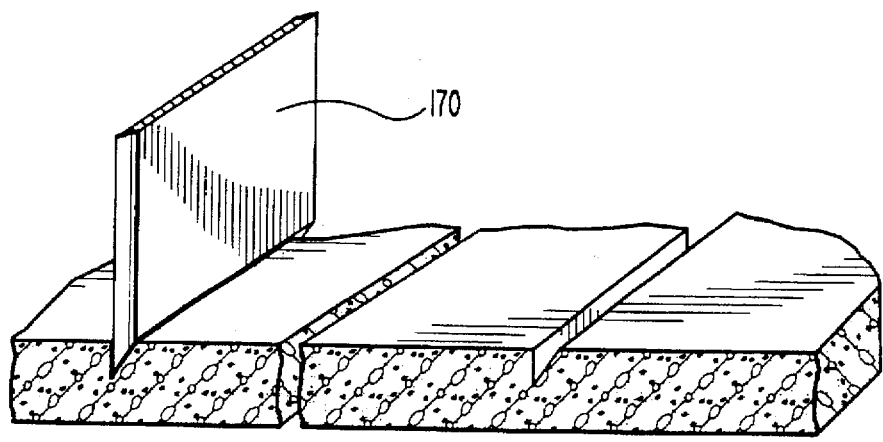
FIG. 8 is a perspective view of a sheet being score cut by a knife blade cutter.

Figure 8, Reference Numeral "170" should be --70--

Figure 9, Reference Numeral "172" should be --74--

Col. 25, line 17, "theology" should be --rheology--

Col. 27, line 40, "With" should be --with--

Col. 30, lines 19-20, "strength to-bulk" should be --strength-to-bulk--

Col. 34, line 49, "44" should be --44'--

Col. 41, line 9, "liner" should be --linear--

Col. 43, line 52, "OCCURS" should be --occurs--

Col. 44, line 62, "fee" should be --free--

Col. 49, line 58, after "polymers." begin a new paragraph.

Col. 51, lines 54-55, delete the period after "automated"

UNITED STATES PATENT AND TRADEMARK OFFICE
CERTIFICATE OF CORRECTION

PATENT NO.   :  5,665,439

DATED        :  September 9, 1997

INVENTOR(S)  :  Per Just Andersen; Simon K. Hodson

It is certified that error appears in the above-identified patent and that said Letters Patent is hereby corrected as shown below:

Col. 52, line 63, "complimentary" should be --complementary--

Col. 58, line 20, "sea" should be --seal--

Col. 58, line 37, "two sheet" should be --two-sheet--

Col. 59, line 61, "water to cement" should be --water-to-cement--

Col. 63, line 21, "water to cement" should be --water-to-cement--

Col. 68, line 33, "43-60, 60." should be --43-60.--

Col. 68, line 45, "43-60,60," should be --43-60,--

Col. 70, line 27, "60,60" should be --60,--

Col. 70, line 45, "43-60, 60" should be --43-60,--

Col. 73, line 25, "0.06-014" should be --0.06-0.14--

Col. 73, line 58, "43-60, 60." should be --43-60.--

Col. 74, line 8, "43-60, 60" should be --43-60--

Col. 74, line 38, "43-60, 60" should be --43-60--

Col. 74, lines 49-50, "43-60, 60" should be --43-60,--

UNITED STATES PATENT AND TRADEMARK OFFICE
CERTIFICATE OF CORRECTION

PATENT NO. : 5,665,439

DATED : September 9, 1997

INVENTOR(S) : Per Just Andersen; Simon K. Hodson

It is certified that error appears in the above-identified patent and that said Letters Patent is hereby corrected as shown below:

Col. 74, lines 57-58, "43-60, 60" should be --43-60,--

Col. 74, lines 66-67, "43-60, 60" should be --43-60,--

Col. 75, lines 7-8, "43-60, 60" should be --43-60,--

Col. 76, line 17, "43-60, 60" should be --43-60,--

Col. 78, line 51, "43-60, 60" should be --43-60,--

Col. 79, line 65, "Examples 144-148" should be centered and in bold.

Col. 80, line 1, "43-60, 60" should be --43-60,--

Col. 80, line 41, "see" should be --seen--

Col. 80, line 51, "43-60, 60" should be --43-60,--

Col. 89, line 66, "an" should be --a--

Col. 90, line 1, "An" should be --A--

Col. 90, line 45, "An" should be --A--

Signed and Sealed this

Twenty-fifth Day of August, 1998

BRUCE LEHMAN

*Attesting Officer*    *Commissioner of Patents and Trademarks*